(12) United States Patent
Karanikos et al.

(10) Patent No.: US 12,040,643 B2
(45) Date of Patent: Jul. 16, 2024

(54) MAGNETICALLY ATTACHABLE CHARGING DEVICES

(71) Applicant: Apple Inc., Cupertino, CA (US)

(72) Inventors: Demetrios B. Karanikos, San Francisco, CA (US); Varun K. Sanghvi, Fremont, CA (US)

(73) Assignee: Apple Inc., Cupertino, CA (US)

( * ) Notice: Subject to any disclaimer, the term of this patent is extended or adjusted under 35 U.S.C. 154(b) by 395 days.

(21) Appl. No.: 17/394,626

(22) Filed: Aug. 5, 2021

(65) Prior Publication Data
US 2022/0045527 A1 Feb. 10, 2022

Related U.S. Application Data

(60) Provisional application No. 63/081,812, filed on Sep. 22, 2020, provisional application No. 63/061,783, filed on Aug. 5, 2020.

(51) Int. Cl.
| | | |
|---|---|---|
| *H01M 10/46* | (2006.01) |
| *H01F 7/06* | (2006.01) |
| *H02J 7/00* | (2006.01) |
| *H02J 50/10* | (2016.01) |
| *H02J 50/90* | (2016.01) |

(52) U.S. Cl.
CPC .............. *H02J 7/0044* (2013.01); *H01F 7/06* (2013.01); *H02J 50/10* (2016.02); *H02J 50/90* (2016.02)

(58) Field of Classification Search
CPC ...... H02J 7/0044; H02J 7/0042; H02J 50/005; H02J 50/10; H02J 50/90; H01F 7/06; H01F 7/0252; H01F 38/14; H01F 27/366

USPC ................................. 320/107, 108, 114, 115
See application file for complete search history.

(56) References Cited

U.S. PATENT DOCUMENTS

| | | |
|---|---|---|
| 6,888,940 B1 | 5/2005 | Deppen |
| 8,073,324 B2 | 12/2011 | Tsai |
| 8,558,411 B2 | 10/2013 | Baarman |
| 8,688,037 B2 | 4/2014 | Chatterjee et al. |
| 8,907,752 B2 | 12/2014 | Wodrich et al. |
| 8,912,686 B2 | 12/2014 | Stoner et al. |
| 9,038,971 B1 | 5/2015 | Guthrie |
| 9,106,083 B2 | 8/2015 | Partovi |
| 9,112,364 B2 | 8/2015 | Partovi |
| 9,413,191 B2 | 8/2016 | Kim et al. |
| 9,627,130 B2 | 4/2017 | Golko et al. |
| 10,153,666 B2 | 12/2018 | Lee et al. |

(Continued)

FOREIGN PATENT DOCUMENTS

| | | | | |
|---|---|---|---|---|
| CA | 3030713 A1 | * | 6/2020 | ........... F16M 11/041 |
| CN | 104467129 A | | 3/2015 | |

(Continued)

*Primary Examiner* — Edward Tso
(74) *Attorney, Agent, or Firm* — Kilpatrick Townsend & Stockton LLP

(57) ABSTRACT

Attachment devices that can secure a phone or other electronic device in place in a vehicle or other structure. One example can provide an attachment device that can include a stalk portion to attach to a surface or structure in a vehicle, such as a vent cover, dashboard, monitor, cup holder or other surface or structure. The attachment device can further include an attachment feature to provide for an attachment to the electronic device. Further examples can provide power for a phone or other electronic device.

20 Claims, 56 Drawing Sheets

(56) References Cited

U.S. PATENT DOCUMENTS

| | | |
|---|---|---|
| 10,243,402 B2 | 3/2019 | Park et al. |
| 10,273,942 B2 | 4/2019 | Nakamura |
| 10,404,089 B2 | 9/2019 | Kasar et al. |
| 10,418,839 B2 | 9/2019 | Miller |
| 10,491,041 B2 | 11/2019 | Wittenberg et al. |
| 10,622,842 B2 | 4/2020 | Lee et al. |
| 10,703,297 B1 | 7/2020 | Cohen et al. |
| 11,342,800 B2 | 5/2022 | Oro et al. |
| 2009/0212637 A1 | 8/2009 | Baarman et al. |
| 2009/0278642 A1 | 11/2009 | Fullerton et al. |
| 2010/0081377 A1 | 4/2010 | Chatterjee et al. |
| 2012/0068942 A1 | 3/2012 | Lauder |
| 2012/0112553 A1 | 5/2012 | Stoner, Jr. et al. |
| 2012/0146576 A1* | 6/2012 | Partovi ................ H02J 7/0044 320/108 |
| 2012/0306440 A1 | 12/2012 | Yeh |
| 2013/0099730 A1 | 4/2013 | Yoon |
| 2013/0113423 A1 | 5/2013 | Baarman |
| 2013/0187596 A1 | 7/2013 | Eastlack |
| 2013/0260677 A1 | 10/2013 | Partovi |
| 2014/0242429 A1 | 8/2014 | Lee |
| 2016/0094076 A1 | 3/2016 | Kasar et al. |
| 2016/0105047 A1 | 4/2016 | Cui |
| 2016/0128210 A1 | 5/2016 | Lee |
| 2016/0206065 A1 | 7/2016 | Ehrlich |
| 2016/0259374 A1* | 9/2016 | Breiwa ................ H01F 7/0247 |
| 2017/0005399 A1 | 1/2017 | Ito et al. |
| 2017/0070076 A1 | 3/2017 | Karanikos |
| 2017/0245040 A1 | 8/2017 | Hankey |
| 2018/0248406 A1 | 8/2018 | Bae et al. |
| 2018/0301936 A1 | 10/2018 | Lee et al. |
| 2019/0089188 A1 | 3/2019 | Chien et al. |
| 2019/0198212 A1 | 6/2019 | Levy |
| 2019/0363565 A1 | 11/2019 | Graham et al. |
| 2020/0346006 A1 | 11/2020 | Eigentler et al. |
| 2021/0046885 A1* | 2/2021 | Jankura ................ F16M 11/041 |
| 2021/0099026 A1 | 4/2021 | Larsson |
| 2021/0099027 A1* | 4/2021 | Larsson ................ H04B 5/0031 |
| 2022/0014655 A1 | 1/2022 | Hu |

FOREIGN PATENT DOCUMENTS

| | | |
|---|---|---|
| CN | 205670700 U | 11/2016 |
| CN | 106877429 A | 6/2017 |
| CN | 207442540 U | 6/2018 |
| CN | 208581077 U | 3/2019 |
| EP | 0823717 A2 | 2/1998 |
| JP | 2013120837 A | 6/2013 |
| JP | 3197750 U | 5/2015 |
| JP | 2015171166 A | 9/2015 |
| JP | 6233504 B2 | 11/2017 |
| TW | M414057 U | 10/2011 |
| TW | 201347349 A | 11/2013 |
| TW | 201711335 A | 3/2017 |
| WO | 2010129369 A2 | 11/2010 |
| WO | 2011156768 A2 | 12/2011 |
| WO | 2016053633 A1 | 4/2016 |

* cited by examiner

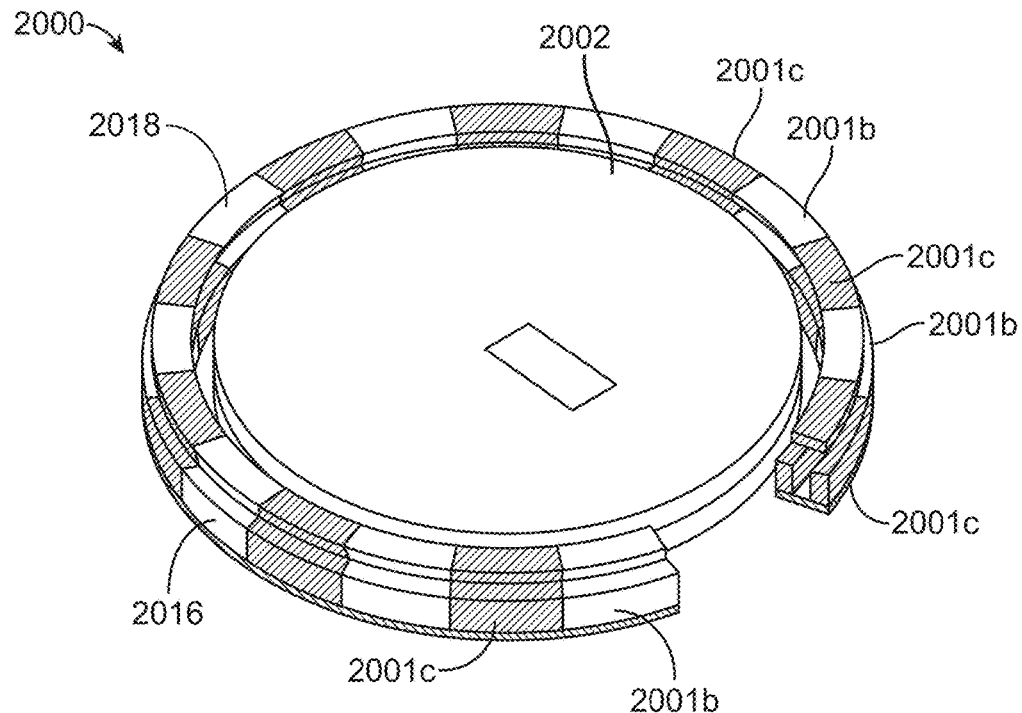
FIG. 20A
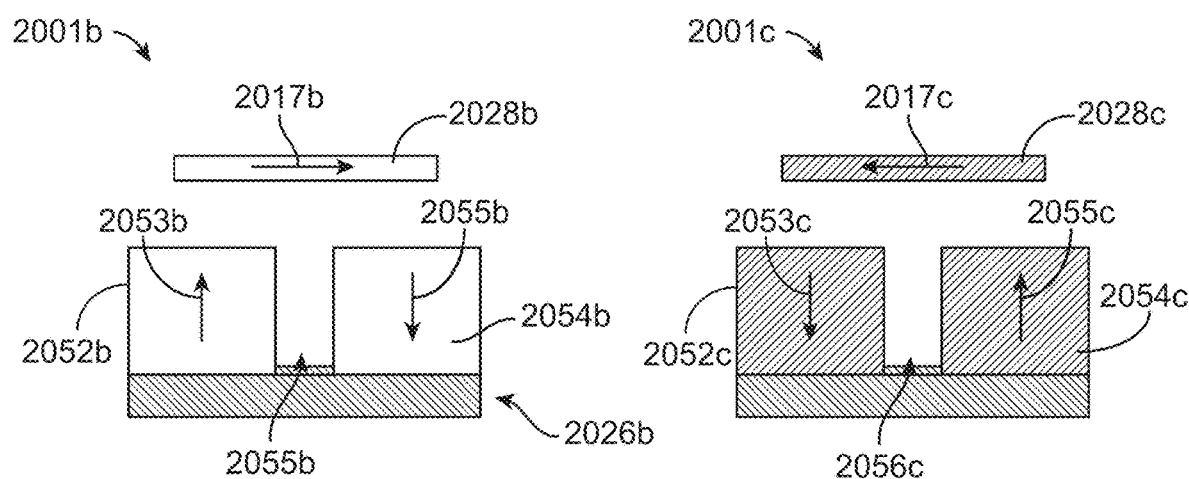
FIG. 20B
FIG. 20C

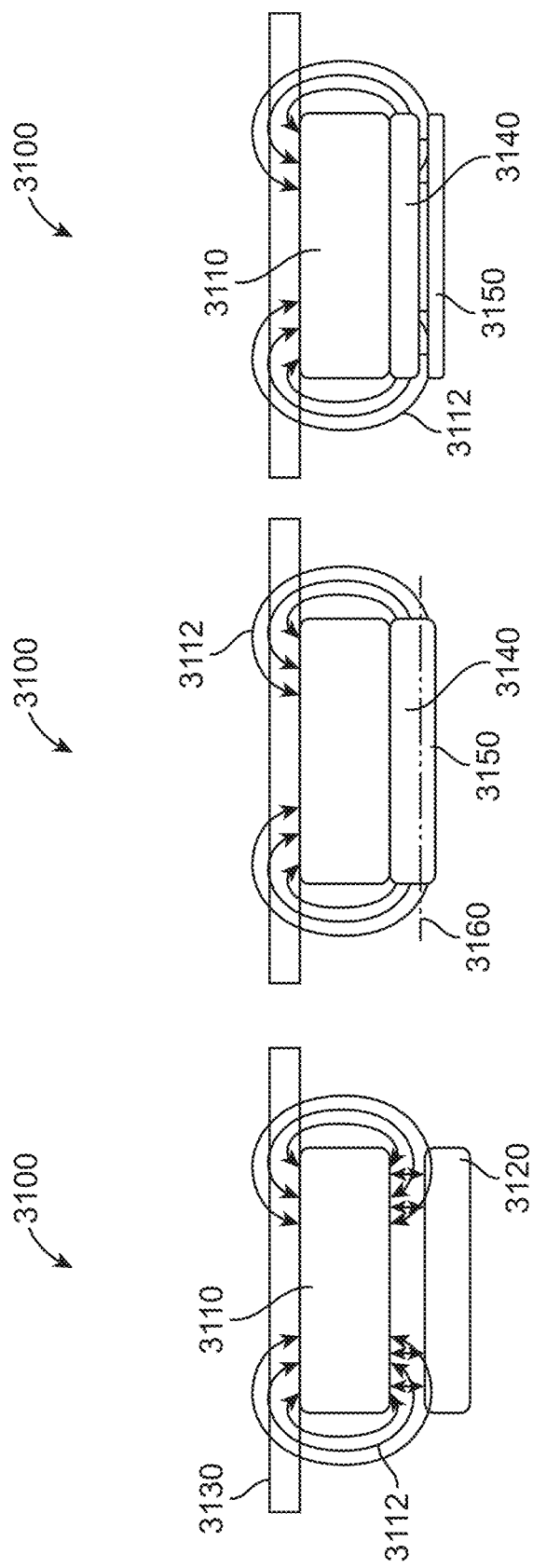

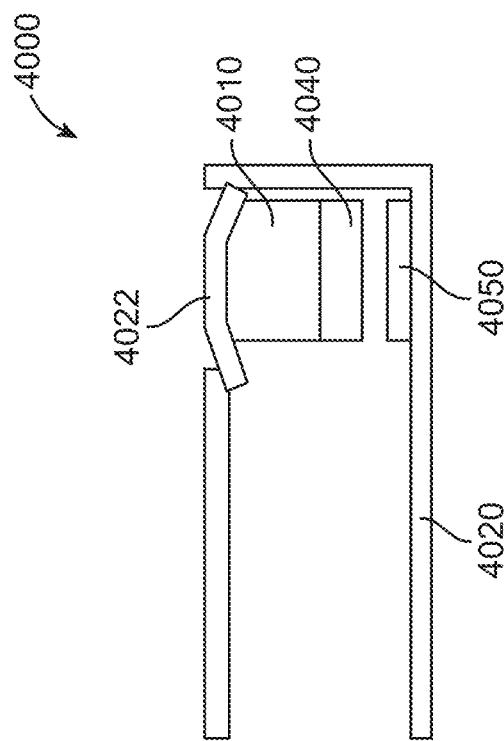
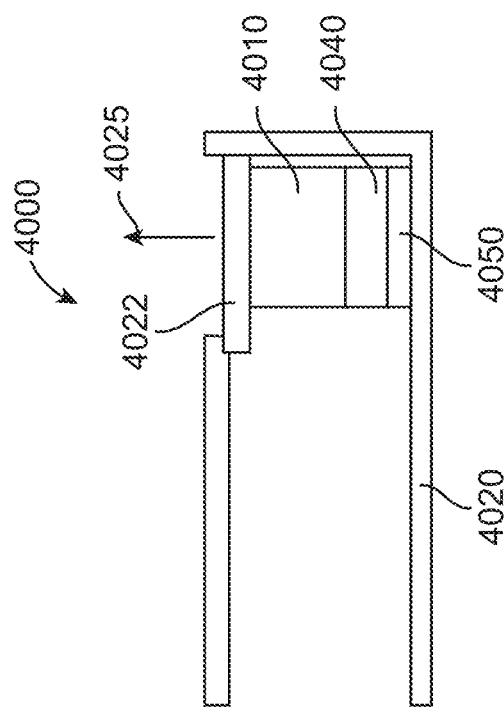

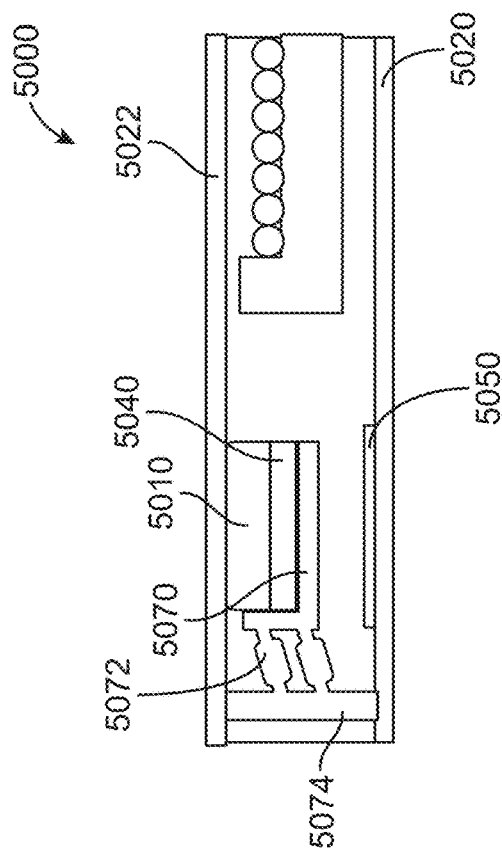
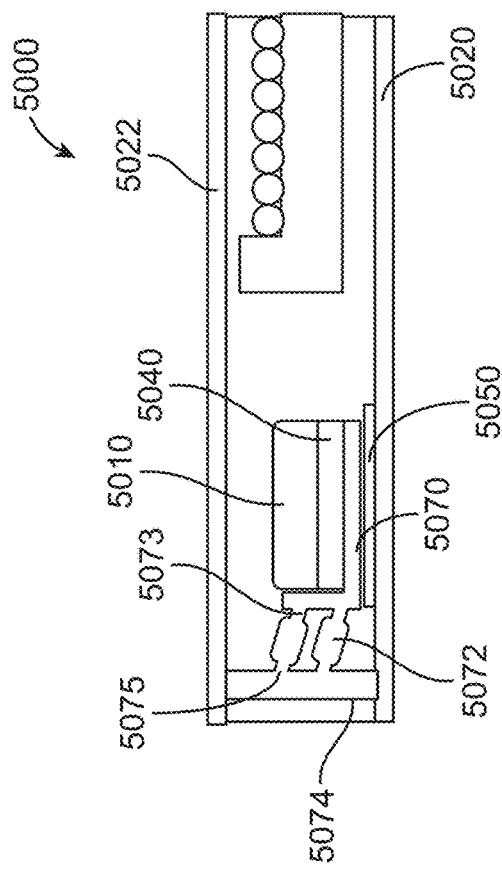
FIG. 50A
FIG. 50B

MAGNETICALLY ATTACHABLE CHARGING DEVICES

CROSS-REFERENCE TO RELATED APPLICATIONS

The present application claims the benefit of and priority to United States provisional application numbers 63/081,812, filed Sep. 22, 2020, and 63/061,783, filed Aug. 5, 2020, which are incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, portable media recorders, navigation systems, monitors, adapters, and others, have become ubiquitous.

As a result of the ubiquity and increasing functionality of these electronic devices, they are now a constant companion for many. They are often used during or in conjunction with many daily activities, either while performing an activity or in a manner that supplements an activity.

Driving is example of an activity where an electronic device is used in a supplementary manner. An electronic device, such as a phone, can be very useful while driving to provide entertainment, such as music, or to provide information, such as maps and navigation instructions. Such an electronic device can be useful for both a driver and a passenger of the vehicle.

Unfortunately, these phones or other electronic devices can move inside a vehicle during sharp turns or sudden stops. This can simply annoy a user, or it can become dangerous. Accordingly, it can be desirable to provide attachment devices that can securely attach a phone or other electronic device to a structure or surface of the vehicle. Another type of distraction can arise when a battery on a phone or other electronic device runs low or is not able to power the device. Accordingly, it can be desirable that some attachment devices have the capability of charging a phone or other electronic device.

Thus, what is needed are attachment devices that can secure a phone or other electronic device in place in a vehicle. It can also be desirable that these attachment devices be able to provide power to the phone or other electronic device.

SUMMARY

Accordingly, embodiments of the present invention can provide attachment devices that can secure a phone or other electronic device in place in a vehicle. Further embodiments can provide attachment devices that are also able to provide power to the phone or other electronic device.

An illustrative embodiment of the present invention can provide attachment devices having one or more attachment features for attaching to a phone or other electronic device. Once attached to an electronic device, the attachment device can secure the electronic device in place in a vehicle or other location, can provide charging for a battery of the electronic device, can be identified by the electronic device, or any combination of these.

These and other embodiments of the present invention can provide an attachment device that can include a stalk or other portion to attach to a surface or structure in a vehicle, such as a vent cover, dashboard, monitor, cup holder or other surface or structure. The attachment device can further include an attachment feature to provide for an attachment to an electronic device. In this way, an electronic device can be attached to a surface or structure in a vehicle through the attachment device.

These and other embodiments of the present invention can provide attachment devices having various attachment features, where an attachment feature can secure a phone or other electronic device to a contacting surface or structure of an attachment device. These attachment features can include one or more magnets, such as a magnet array, behind or at the contacting surface of the attachment device. This magnet array, or other magnet or magnetic structure (referred to here as a magnet array), can be a fixed magnet array positioned in an enclosure of the attachment device that forms a module of the attachment device. The magnet array can include one or more magnets. This magnet array can be attracted to a corresponding magnet array or other magnetic structure in or otherwise associated with an electronic device that is, or is being, attached to the contacting surface of the attachment device.

This magnet array can alternatively be a moving magnet array. The moving magnet array can be positioned in the enclosure such that the moving magnet array can move in a direction that is orthogonal (or at least nonparallel) to the contacting surface. The moving magnet array can also or instead move parallel to the contacting surface. The moving magnet array can be attracted to a corresponding magnet array in or otherwise associated with an electronic device that is, or is being, attached to the contacting surface of the attachment device. For example, the moving magnet array can be attracted to a corresponding magnet array in a case of the electronic device. As the electronic device is brought into proximity, the moving magnet array can move to a position in the enclosure such that it is closer to the electronic device, thereby increasing the magnetic attraction between the moving magnet array and the corresponding magnet array in the electronic device.

The fixed or moving magnet array in the attachment device can be formed of one or more rare earth magnets, one or more magnetized ferromagnetic materials, or other magnetic, magnetically conductive, or magnetizable material. The fixed or moving magnet array can instead be, or can include, a magnetically conductive structure that is not itself magnetic but can guide field lines from one or more magnets in the electronic device or elsewhere in the attachment device. The magnets in either or both the attachment device and electronic device can have various orientations. For example, they can have the same orientations, they can have alternating orientations, or their orientations can have other arrangements.

These and other embodiments of the present invention can provide attachment devices having other attachment features, such as one or more alignment structures that can attach an electronic device to an attachment device in a specific orientation, such as a portrait or landscape orientation. The alignment structures can be formed of one or more magnets placed in specific positions and having specific orientations.

These and other embodiments of the present invention can provide attachment devices having other attachment features, such as one or more high-friction or high-stiction contacting surfaces. The high-friction surfaces can cover a fixed magnet array at a contacting surface or portion thereof. The high-friction surfaces can cover a surface of a moving magnetic structure, such as a contacting surface or a portion thereof. The high-friction surfaces can engage a surface on or associated with an electronic device to increase a shear force needed to remove the electronic device from the attachment device. The high-friction surfaces can be formed of an elastomer, plastic, PVC plastic, rubber, silicon rubber, urethane, polyurethane, polycarbonate (PC), nitrile, neoprene, silicone, or other material. Some or all of the high-friction surfaces, such as a contacting surface, can also or instead be formed using an adhesive. Using an adhesive can increase both a shear force and a normal force needed to remove the electronic device from the attachment device.

These and other embodiments of the present invention can provide attachment devices having various alignment features where the alignment features help to align an electronic device to an attachment device. These alignment features can include markings, guides, raised features, or other identifying or mechanical features. One or more magnets, whether fixed or moving, or other magnetic structure, can be used as such an alignment feature. One or more magnets used as an alignment feature can be included as part of the above magnet array, or can be separate from the magnet array.

The attachment device enclosure can further house an inductive coil for providing inductive charging to an electronic device. The enclosure can further house shielding to magnetically isolate the inductive coil from the magnet array and to improve inductive coupling between the coil in the attachment device and a corresponding coil of a power receiving phone or electronic device. Control circuitry that receives an input power supply and generates alternating currents through the inductive coil can also be included in the enclosure or elsewhere in the attachment device. These alternating currents can generate a time-varying magnetic flux in the corresponding coil in an electronic device attached to the attachment device. The time-varying magnetic flux can generate currents in the corresponding coil that can be used to charge a battery in the electronic device.

The control circuitry can also sense currents in the coil in the attachment device that are induced by the corresponding coil in the electronic device. This can allow the control circuitry to read data transmitted by the electronic device. Specifically, a drive current to the corresponding coil can be modulated in order to transmit data to the attachment device. The modulation can be in amplitude, phase, frequency, or a combination thereof. For example, the drive current can be modulated in an on-off manner to transmit data. This modulation can generate a time-varying magnetic field that can induce currents in the coil in the attachment device. The control circuitry can read these induced currents to receive data from the electronic device. The data transmitted to the attachment device by the electronic device can include identification information for the electronic device, charge status, charging level requests, and other information. This data can be received by the attachment device and used in determining whether power should be delivered to the electronic device and in what amount.

Data can similarly be transmitted from the attachment device to the electronic device as well. Specifically, a drive current to the coil in the attachment device can be modulated in order to transmit data to the electronic device. The modulation can be in amplitude, phase, frequency, or a combination thereof. For example, the drive current can be modulated in an on-off manner to transmit data. This modulation can generate a time-varying magnetic field that can induce currents in the coil in the electronic device. This data can include identification and charge capability information about the attachment device.

Power and data can be received by an attachment device through a cable. Data can also be provided by the attachment device over this cable. The cable can be tethered to circuitry and components in the attachment device, or the cable can include a connector insert that can be inserted into a connector receptacle in the attachment device. The connector receptacle can be located in the enclosure or other portion of the attachment device. The cable can provide a power providing connection to the attachment device from a power converting brick, battery pack, external electronic device, or other power supply source. The cable can also provide data between the attachment device and a second electronic device, where the second electronic device is a different device than the electronic device attached to the contacting surface of the attachment device.

The attachment device enclosure can further house near-field communication circuitry and components, such as a transmitter including a near-field communication tag and capacitors. The near-field communication circuitry and components can allow an electronic device to detect and identify the attachment device. This recognition can prompt the electronic device to perform one or more activities. For example, the electronic device can launch one or more applications in response to this recognition. Various software and control features can be implemented in these and other embodiments of the present invention. The software and control features can be implemented in an attachment device, an electronic device attached to the attachment device, or in other devices associated with the electronic device or a vehicle to which the attachment device is attached, by circuitry or components in an area surrounding the attachment device or elsewhere, or by a combination of these.

These and other embodiments of the present invention can provide attachment devices having additional features that can increase their usefulness. For example, an attachment device can include a stalk to attach the attachment device to a surface or structure in or associated with a vehicle. This stalk can include a ball-joint or other mechanism that can allow a phone or other electronic device attached to a contacting surface of the attachment device to be rotated and titled for easy viewing. For example a backside of an electronic device can contact a contacting surface for an attachment device. A screen on a front side of the electronic device can then be rotated and tilted for easy viewing.

In these and other embodiments of the present invention, these structures can be formed of various materials in various ways. Some or all of each contacting surface shown here, or otherwise utilized by an embodiment of the present invention, can be formed of an elastomer, plastic, PVC plastic, rubber, silicon rubber, urethane, polyurethane, nitrile, polycarbonate, neoprene, silicone, or other material. The plates, enclosures, other enclosure and housing portions, shown here or otherwise utilized by an embodiment of the present invention, can be formed of a metal, such as stainless steel or aluminum, plastic, nylon, or other conductive or nonconductive material, such as a plastic. They can be formed using computer numerical control (CNC) or other type of machining, stamping, metal injection molding (MIM), or other technique. Ferritic portions, such as coil ferrites and bottom ferrites, can be formed of a material that has high magnetic permeability, such as stainless steel, ferritic stainless steel, oxides of iron, manganese, zinc, or other material or combination of materials. One or more e-shields can be included, for example between a coil and a contacting surface, and can be formed of a layer of copper or other conductive material to intercept electric fields between a coil in an attachment device and a corresponding coil in an electronic device, and can have a low magnetic permeability to pass magnetic fields between the coil and the corresponding coil. An e-shield can include breaks to prevent the formation of eddy currents. Control circuitry can be located on boards that can be formed of FR-4 or other material. Adhesive layers used here can be formed of a pressure-sensitive adhesive, a heat-activated film, or other type of adhesive.

In these and other embodiments of the present invention, portions of the attachment devices can be conductive. These conductive portions, such as shields, return plates, backplates, and other portions can be formed using stamping, forging, metal-injection molding, 3-D printing, CNC or other machining, or other manufacturing process. They can be formed of a material that has high magnetic permeability, such as stainless steel, ferritic stainless steel, oxides of iron, manganese, zinc, or other material or combination of materials. Alternately, they can be formed of a material having a low magnetic permeability, such as copper, aluminum, or other material.

In these and other embodiments of the present invention, portions of the attachment devices can be nonconductive. These nonconductive portions, such as an enclosure for the attachment portion, stalk, a contacting surface, and other nonconductive portions, can be formed using injection or other molding, 3-D printing, machining, or other manufacturing process. They can be formed of silicon or silicone, rubber, hard rubber, plastic, nylon, liquid-crystal polymers (LCPs), or other nonconductive material or combination of materials. The boards can be formed of FR-4 or other material.

These and other embodiments of the present invention can provide attachment devices that can be used to secure various types of devices, such as portable computing devices, tablet computers, desktop computers, laptop computers, all-in-one computers, cell phones, wearable-computing devices, storage devices, portable media players, navigation systems, monitors, power supplies, adapters, remote control devices, audio devices, chargers, and other devices in place in a vehicle or other conveyance, such as a train or plane, or other fixed or mobile location.

While embodiments of the present invention are well-suited to providing attachment device between phones and vehicles, they can be used in other types of applications as well. For example, embodiments of the present invention can provide attachment devices that can be used between tablet computers and vehicles, or between phones or tablets and other structures.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 17B shows an axial cross-section view through a portion of the system of FIG. 17A, while

FIG. 20A shows a perspective view of a magnetic alignment system according to some embodiments, and FIGS. 20B and 20C show axial cross-section views through different portions of the system of FIG. 20A;

FIGS. 31A through 31C illustrate moving magnets according to an embodiment of the present invention;

FIGS. 40A and 40B illustrate a moving magnet in conjunction with a high friction surface according to an embodiment of the present invention;

FIGS. 50A and 50B illustrate structures for constraining motions of magnets an electronic device according to an embodiment of the present invention;

DESCRIPTION OF ILLUSTRATIVE EMBODIMENTS

Figure 1:
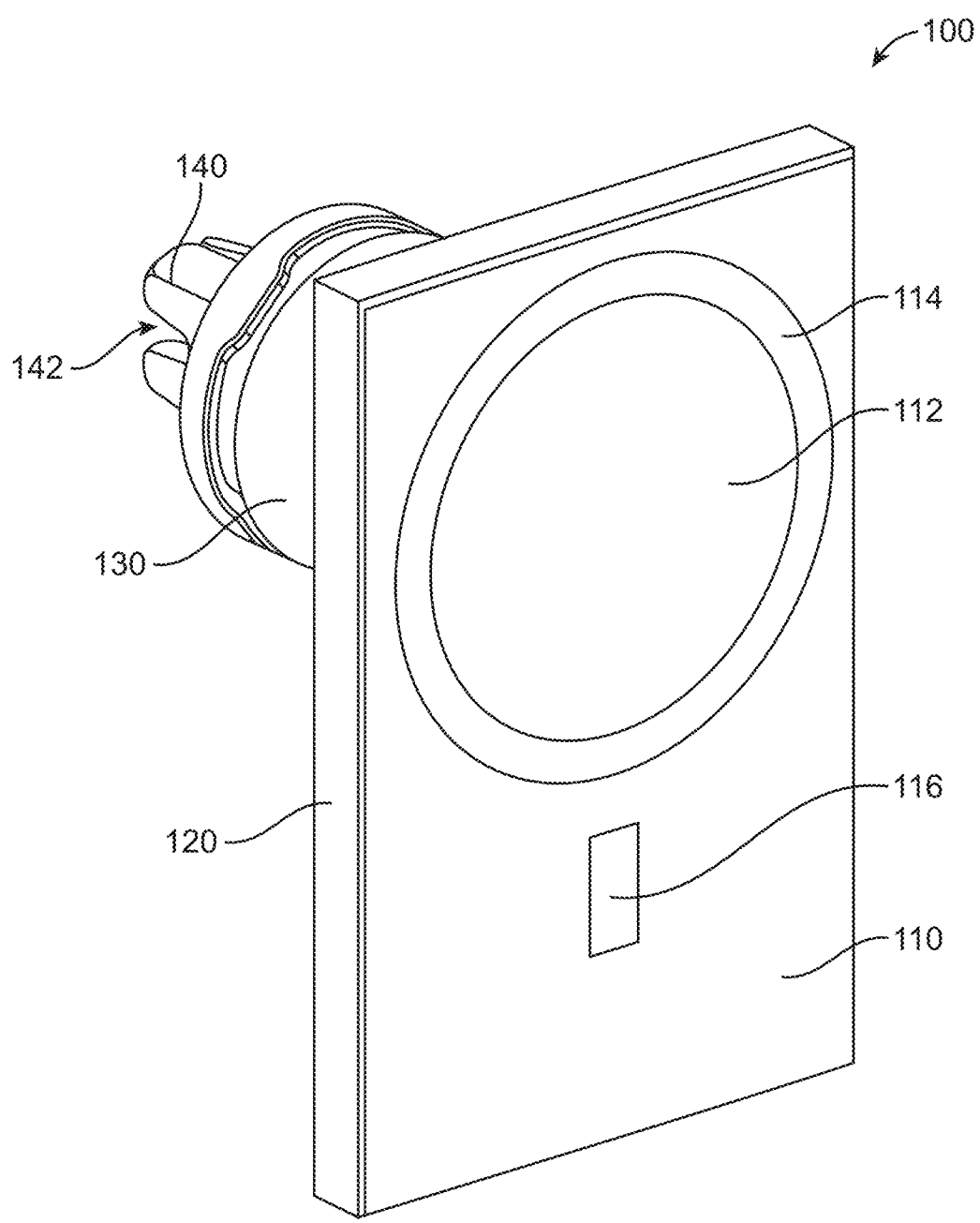
FIG. 1 illustrates an attachment device according to an embodiment of the present invention.

FIG. 1 illustrates an attachment device for securing a phone or other electronic device to a vehicle or other conveyance or location according to an embodiment of the present invention. This figure, as with the other figures, is shown for illustrative purposes and does not limit either the embodiments of the present invention or the claims.

Attachment device 100 can be used to secure an electronic device 290 (shown in FIG. 8B) to a surface or structure, such as a surface or structure in a vehicle (not shown.) In this particular example, electronic device 290 can be a phone, though electronic device 290 can instead be a tablet computer, wearable computing device, camera, or other electronic, mechanical, or electromechanical device.

In these and other embodiments of the present invention, attachment device 100 (and the other attachment devices shown herein) can be a passive attachment device to mechanically secure electronic device 290 to a surface or structure. In these and other embodiments the present invention, attachment device 100 (and the other attachment devices shown herein including attachment devices 300 and 500) can instead be a powered attachment device. When attachment device 100 is a powered attachment device, attachment device 100 can include a connector receptacle 340 (shown in FIG. 10) to accept a connector insert 910 of a cable 900 (shown in FIG. 10) where power is received over cable 900. Alternatively, the cable can be tethered or connected directly to components inside attachment device 100. A battery (not shown) in attachment device 100 can be wirelessly charged, for example by placing contacting surface 110 on a surface of a wireless charger. A power converter (not shown) can further be included in attachment device 100, or it can be separate and attached to a surface or structure of a vehicle, or elsewhere. This power converter can receive a first voltage, such as a voltage from a car battery, and convert the received voltage to a second voltage that can be provided to control circuitry such as control circuitry 440 (shown in FIG. 11) in attachment device 100 or other attachment device.

Attachment device 100 can include front enclosure 120 covered completely or partially by contacting surface 110. Contacting surface 110 can physically contact a backside of a phone or other electronic device 290 such that a screen (not shown) on a front side of electronic device 290 can be viewed. Contacting surface 110 can be a high friction or high stiction surface that increases a shear force needed to remove electronic device 290 from attachment device 100. Contacting surface 110 can also be at least somewhat adhesive. This can increase a normal force needed to remove electronic device 290 from attachment device 100. Contacting surface 110 can be formed of an elastomer, plastic, PVC plastic, rubber, silicon rubber, polycarbonate (PC), urethane, polyurethane, nitrile, neoprene, silicone, or other material or combination of materials. For example, contacting surface 110 can be formed of PC covered in a high-friction or high-stiction material, which again can be urethane, polyurethane, or other material.

Contacting surface 110 can include regions 114 and 116, which can be thinned regions of contacting surface 110. Magnet array 210 and alignment magnet 212 (shown in FIG. 7) can be placed behind regions 114 and 116, respectively.

Regions 114 and 116 can optionally be thinned to provide areas on contacting surface 110 that allow an increased magnetic flux at the surface of attachment device 100. Also, one or more region 112, region 114, and region 116 can move relative to the remaining portions of contacting surface 110, as shown below in FIG. 39 through FIG. 47.

It can be desirable for attachment device 100 to provide a strong magnetic force to hold electronic device 290 securely in place to avoid an inadvertent disconnection. However, when no electronic device is mated with attachment device 100, magnet array 210 can cause undesirable effects. For example, if excessive, the magnetic field provided by magnet array 210 can inadvertently demagnetize stored information, such as information stored on credit cards or transit passes. Accordingly, a magnetic field provided by magnet array 210 can be reduced when an electronic device is not attached and increased when attachment device 100 is, or is about to be, mated with electronic device 290. This increase can allow for use of a limited magnetic flux provided by attachment device 100 when no phone is attached while allowing an increased magnetic flux for a more secure connection when a phone is attached.

This magnetic field can be increased in various ways to more securely attach electronic device 290 to attachment device 100, while also limiting or reducing a magnetic field when no phone or electronic device 290 is attached. For example, the magnetic field can be generated by an electromagnet (not shown) used along with, or in place of, magnet array 210. Current through the electromagnet can be increased during mating of attachment device 100 with electronic device 290 to increase the magnetic attraction between attachment device 100 and a phone or other electronic device 290. Also or instead, magnet array 210 can move from a first position to a second position when attachment device 100 is, or is about to be, mated with electronic device 290. Examples of magnet arrays that either move or are fixed (nonmoving) and that can be used as magnet array 210, magnet array 410 (shown in FIG. 11), and magnet array 610 (shown in FIG. 12) are shown below at least in FIG. 8A, FIG. 8B, and FIG. 13 through FIG. 50B.

Attachment device 100 can include various alignment features where the alignment features help to align electronic device 290 with attachment device 100. These alignment features can include markings, guides, raised features, or other identifying or mechanical features. Magnet array 210, whether formed of fixed or moving magnets, or other magnets, can be used as such an alignment feature.

Figure 7:
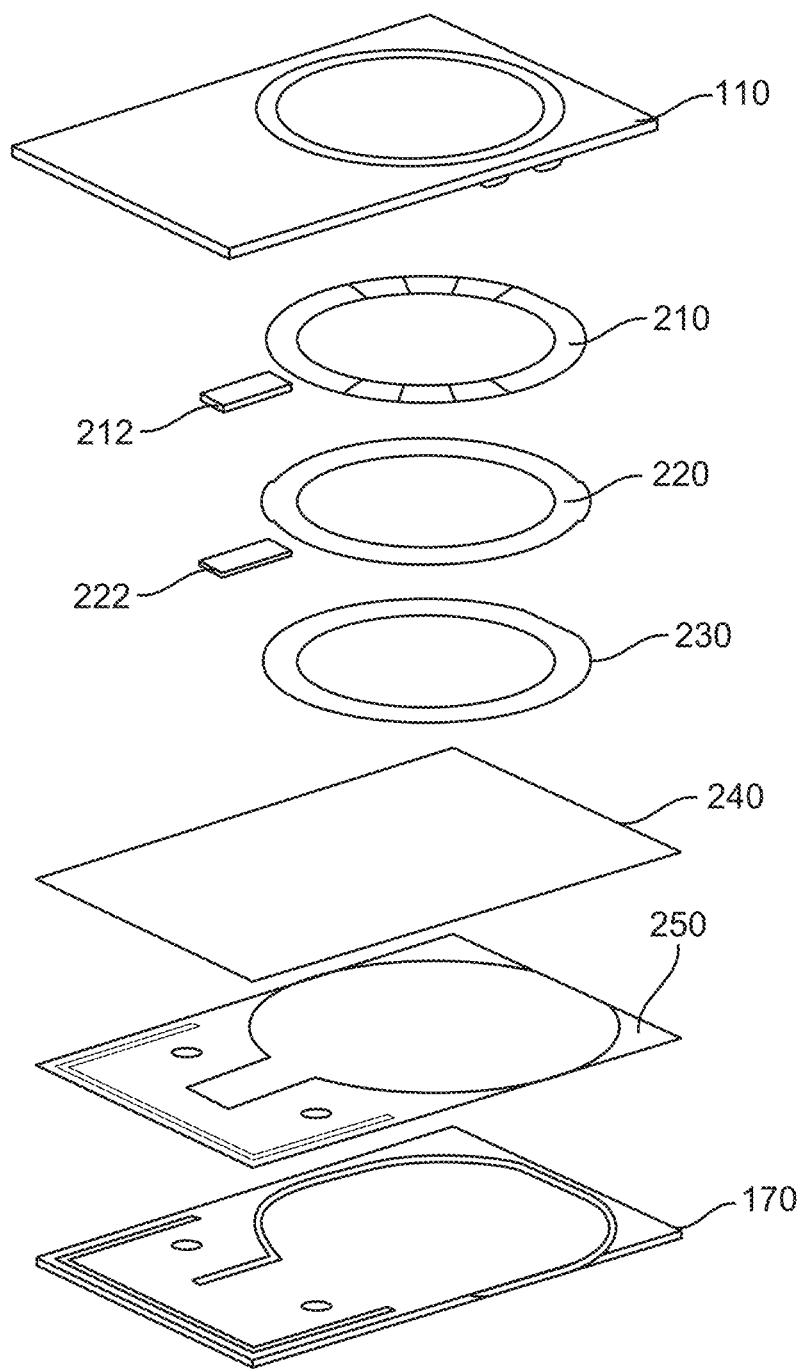
FIG. 7 is an exploded diagram of the portion of an attachment device of FIG. 5.

In some circumstances, it can be desirable for electronic device 290 to align to attachment device 100 in a specific orientation, such as a portrait or landscape orientation. Accordingly, attachment device 100, and other attachment devices included in these and other embodiments of the present invention, can include one or more alignment features to align electronic device 290 in a specific orientation. For example, attachment device 100 can include various markings, guides, steps, or other features. Attachment device 100 can include one or more alignment magnets 212, as shown in FIG. 7. Alignment magnet 212 can be positioned under region 116 on contacting surface 110 elsewhere in or on attachment device 100. Alignment magnet 212 can be attracted to a corresponding magnet in electronic device 290 and can help to align electronic device 290 in a specific orientation, such as in a portrait or landscape orientation. Alignment magnet 212 can be a fixed or moving magnet. Further examples and details of alignment magnets that can be used as alignment magnet 212 (and the other alignment magnets shown here, such as alignment magnet 412 (shown in FIG. 11) and alignment magnet 612 (shown in FIG. 12), are shown below in FIG. 23 through FIG. 30.

Attachment device 100 can further include stalk 130. Stalk 130 can terminate in grip 140, which can include slots 142. Grip 140 and slots 142 can allow attachment device 100 to attach to a surface or other structure in a vehicle or elsewhere. Stalk 130 can include a ball joint or other feature that can allow contacting surface 110, and therefore a screen of electronic device 290, to tilt and rotate to different angles to facilitate viewing.

Figure 2:
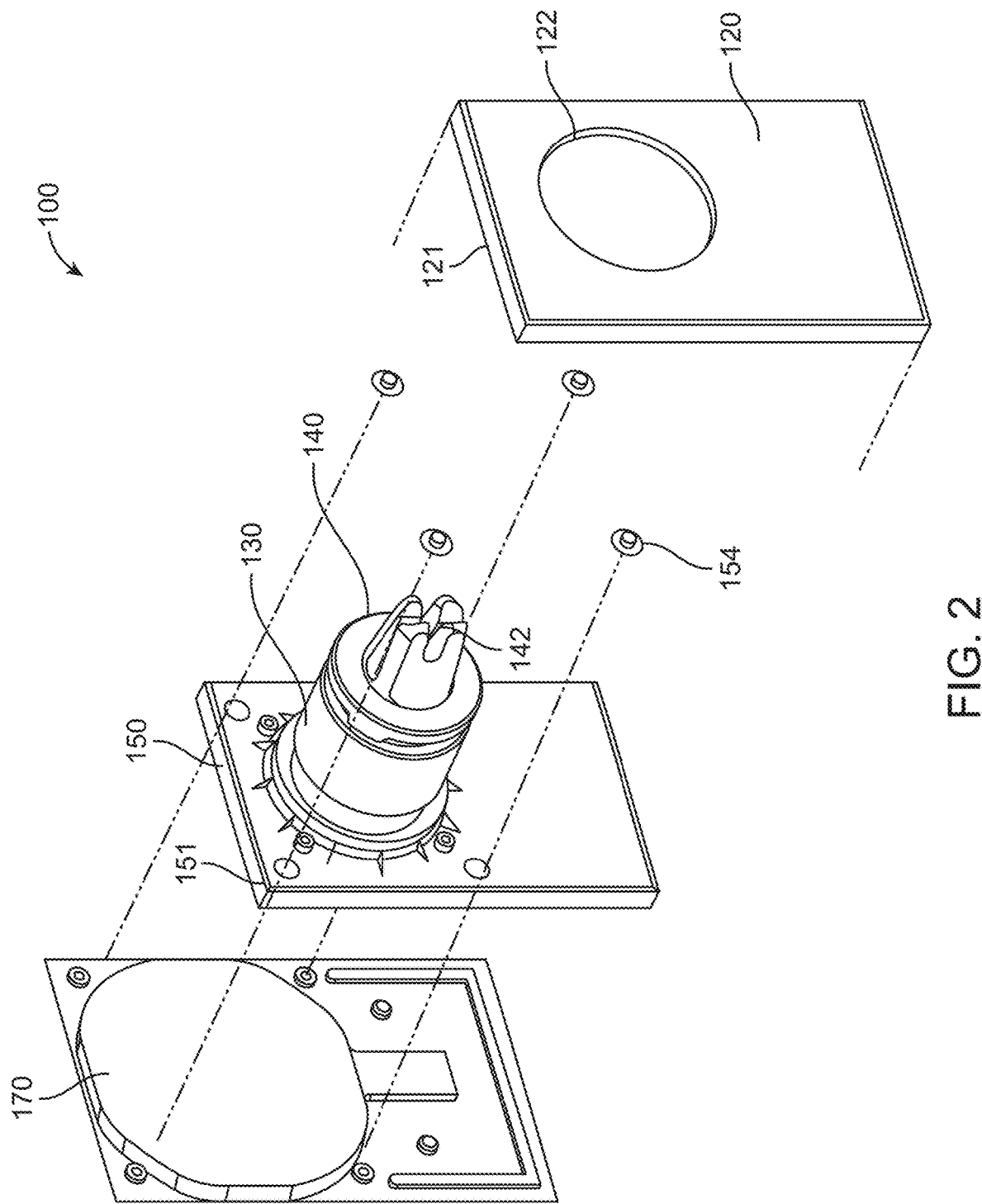
FIG. 2 is a partially exploded view of the attachment device of FIG. 1.
Figure 12:
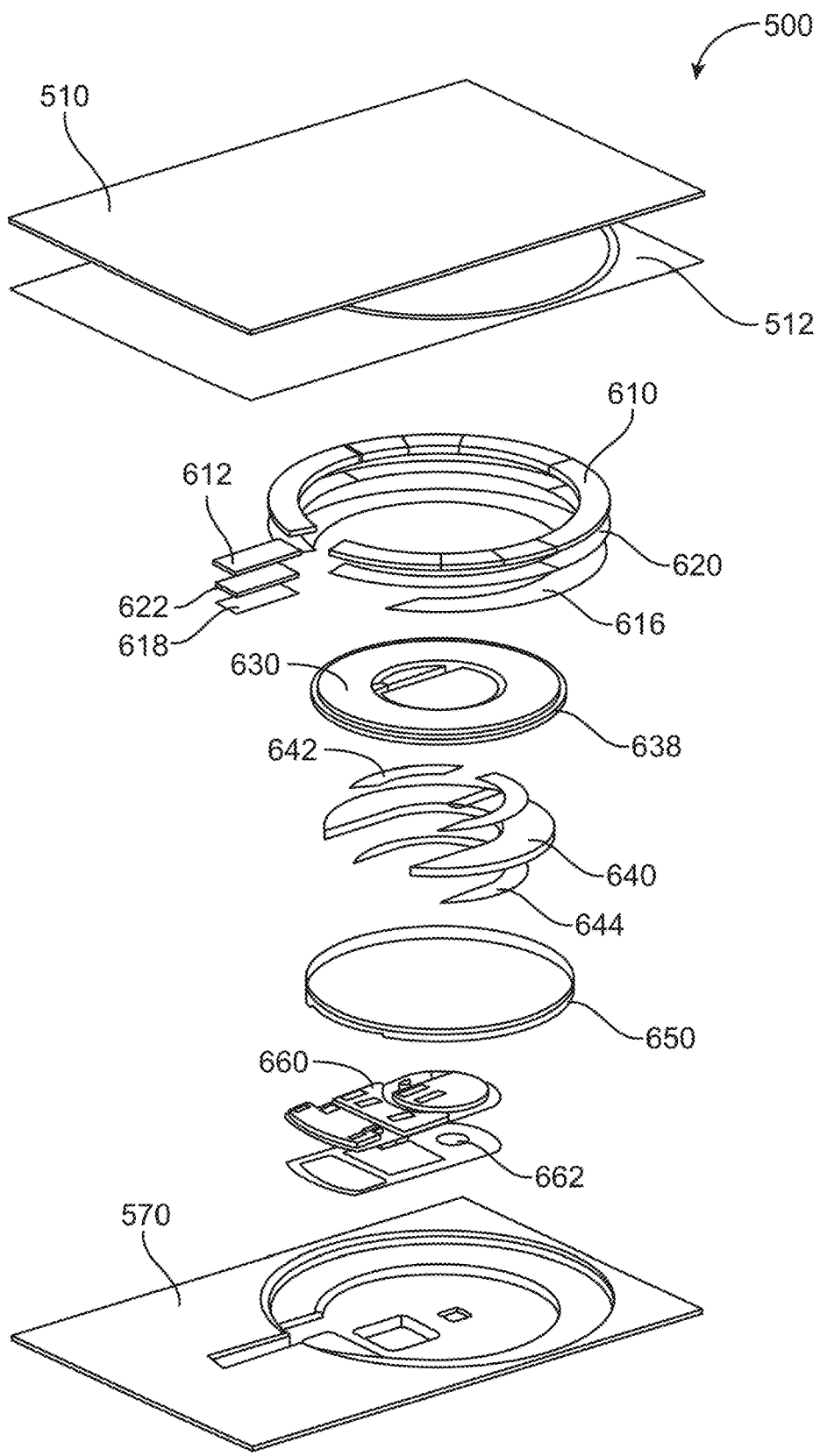
FIG. 12 is an exploded view of another module for an attachment device according to an embodiment of the present invention.

FIG. 2 is a partially exploded view of the attachment device of FIG. 1. In this example, attachment device 100 can include back plate 170. Back plate 170 and contacting surface 110 (shown in FIG. 1) can form an enclosure for a magnet array 210 and alignment magnet 212 (both shown in FIG. 7) and other components, such as coil 630 and near-field communication components 650 as shown in FIG. 12. As such, back plate 170, contacting surface 110, magnet array 210, and the other components, can form a module for attachment device 100. Stalk 130 can be attached to mid-plate 150, which can in turn be attached to back plate 170 with fasteners 154. Front enclosure 120 can then be attached to mid-plate 150 to cover mid-plate 150 and back plate 170. Side edges 121 of front enclosure 120 can cover side edges 151 of mid-plate 150 to reduce a number of visible seams on attachment device 100. Front enclosure 120 can include opening 122 for stalk 130 and grip 140. Grip 140 can include slots 142.

In this example, contacting surface 110 can be formed of a silicone layer. The silicone layer can be formed over a more rigid layer, for example a layer formed of polycarbonate. Contacting surface 110 can be formed using a one or two shot injection-molding process. Mid-plate 150, front enclosure 120, and back plate 170 can be formed of metal, such as aluminum, stainless steel, or other material. Mid-plate 150, front enclosure 120, and back plate 170 can be stamped, machined, formed by metal-injection molding, 3-D printing, or other technique. Mid-plate 150, front enclosure 120, back plate 170, and the portions of stalk 130 can be formed of plastic or other material. Mid-plate 150, front enclosure 120, back plate 170, and the portions of stalk 130 can be injection molded or formed using other techniques. Slots 142 can be formed of rubber, silicone, or other material that can help to secure attachment device 100 in place in a vehicle or other structure.

Back plate 170 and contacting surface 110 can enclose a magnet array 210. This magnet array 210 can attract corresponding magnets (shown as corresponding magnet array 292 in FIG. 8B, and shown as secondary alignment components 1318 in FIG. 13) in electronic device 290 (shown in FIG. 8B, and which can be represented by electronic device 1304 in FIG. 13.) This magnetic attraction can secure electronic device 290 to attachment device 100 in a direction normal to, or orthogonal to, contacting surface 110. The magnetic connection between electronic device 290 and attachment device 100 can provide a fast and simple way of attaching a phone or other electronic device 290 to a vehicular surface or structure.

It can be desirable that contacting surface 110 be adjustable relative to grip 140. This can allow a screen (not shown) of electronic device 290 attached to contacting surface 110 to be rotated and tilted relative to a surface or structure that grip 140 is attached to. Accordingly, stalk 130 can include one or more ball-joints or other flexible joints to allow this adjustment. An example is shown below.

Figure 3:
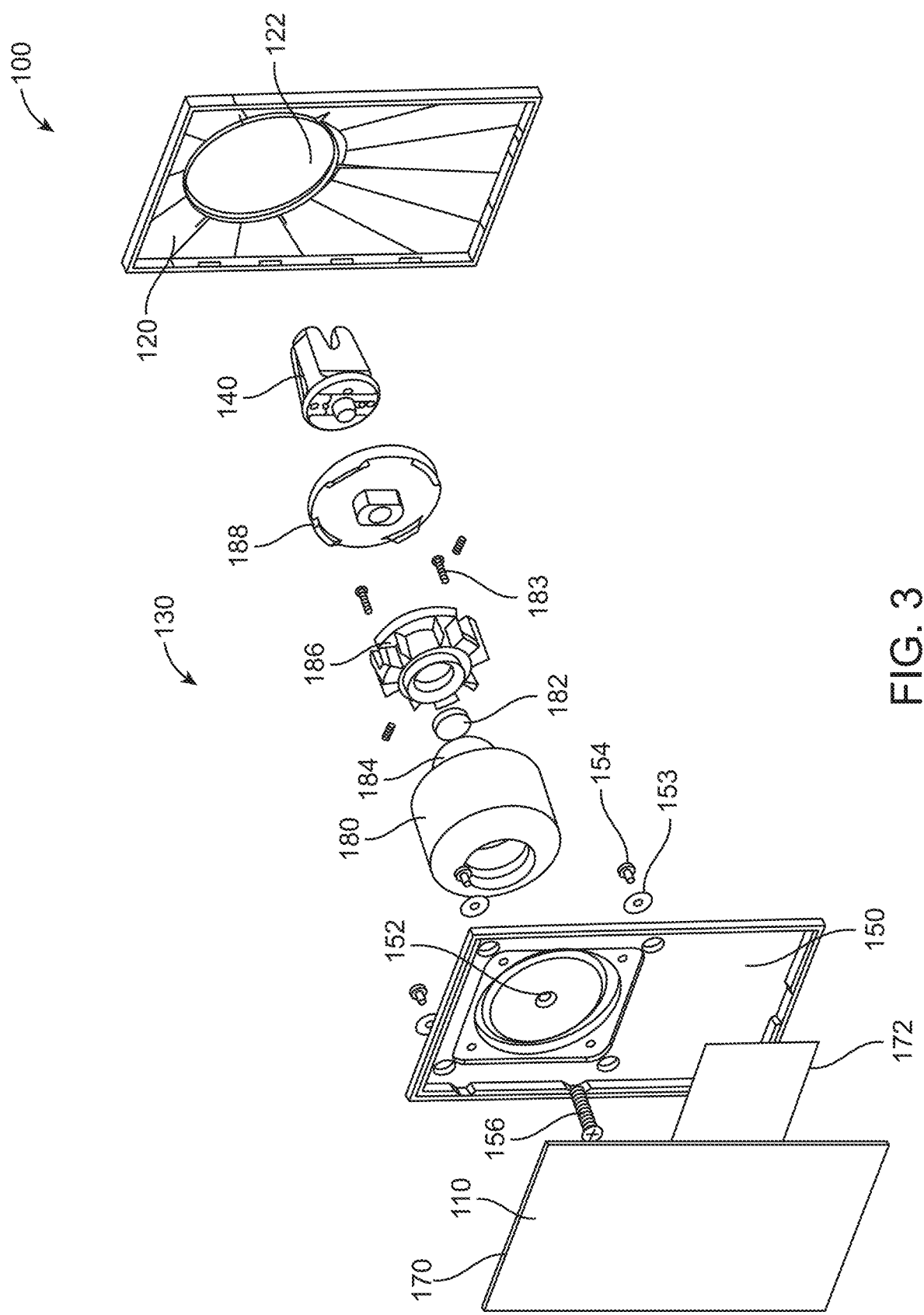
FIG. 3 is an exploded view of the attachment device of FIG. 1.

FIG. 3 is an exploded view of the attachment device of FIG. 1. Attachment device 100 can include contacting surface 110 that can be mated with back plate 170. Back plate 170 can be joined to mid-plate 150 by adhesive or insulating layer 172. Mid-plate 150 can be further attached to back plate 170 with fasteners 154 and washers 153. Fastener 156 can pass through opening 152 in mid-plate 150 and attach to spherical joint portion 184 of stalk 130. A ball joint formed by spherical joint portion 184 and cylindrical joint portion 180 can be included. Spherical joint portion 184 can be held in place in cylindrical joint portion 180. Cylindrical joint portion 180 can rotate and tilt relative to spherical joint portion 184 to allow for the adjustment of a position of a screen of electronic device 290 (shown in FIG. 8A) attached to contacting surface 110. Grip 140 can be attached to plate 188. Plate 188 can be attached to alignment feature 186. Alignment feature 186 can be attached using fasteners 183 to cylindrical joint portion 180. Cover 182 can be attached to alignment feature 186. Opening 122 in front enclosure 120 can provide a passage for grip 140. Front enclosure 120 can be formed of plastic or other material and can cover mid-plate 150 for cosmetic or other purposes.

Figure 4:
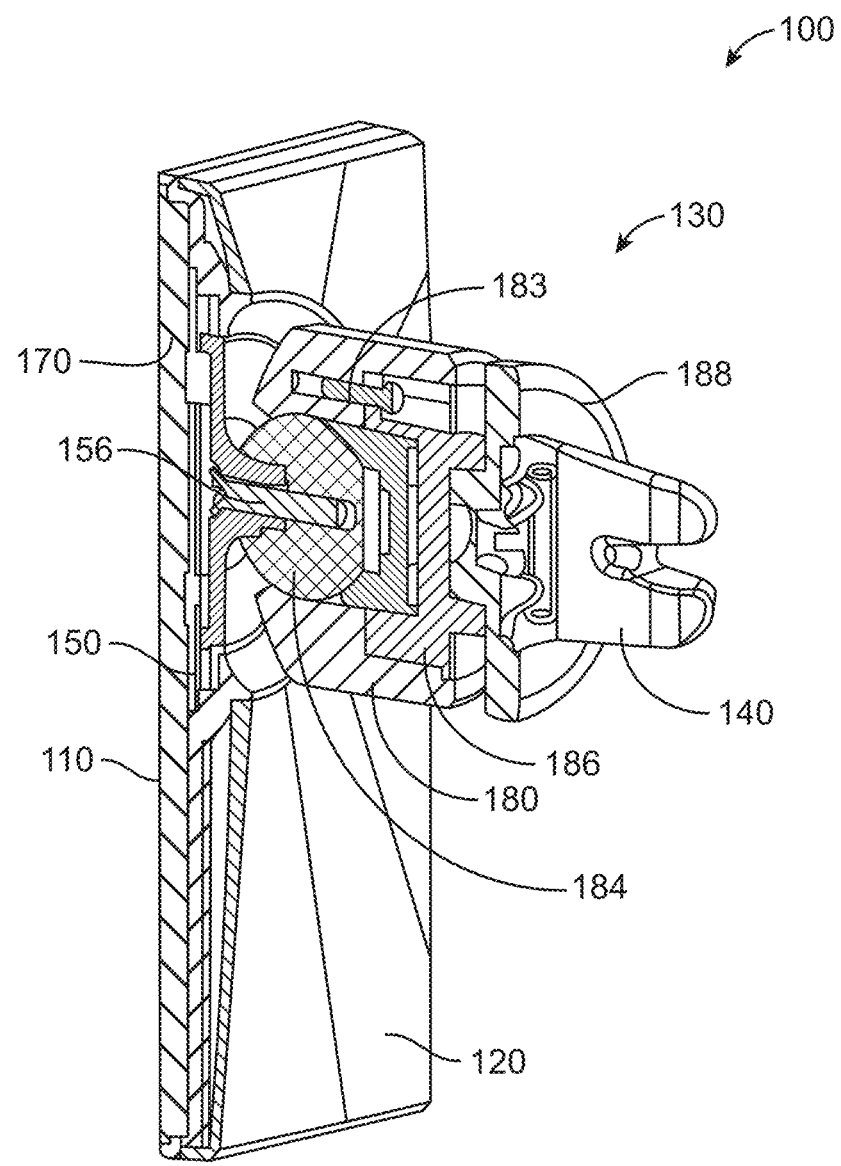
FIG. 4 illustrates a cutaway side view of the attachment device of FIG. 1.

FIG. 4 illustrates a cutaway side view of the attachment device of FIG. 1. Attachment device 100 can include contacting surface 110 that can form an enclosure with back plate 170. Mid-plate 150 can be attached to back plate 170. Fastener 156 can attach mid-plate 150 to spherical joint portion 184 of stalk 130. Spherical joint portion 184 can be held in place in cylindrical joint portion 180. Cylindrical joint portion 180 can rotate and tilt relative to spherical joint portion 184 to allow for the adjustment of a position of a screen (not shown) of electronic device 290 attached to contacting surface 110. Alignment feature 186 can be attached to cylindrical joint portion 180 using fasteners 183. Plate 188 can attach alignment feature 186 to grip 140. Front enclosure 120 can cover a rear surface of mid-plate 150 for cosmetic or other reasons.

Figure 5:
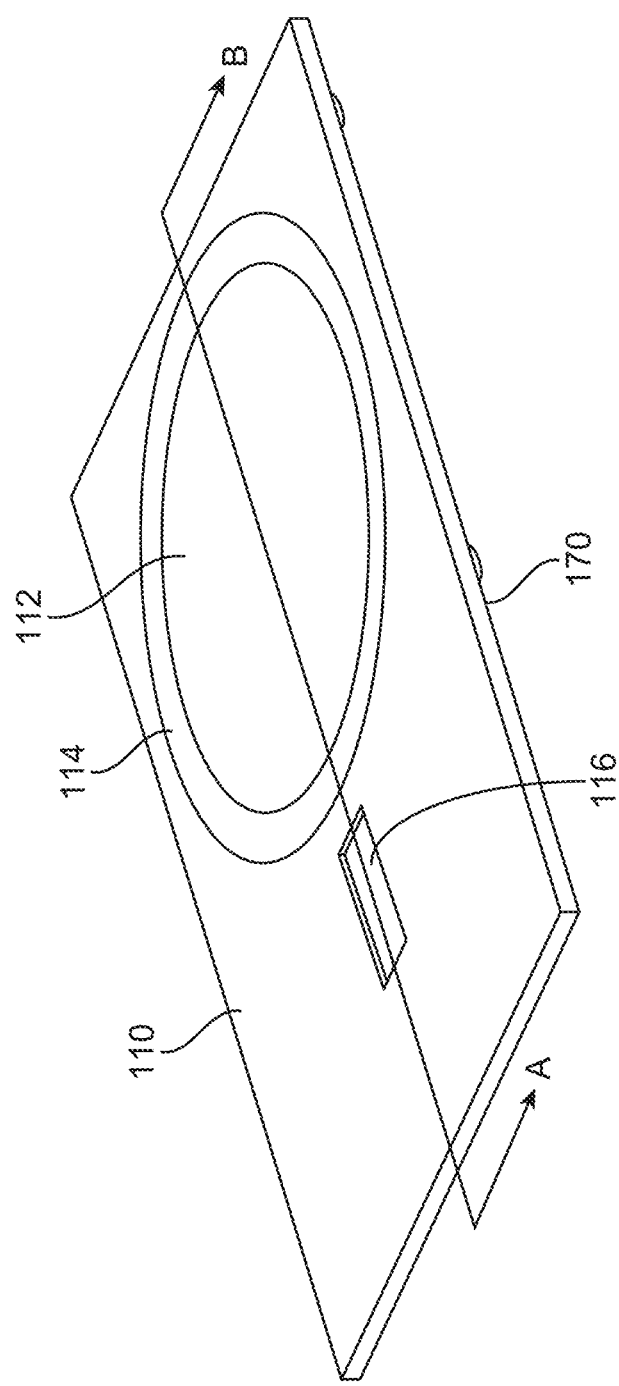
FIG. 5 illustrates a portion of an attachment device according to an embodiment of the present invention.

FIG. 5 illustrates a portion of an attachment device according to an embodiment of the present invention. This portion, which can be referred to as a module, can include contacting surface 110 and back plate 170, where contacting surface 110 and back plate 170 form an enclosure. Region 116 and region 114, which can be thinned, can be located over magnet array 210 and alignment magnets 212 (shown in FIG. 7), respectively. Thinned region 114 can define interior region 112. Region 114 or region 112, or both, can move relative to the other portions of contacting surface 110, as shown in FIG. 39 through FIG. 47 below.

Contacting surface 110 and back plate 170 can provide an enclosure housing magnet array 210, alignment magnets 212, and other components as shown herein to form a module. The resulting module can be used to form attachment device 100 by attaching mid-plate 150, stalk 130, and front enclosure 120 (all shown in FIG. 2.) The resulting module or similar modules can also be used to form other attachment devices, such as the attachment device 300 shown in FIG. 9.

Figure 6:
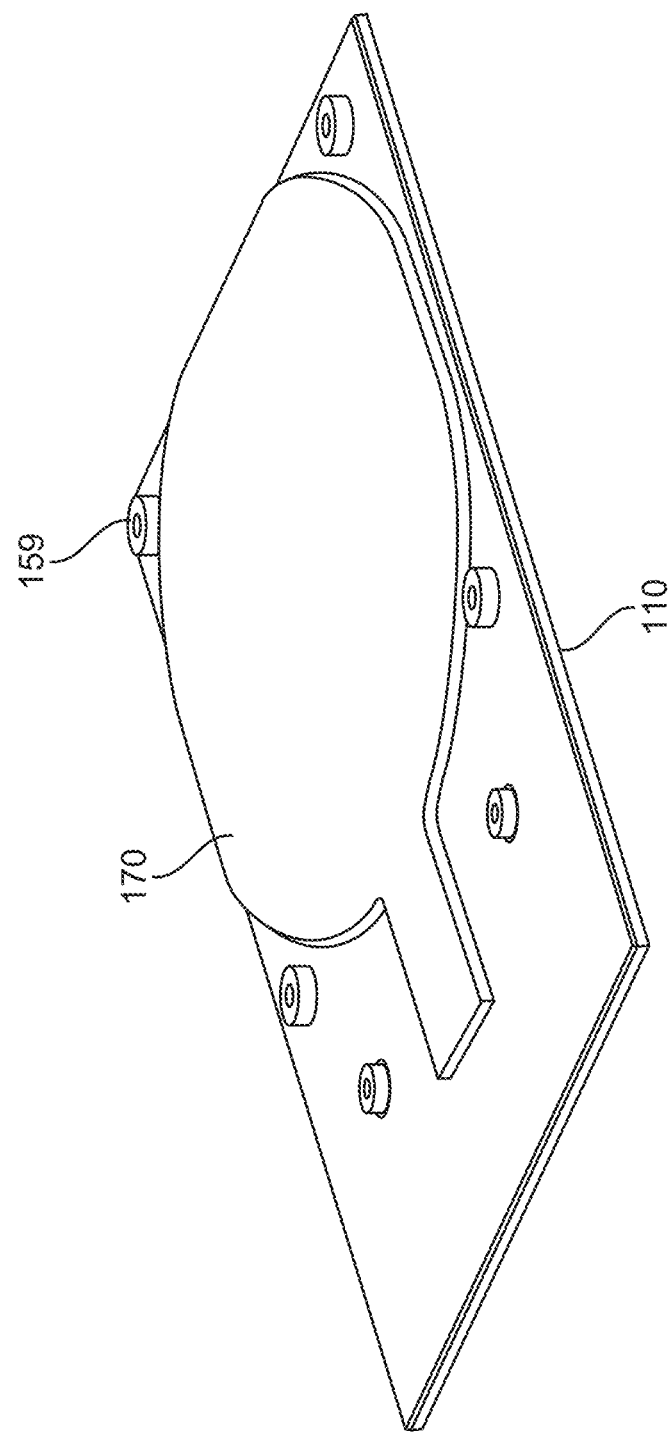
FIG. 6 illustrates an underside of the portion of the attachment device shown in FIG. 5.

FIG. 6 illustrates an underside of the portion of the attachment device shown in FIG. 5. Mid-plate 150 (shown in FIG. 4) can be secured to back plate 170 using fasteners 154 (shown in FIG. 3), which can be screwed into threaded portions 159.

Back plate 170 and contacting surface 110 can house magnet array 210 (shown in FIG. 7.) Magnet array 210 can be fixed in place relative to back plate 170. Alternatively, magnet array 210 can move between at least a first position and a second position. For example, when attachment device is not mated with an electronic device, magnet array 210 can be in the first position away from contacting surface 110.

This can reduce a stray magnetic field at contacting surface 110, which can help to protect magnetically stored information. As electronic device 290 (shown in FIG. 8B) is brought into proximity to attachment device 100, corresponding magnets or magnet array 292 (shown in FIG. 8A and also shown as secondary alignment components 1318 in FIG. 13) in electronic device 290 can attract magnet array 210 in attachment device 100. This attraction can cause the movement of magnet array 210 in attachment device 100 to the second position, which can be closer to contacting surface 110. This change in position can increase the magnetic field between magnet array 210 and corresponding magnets or magnet array 292 in electronic device 290, thereby securing electronic device 290 in place against contacting surface 110 of attachment device 100. Examples of magnet arrays that are fixed as well as examples of magnet arrays that are capable of moving are shown below in FIG. 8A, FIG. 8B, and FIG. 13 through FIG. 50B.

FIG. 7 is an exploded diagram of the portion of an attachment device of FIG. 5. Contacting surface 110 and back plate 170 can form an enclosure supporting magnet array 210 and alignment magnet 212. Magnet array 210 and alignment magnet 212 can be supported by shield 220 and shield 222, respectively. Return plate 230 can be attached to back plate 170. Adhesive layers 240 and 250 can attach back plate 170 to contacting surface 110. Adhesive layer 240 can be a narrow strip or bead that secures an outside edge of contacting surface 110 to back plate 170. Magnet array 210 and shield 220 can move relative to return plate 230 as shown in the following figures. Additionally, other examples that can be used for these components are shown below. For example, the fixed and moving magnets of FIGS. 13 through 50B can be used as magnet array 210 and the other magnet arrays and alignment magnets in these examples.

In these and other embodiments of the present invention, these structures can be formed of various materials in various ways. Contacting surface 110, contacting surface 310 (shown in FIG. 11), or contacting surface 510 (shown in FIG. 12), and the other contacting surfaces shown here or otherwise utilized by an embodiment of the present invention, can be formed of an elastomer, plastic, PVC plastic, rubber, silicon rubber, urethane, polyurethane, nitrile, polycarbonate (PC), neoprene, silicone, or other material. For example, they can be formed of a layer of elastomer, plastic, PVC plastic, rubber, silicon rubber, urethane, polyurethane, nitrile, polycarbonate (PC), neoprene, silicone, or other material over a layer of PC. Back plate 170, mid-plate 150 (shown in FIG. 2), front enclosure 120 (shown in FIG. 2), and the other enclosures, plates, and other enclosure portions, shown here or otherwise utilized by an embodiment of the present invention, can be formed of a metal, such as stainless steel or aluminum, plastic, nylon, or other conductive or nonconductive material. They can be formed using computer numerical control (CNC) or other type of machining, stamping, metal injection molding (MIM), or other technique. Return plate 230, shield 220, and shield 222, can be formed of materials having a high magnetic permeability, such as stainless steel, ferritic stainless steel, oxides of iron, manganese, zinc, or other material or combination of materials. Adhesive layers 240 and 250 can be a pressure-sensitive adhesive, a heat-activated film, or other type of adhesive.

Figure 8A:
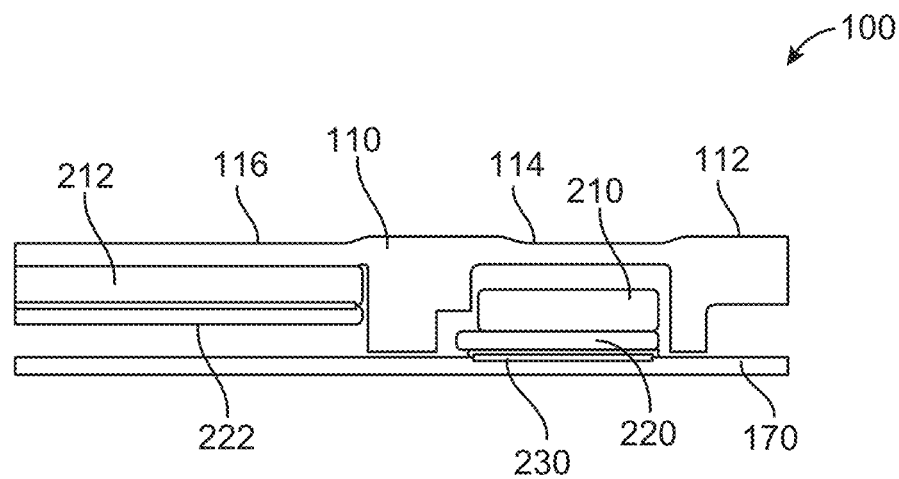
FIGS. 8A and 8B are side views of magnets that can be used in the attachment device of FIG. 1 or in other attachment devices according to embodiments of the present invention.
Figure 8B:
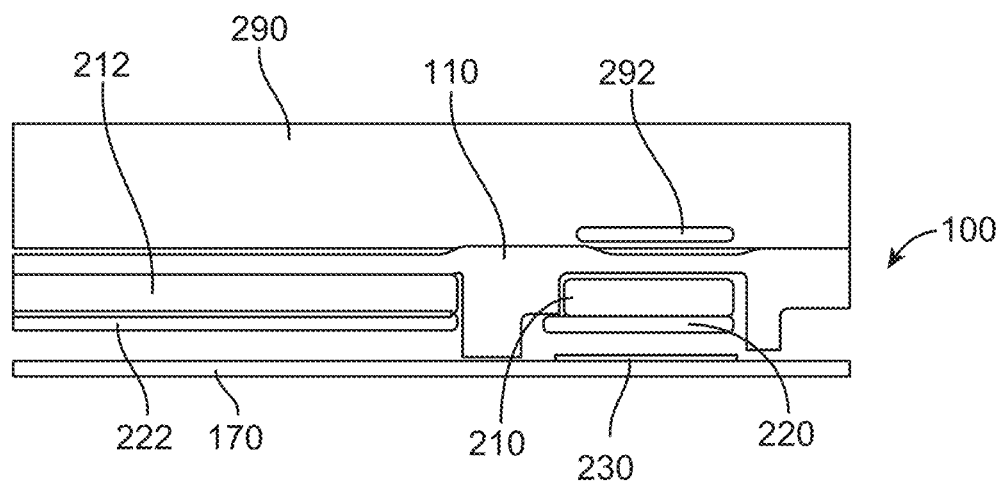

FIGS. 8A and 8B are cross-sections of magnets that can be used in the attachment device of FIG. 1 or in other attachment devices according to embodiments of the present invention. These cross-sections are taken along cut-line A-B shown in FIG. 5. In FIG. 8A, alignment magnet 212 can be attached to shield 222 in attachment device 100. Magnet array 210 can be attached to shield 220. Shield 220 can be magnetically attached to return plate 230. In this configuration, magnetic flux provided at contacting surface 110 by magnet array 210 can be minimized by the position of magnet array 210 away from contacting surface 110. This minimization can help to protect magnetically stored information that might encounter contacting surface 110. Magnet array 210 and alignment magnet 212 can be housed by contacting surface 110 and back plate 170. Contacting surface 110 can include thinned regions 114 and 116, as well as region 112.

In FIG. 8B, corresponding magnet or magnet array 292 of electronic device 290 can attract magnet array 210 and shield 220 in attachment device 100. Shield 220 can separate from return plate 230. Magnet array 210 and shield 220 can move closer to a top surface of contacting surface 110. In this configuration, magnetic flux provided at contacting surface 110 by magnet array 210 can be increased by the position of magnet array 210 being closer to contacting surface 110. This can help to secure electronic device 290 to contacting surface 110 of attachment device 100. Again, alignment magnet 212 can be attached to shield 222, and shield 222 and return plate 230 can be attached to back plate 170.

An electronic device can often operate in a high power consumption mode when it is attached to an attachment device according to an embodiment of the present invention. For example, the electronic device can provide music or navigation instructions. These and other activities can consume a fair amount of power from a battery internal to the electronic device. Accordingly, in these and other embodiments of the present invention, it can be desirable for an attachment device to be able to charge the electronic device. Examples of attachment devices that can charge electronic devices are shown in the following figures.

Figure 9:
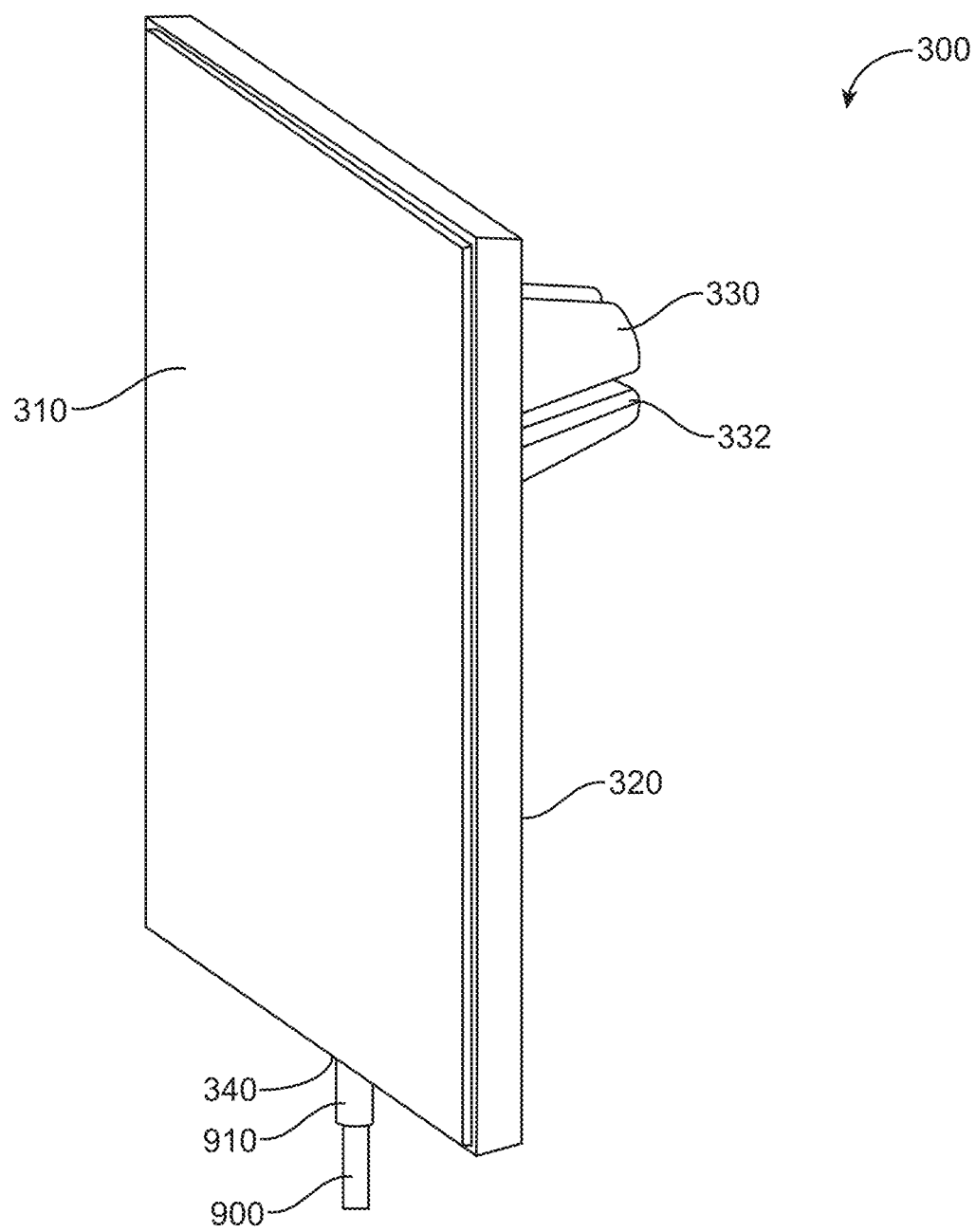
FIG. 9 illustrates another attachment device according to an embodiment of the present invention.

FIG. 9 illustrates another attachment device according to an embodiment of the present invention. Attachment device 300 can include contacting surface 310, front enclosure 320, and grip 330. Grip 330 can include slots 332 to allow grip 330 to attach to a surface or structure in a vehicle or elsewhere. Power and data can be received by attachment device 300 through cable 900. Cable 900 can include connector insert 910 that can plug into connector receptacle 340 in attachment device 300. Alternatively, cable 900 can be directly tethered to internal components or circuitry of attachment device 300. Data can be received or provided by an external device through cable 900 as well. Alternatively, attachment device 300 (or attachment device 500 below, or other attachment device) can include a battery for power, where the battery is charged over cable 900 or wirelessly, for example by placing contacting surface 310 on a surface of a wireless charger.

Connector receptacle 340 can be a universal serial bus (USB) connector, such as a USB Type-C connector, a Lightning™ connector, or other type of connector. Connector receptacle 340 can accept corresponding connector insert 910 of cable 900 through which power and data can be received by attachment device 300 and data can be provided by attachment device 300.

Contacting surface 310 can physically contact electronic device 290 (shown in FIG. 8B.) For example, a backside of electronic device 290 can contact contacting surface 310 of attachment device 300 such that a screen (not shown) of electronic device 290 is visible. Contacting surface 310 can be a high friction or high stiction surface that increases a shear force needed to remove electronic device 290 from attachment device 300. Contacting surface 310 can also be at least somewhat adhesive. This can increase both a normal force and a shear force needed to remove electronic device 290 from attachment device 300. Contacting surface 310 can be formed of an elastomer, plastic, PVC plastic, rubber, silicon rubber, urethane, polyurethane, nitrile, neoprene, silicone, or other material. Contacting surface 310 can be relatively plain as shown, or can include features such as region 112, region 114, or region 116 as with contacting surface 110 (shown in FIG. 1.)

Figure 10:
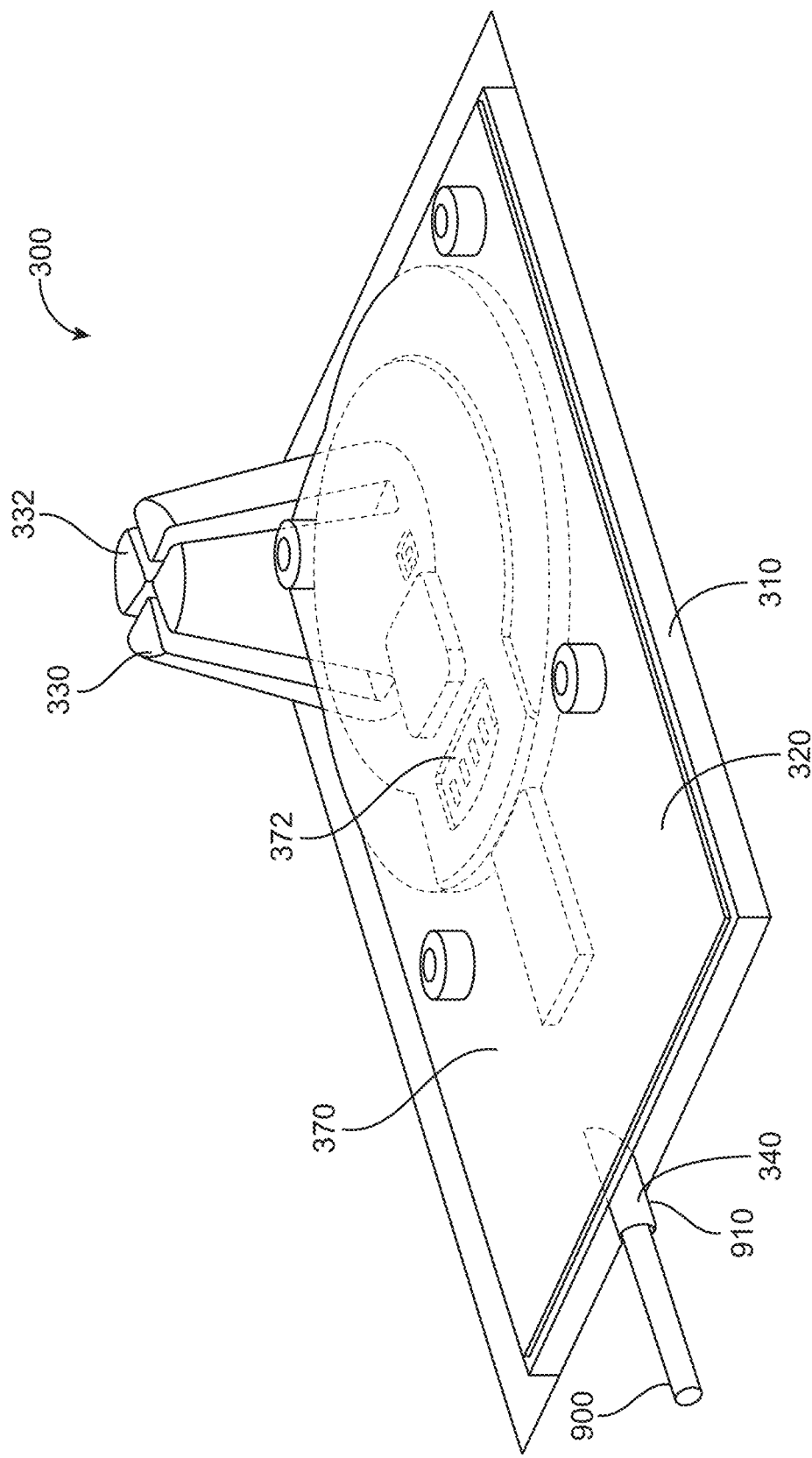
FIG. 10 illustrates a back side of the attachment device of FIG. 9.

FIG. 10 illustrates a back side of the attachment device of FIG. 9. Attachment device 300 can include grip 330 having slots 332. Attachment device 300 can include contacting surface 310, back plate 370, and front enclosure 320. Back plate 370 and contacting surface 310 can form an enclosure to house electrical and magnetic components as shown in the following figure. Electrical access to these components, more specifically to contacts on a back side of control circuitry 440 (shown in FIG. 11) can be gained through connector 372 or cable 900. Connector 372 can be used for testing and programming and might not otherwise be directly accessible during use but can instead be protected by front enclosure 320. Cable 900 can be a tethered cable, or it can connect to attachment device 300 by plugging connector insert 910 into connector receptacle 340.

In this example, back plate 370 and contacting surface 310 can form an enclosure to house electrical and magnetic components as a module as shown in the following figure. Front enclosure 320 and grip 330 can be formed on a surface of back plate 370 by insert molding or other process. Front enclosure 320 and grip 330 can be formed separately or together in a single molding or other process.

Figure 11:
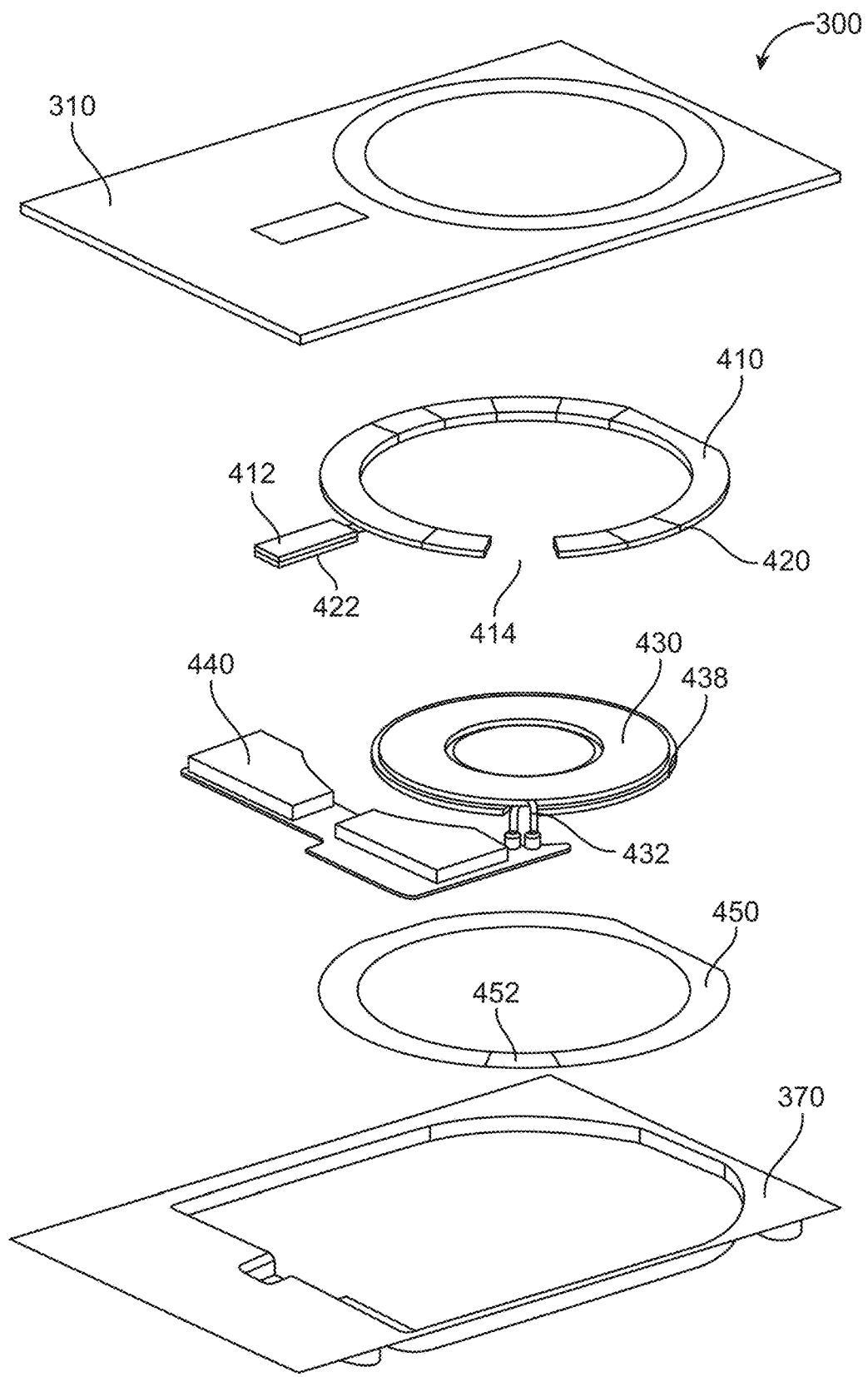
FIG. 11 is an exploded view of a module for the attachment device of FIG. 10.

FIG. 11 is an exploded view of a module for the attachment device of FIG. 10. Attachment device 300 can include an enclosure formed by contacting surface 310 and back plate 370. Magnet array 410 and alignment magnet 412 can be attached to shield 420 and shield 422, respectively. Coil 430 can include leads 432 that can be attached to control circuitry 440. Control circuitry 440 can control charging currents provided to coil 430 through leads 432. Return plate 450 can include nonconductive portion 452 to protect leads 432. Similarly, magnet array 410 and shield 420 can include opening 414 for leads 432. Back plate 370 can be attached to contacting surface 310 to form an enclosure for a module including magnet array 410, alignment magnet 412, shield 420, coil 430, control circuitry 440, and return plate 450. Coil ferrite 438 can magnetically isolate inductive coil 430 from magnet array 410 and to improve inductive coupling between the coil 430 and a corresponding coil (not shown) of a power receiving phone or electronic device 290 (shown in FIG. 8B.) One or more e-shields (not shown) can be included, for example between coil 430 and contacting surface 310, and can be formed of a layer of copper or other conductive material to intercept electric fields between coil 430 and a corresponding coil (not shown) in electronic device 290, and can have a low magnetic permeability to pass magnetic fields between coil 430 and the corresponding coil. Such an e-shield can include breaks to prevent the formation of eddy currents.

In this example, the resulting module can be included in a completed attachment device by including portions such as stalk 130 and front enclosure 120 (shown in FIG. 2), by including portions such as front enclosure 320 and grip 330 (shown in FIG. 10), or by including other portions that can be used to attach the module to a surface of structure in a vehicle or other conveyance or location.

These attachment device enclosures can further house near-field communication circuitry and components, such as a near-field communication tag and capacitors. The near-field communication circuitry and components can allow an electronic device to detect the attachment device. This recognition can prompt the electronic device to perform one or more activities. For example, the electronic device can launch one or more applications in response to this recognition. Various software and control features can be implemented in these and other embodiments of the present invention. The software and control features can be implemented in an attachment device, an electronic device attached to the attachment device, or in other devices associated with the electronic device or a vehicle to which the attachment device is attached, by circuitry or components in an area surrounding the attachment device or elsewhere, or by a combination of these. An example of a module for an attachment device that includes near-field communications components is shown in the following figure.

FIG. 12 is an exploded view of another module for an attachment device according to an embodiment of the present invention. Attachment device 500 can include an enclosure formed of contacting surface 510 and back plate 570. Attachment device 500 can further include a stalk or other attachment structure (not shown). For example, attachment device 500 can include stalk 130 or grip 330, as shown in the above examples.

Attachment device 500 can enclose a transmitter including near-field communications components 650. Near-field communications components 650 can include a tag, capacitor, and support ring. A magnetometer or other sensor (not shown) in an electronic device 290 (shown in FIG. 8B) can sense magnet array 610 in attachment device 500. In response, electronic device 290 can activate its own internal receiver near-field communications components and circuitry (not shown) to generate a radio-frequency field. Near-field communications components 650 in attachment device 500 can modulate this radio-frequency field to transmit data back to the receiver in electronic device 290. The modulated radio-frequency field can be read by the near field communications components and circuitry in electronic device 290. Electronic device 290 can then determine that it is mounted on attachment device 500. Once this determination is been made, electronic device 290 can enter an appropriate mode.

Attachment device 500 can further include contacting surface 510 attached to back plate 570 with adhesive 512. Contacting surface 510 and back plate 570 can form an enclosure to house magnet array 610 and alignment magnets 612 as a module. Shield 620 and shield 622 can be provided for magnet array 610 and alignment magnet 612. Shield 620 can be attached to back plate 570 by adhesive 616. Alignment magnet 612 can be attached to back plate 570 by adhesive 618. Coil 630 and control circuitry 660 can provide charging currents to electronic device 290. Coil 630 can be supported by coil ferrite 638. Coil ferrite 638 and bottom ferrite 640 can provide shielding for coil 630. Coil ferrite 638 can magnetically isolate inductive coil 630 from magnet array 610 and to improve inductive coupling between the coil 630 and a corresponding coil (not shown) of a power receiving phone or electronic device 290. Bottom ferrite 640 can be attached to coil 630 with adhesive layer 642 and to back plate 570 with adhesive layer 644. Control circuitry 660 can be attached to back plate 570 with adhesive 662. One or more e-shields (not shown) can be included, for example between coil 630 and contacting surface 510, and can be formed of a layer of copper or other conductive material to intercept electric fields between coil 630 and a corresponding coil (not shown) in electronic device 290 (shown in FIG. 8B), and can have a low magnetic permeability to pass magnetic fields between coil 630 and the corresponding coil. Such an e-shield can include breaks to prevent the formation of eddy currents.

In this example, the resulting module can be included in a completed attachment device by including portions such as stalk 130 and front enclosure 120 (shown in FIG. 2), by including portions such as front enclosure 320 and grip 330 (shown in FIG. 10), or by including other portions that can be used to attach the module to a surface of structure in a vehicle or other conveyance or location.

These circuits and components can allow attachment devices 100, 300, and 500 to provide power to an attached electronic device, such as electronic device 290 (shown in FIG. 8B.) They can also allow attachment devices 100, 300, and 500 to receive data from electronic device 290. They can also allow attachment devices 100, 300, and 500 to provide data to electronic device 290. They can also allow the electronic device to detect that the electronic device 290 is attached to an attachment device, such as attachment device 100, 300, or 500. One or more of these functions can be compatible with various specifications or protocols, such as the Qi wireless charging and data protocol or an NFC standard, such as ISO/IEC 14443, or with other standards or protocols that are currently available or are being developed.

For example, power can be received by attachment device 300 (or attachment devices 100 or 500) via a cable 900 and provide to an electronic device, such as electronic device 290. This received power can be an AC voltage that is converted to a DC voltage, or it can be a DC voltage. Control circuitry 440 can provide an alternating current to coil 430. This current can generate a time-varying magnetic flux that can induce currents in a corresponding coil in electronic device 290. These induced currents can be used to charge a battery in electronic device 290.

Also, data can be received by attachment device 500 (or attachment devices 100 or 300) from an electronic device, such as electronic device 290. For example, control circuitry (not shown) in electronic device 290 (shown in FIG. 8B) can generate a current in the corresponding coil. This current can be modulated to convey data. The current can be modulated in amplitude, phase, or frequency. The current can induce a current in coil 430, from which data can be read by control circuitry 440. The read data can be used by attachment device 300, or sent to another electronic device via cable 900.

Similarly, data can be provided by attachment device 300 (or attachment devices 100 or 500) to the electronic device. Control circuitry 440 can receive data, either from attachment device 300 itself, or from an external source (not shown) via the cable 900. Control circuitry 440 can modulate a current provided to coil 430. This current can be modulated in amplitude, phase, or frequency. The current can induce a current in the corresponding coil in the electronic device, from which the data can be read by an electronic device, such as electronic device 290.

The electronic device 290 can detect that the electronic device 290 is attached to an attachment device, such as attachment device 100, 300, or 500. A magnetometer or other sensor (not shown) in electronic device 290 can sense magnet array 410 in attachment device 500 (as an example.) In response, electronic device 290 can activate a receiver including internal near-field communications components and circuitry (not shown) to generate a radio-frequency field.

A transmitter, such as near-field communications components 650 in attachment device 500 (or attachment device 100 or attachment device 300) can modulate this radio-frequency field. The modulated radio-frequency field can be read by the near field communications components and circuitry in electronic device 290. Electronic device 290 can then determine that it is mounted on attachment device 500.

Embodiments of the present invention can provide attachment devices having various combinations of the components and features described herein. For example, an attachment device, such as attachment device 100 (shown in FIG. 1, or attachment device 300 or attachment device 500), can include a magnet array, such as magnet array 210. This attachment device can further include an alignment magnet, such as alignment magnet 212. A coil and electronics, such as coil, 430 and control circuitry 440, can be included in an alignment device, such as attachment device 300 (shown in FIG. 11.) Near-field communication circuitry, such as near-field communication components 650, can be included as well, either with or without a coil and circuitry, such as coil 630 and control circuitry 660 in an attachment device, such as attachment device 500 (shown in FIG. 12, (or attachment device 100 or attachment device 300).)

While a phone or electronic device is not shown in many of the examples, such a phone or electronic device is partially explained in the context of electronic device 290 (shown in FIG. 8B), electronic device 1304 (shown in FIG. 13), electronic device 5414 (shown in FIG. 54) and the other electronic devices shown herein.

In these and other embodiments of the present invention, these structures can be formed of various materials in various ways. Some or all of each contacting surface 110, 310, 510, or other contacting surface shown here, or otherwise utilized by an embodiment of the present invention, can be formed of an elastomer, plastic, PVC plastic, rubber, silicon rubber, urethane, polyurethane, nitrile, polycarbonate, neoprene, silicone, or other material. The plates, such as mid-plate 150, back plate 170, front enclosure 120, and other enclosure and housing portions, shown here or otherwise utilized by an embodiment of the present invention, can be formed of a metal, such as stainless steel or aluminum, plastic, nylon, or other conductive or nonconductive material, such as a plastic. They can be formed using computer numerical control (CNC) or other type of machining, stamping, metal injection molding (MIM), or other technique. Coil ferrite 438, coil ferrite 638, bottom ferrite 640, and other ferritic portions incorporated by embodiments of the present invention can be formed of a material that has high magnetic permeability, such as stainless steel, ferritic stainless steel, oxides of iron, manganese, zinc, or other material or combination of materials. One or more e-shields (not shown) can be included, and can be formed of a layer of copper or other conductive material to intercept electric fields between a coil, such as coil 430 or coil 630, in an attachment device and a corresponding coil (not shown) in an electronic device, such as electronic device 290 (shown in FIG. 8B), and can have a low magnetic permeability to pass magnetic fields between coil 430 or coil 630 and the corresponding coil. An e-shield can include breaks to prevent the formation of eddy currents. The control circuits, such a control circuitry 440 or control circuitry 660, can be located on boards that can be formed of FR-4 or other material. Adhesive layers used here can be formed of a pressure-sensitive adhesive, a heat-activated film, or other type of adhesive.

In these and other embodiments of the present invention, portions of the attachment devices can be conductive. These conductive portions, such as shields, return plates, back-plates, and other portions can be formed using stamping, forging, metal-injection molding, 3-D printing, CNC or other machining, or other manufacturing process. They can be formed of a material that has high magnetic permeability, such as stainless steel, ferritic stainless steel, oxides of iron, manganese, zinc, or other material or combination of materials. Alternately, the can be formed of a material having a low magnetic permeability, such as copper, aluminum, or other material.

In these and other embodiments of the present invention, portions of the attachment devices can be nonconductive. These nonconductive portions, such as an enclosure for the attachment portion, stalk, a contacting surface, and other nonconductive portions, can be formed using injection or other molding, 3-D printing, machining, or other manufacturing process. They can be formed of silicon or silicone, rubber, hard rubber, plastic, nylon, liquid-crystal polymers (LCPs), or other nonconductive material or combination of materials. The boards can be formed of FR-4 or other material.

These and other embodiments of the present invention can provide attachment devices that can be used to secure various types of devices, such as portable computing devices, tablet computers, desktop computers, laptop computers, all-in-one computers, cell phones, wearable-computing devices, storage devices, portable media players, navigation systems, monitors, power supplies, adapters, remote control devices, audio devices, chargers, and other devices in place in a vehicle or other conveyance, such as a train or plane, or other fixed or mobile location.

While embodiments of the present invention are well-suited to providing attachment device between phones and vehicles, they can be used in other types of applications as well. For example, embodiments of the present invention can provide attachment devices that can be used between tablet computers and vehicles, or between phones or tablets and other structures.

Described herein are various embodiments of magnetic alignment systems and components thereof. The magnetic alignment systems shown below can be used as magnet array 210 and alignment magnet 212, as magnet array 410 and alignment magnet 412, and as magnet array 610 and alignment magnet 612, or as other magnet arrays and alignment magnets in other embodiments of the present invention. A magnetic alignment system can include annular alignment components comprising a ring of magnets having a particular magnetic orientation or pattern of magnetic orientations such that a "primary" annular alignment component can attract and hold a complementary "secondary" annular alignment component. In some embodiments described below, the primary annular alignment component is assumed to be in an attachment device (such as attachment device 100, attachment device 300, attachment device 500, or other attachment device according to an embodiment of the present invention), which can be wireless charging device, and which might or might not surround an inductive charging coil, while the secondary annular alignment component is assumed to be in a portable electronic device, which might or might not surround a receiver coil that can receive power from the inductive charging coil of the wireless charging device. Many variations are possible; for instance, a "primary" annular alignment component can be in a portable electronic device while a "secondary" annular alignment component can be in an attachment device, which can be wireless charging device. Also possible are "auxiliary" annular alignment components that are complementary to the primary and secondary annular alignment components such that one surface of the auxiliary annular alignment component is attracted to the primary alignment component while the opposite surface is attracted to the secondary alignment component. An auxiliary annular alignment component can be disposed, e.g., in a case for a portable electronic device.

In some embodiments, a magnetic alignment system can also include a rotational alignment component that facilitates aligning two devices in a preferred rotational orientation. It should be understood that any device that has an annular alignment component might or might not also have a rotational alignment component.

In some embodiments, a magnetic alignment system can also include an near-field communication (NFC) coil and supporting circuitry to allow devices to identify themselves to each other using an NFC protocol. NFC coils can be disposed inboard of the annular alignment component or outboard of the annular alignment component. It should be understood that an NFC component is optional in the context of providing magnetic alignment.

Figure 13:
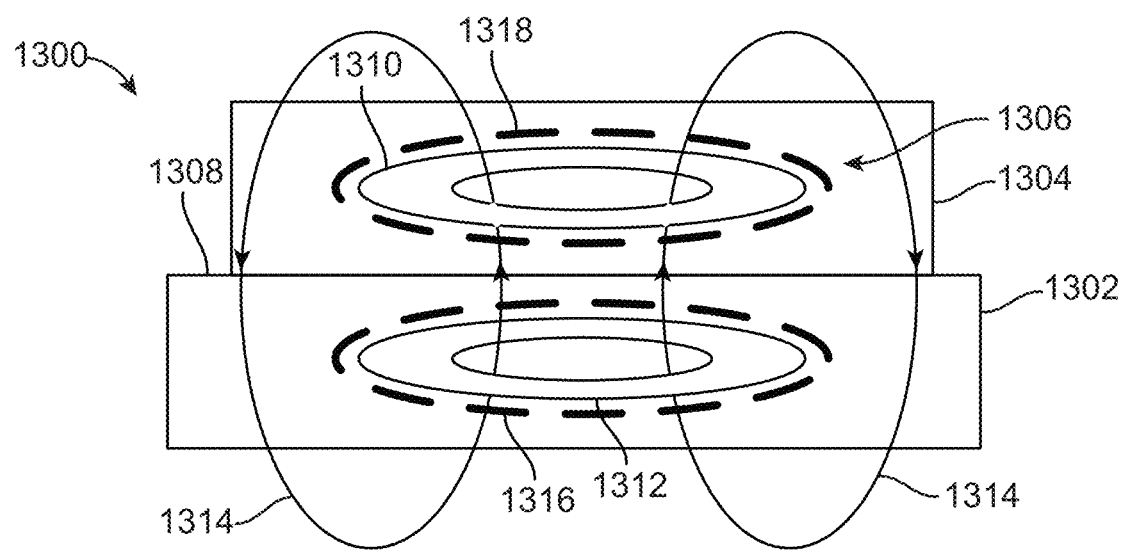
FIG. 13 shows a simplified representation of a wireless charging system incorporating a magnetic alignment system according to some embodiments.

FIG. 13 shows a simplified representation of a wireless charging system 1300 incorporating a magnetic alignment system 1306 according to some embodiments. A portable electronic device 1304 is positioned on a charging surface 1308 of a wireless charging device 1302. Portable electronic device 1304 can be a consumer electronic device, such as a smart phone, tablet, wearable device, or the like, or any other electronic device for which wireless charging is desired. Wireless charging device 1302 can be any device that is configured to generate time-varying magnetic flux to induce a current in a suitably configured receiving device. For instance, wireless charging device 1302 can be an attachment device, such as attachment device 100, attachment device 300, attachment device 500, or other attachment device consistent with an embodiment of the present invention, wireless charging mat, puck, docking station, or the like. Wireless charging device 1302 can include or have access to a power source such as battery power or standard AC power.

To enable wireless power transfer, portable electronic device 1304 and wireless charging device 1302 can include inductive coils 1310 and 1312, respectively, which can operate to transfer power between them. For example, inductive coil 1312 can be a transmitter coil that generates a time-varying magnetic flux 1314, and inductive coil 1310 can be a receiver coil in which an electric current is induced in response to time-varying magnetic flux 1314. The received electric current can be used to charge a battery of portable electronic device 1304, to provide operating power to a component of portable electronic device 1304, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 1312 and 1310. According to some embodiments, magnetic alignment system 1306 can provide such alignment. In the example shown in FIG. 13, magnetic alignment system 1306 includes a primary magnetic alignment component 1316 disposed within or on a surface of wireless charging device 1302 and a secondary magnetic alignment component 1318 disposed within or on a surface of portable electronic device 1304. Primary alignment components 1316 and secondary alignment components 1318 are configured to magnetically attract one another into an aligned position in which inductive coils 1310 and 1312 are aligned with one another to effectuate wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

In this example, portable electronic device 1304 can be a phone or other electronic device. Wireless charging device 1302 can be an attachment device such as attachment device 100, attachment device 300, or attachment device 500. Primary alignment components 1316 can be used as magnet array 210, magnet array 410, magnet array 610, or as a magnet array in other embodiments of the present invention. Charging surface 1308 can be used as contacting surface 110, contacting surface 310, or contacting surface 510. Inductive coil 1312 can be optional where wireless charging device 1302 is used as an attachment device such as attachment device 100. Inductive coil 1312 can be used as coil 430, coil 630, or other coil in these and other embodiments of the present invention.

Figure 14A:
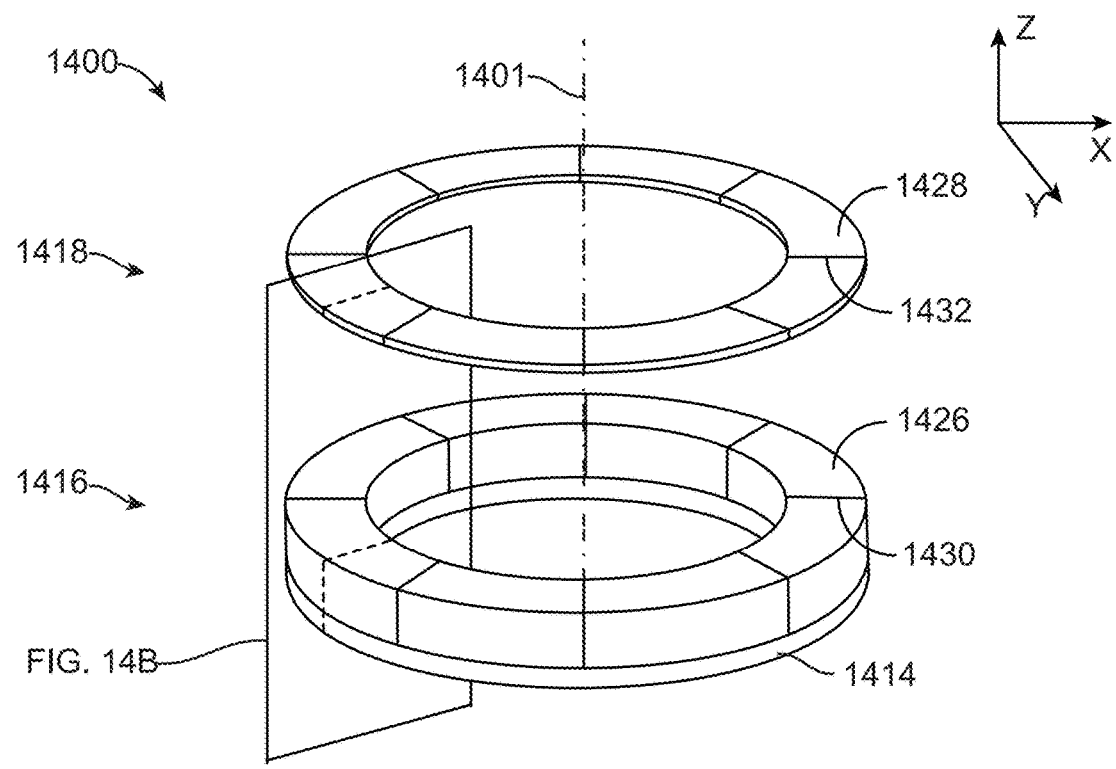
FIG. 14A shows a perspective view of a magnetic alignment system according to some embodiments.
Figure 14B:
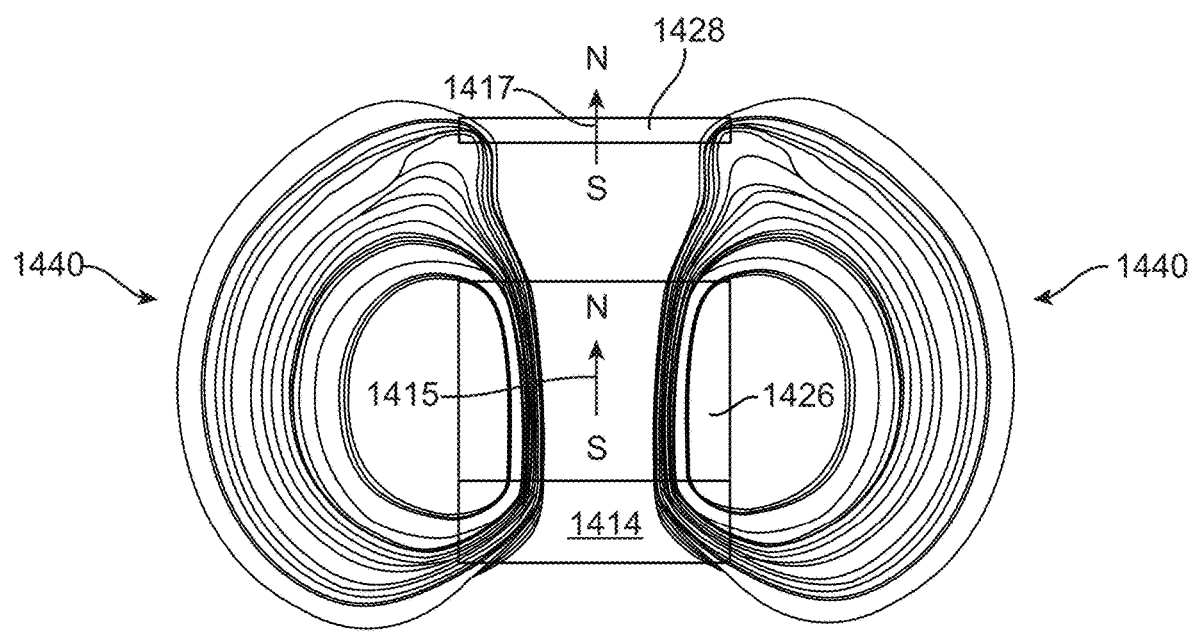
FIG. 14B shows a cross-section through the magnetic alignment system of FIG. 14A.

FIG. 14A shows a perspective view of a magnetic alignment system 1400 according to some embodiments, and FIG. 14B shows a cross-section through magnetic alignment system 1400 across the cut plane indicated in FIG. 14A. Magnetic alignment system 1400 can be an implementation of magnetic alignment system 1306 of FIG. 13. In magnetic alignment system 1400, the alignment components all have magnetic polarity oriented in the same direction (along the axis of the annular configuration.) For convenience of description, an "axial" direction (also referred to as a "longitudinal" or "z" direction) is defined to be parallel to an axis of rotational symmetry 1401 of magnetic alignment system 1400, and a transverse plane (also referred to as a "lateral" or "x" or "y" direction) is defined to be normal to axis 1401. The term "proximal side" is used herein to refer to a side of one alignment component that is oriented toward the other alignment component when the magnetic alignment system is aligned, and the term "distal side" is used to refer to a side opposite the proximal side.

As shown in FIG. 14A, magnetic alignment system 1400 can include a primary alignment component 1416 (which can be an implementation of primary alignment component 1316 of FIG. 13) and a secondary alignment component 1418 (which can be an implementation of secondary alignment component 1318 of FIG. 13). Primary alignment component 1416 and secondary alignment component 1418 have annular shapes and may also be referred to as "annular" alignment components. The particular dimensions can be chosen as desired. In some embodiments, primary alignment component 1416 and secondary alignment component 1418 can each have an outer diameter of about 174 mm and a radial width of about 6 mm. The outer diameters and radial widths of primary alignment component 1416 and secondary alignment component 1418 need not be exactly equal. For instance, the radial width of secondary alignment component 1418 can be slightly less than the radial width of primary alignment component 1416 and/or the outer diameter of secondary alignment component 1418 can also be slightly less than the radial width of primary alignment component 1416 so that, when in alignment, the inner and outer sides of primary alignment component 1416 extend beyond the corresponding inner and outer sides of secondary alignment component 1418. Thicknesses (or axial dimensions) of primary alignment component 1416 and secondary alignment component 1418 can also be chosen as desired. In some embodiments, primary alignment component 1416 has a thickness of about 1.5 mm while secondary alignment component 1418 has a thickness of about 0.37 mm.

Primary alignment component 1416 can include a number of sectors, each of which can be formed of one or more primary arcuate magnets 1426, and secondary alignment component 1418 can include a number of sectors, each of which can be formed of one or more secondary arcuate magnets 1428. In the example shown, the number of primary magnets 1426 is equal to the number of secondary magnets 1428, and each sector includes exactly one magnet, but this is not required. Primary magnets 1426 and secondary magnets 1428 can have arcuate (or curved) shapes in the transverse plane such that when primary magnets 1426 (or secondary magnets 1428) are positioned adjacent to one another end-to-end, primary magnets 1426 (or secondary magnets 1428) form an annular structure as shown. In some embodiments, primary magnets 1426 can be in contact with each other at interfaces 1430, and secondary magnets 1428 can be in contact with each other at interfaces 1432. Alternatively, small gaps or spaces may separate adjacent primary magnets 1426 or secondary magnets 1428, providing a greater degree of tolerance during manufacturing.

In some embodiments, primary alignment component 1416 can also include an annular shield 1414 disposed on a distal surface of primary magnets 1426. In some embodiments, shield 1414 can be formed as a single annular piece of material and adhered to primary magnets 1426 to secure primary magnets 1426 into position. Shield 1414 can be formed of a material that has high magnetic permeability, such as stainless steel, and can redirect magnetic fields to prevent them from propagating beyond the distal side of primary alignment component 1416, thereby protecting sensitive electronic components located beyond the distal side of primary alignment component 1416 from magnetic interference.

Primary magnets 1426 and secondary magnets 1428 can be made of a magnetic material such as an NdFeB material, other rare earth magnetic materials, or other materials that can be magnetized to create a persistent magnetic field. Each primary magnet 1426 and each secondary magnet 1428 can have a monolithic structure having a single magnetic region with a magnetic polarity aligned in the axial direction as shown by magnetic polarity indicators 1415, 1417 in FIG. 14B. For example, each primary magnet 1426 and each secondary magnet 1428 can be a bar magnet that has been ground and shaped into an arcuate structure having an axial magnetic orientation. (As will be apparent, the term "magnetic orientation" refers to the direction of orientation of the magnetic polarity of a magnet.) In the example shown, primary magnet 1426 has its north pole oriented toward the proximal surface and south pole oriented toward the distal surface while secondary magnet 1428 has its south pole oriented toward the proximal surface and north pole oriented toward the distal surface. In other embodiments, the magnetic orientations can be reversed such that primary magnet 1426 has its south pole oriented toward the proximal surface and north pole oriented toward the distal surface while secondary magnet 1428 has its north pole oriented toward the proximal surface and south pole oriented toward the distal surface.

As shown in FIG. 14B, the axial magnetic orientation of primary magnet 1426 and secondary magnet 1428 can generate magnetic fields 1440 that generate an attractive force between primary magnet 1426 and secondary magnet 1428, thereby facilitating alignment between respective electronic devices in which primary alignment component 1416 and secondary alignment component 1418 are disposed (e.g., as shown in FIG. 13). While shield 1414 can redirect some of magnetic fields 1440 away from regions below primary magnet 1426, magnetic fields 1440 may still propagate to regions laterally adjacent to primary magnet 1426 and secondary magnet 1428. In some embodiments, the lateral propagation of magnetic fields 1440 may result in magnetic field leakage to other magnetically sensitive components. For instance, if an inductive coil having a ferromagnetic shield is placed in the interior region of annular primary alignment component 1416 (or secondary alignment component 1418), leakage of magnetic fields may 1440 may saturate the ferrimagnetic shield, which can degrade wireless charging performance.

It will be appreciated that magnetic alignment system 1400 is illustrative and that variations and modifications are possible. For instance, while primary alignment component 1416 and secondary alignment component 1418 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 1416 and/or secondary alignment component 1418 can each be formed of a single, monolithic annular magnet; however, segmenting magnetic alignment components 1416 and 1418 into arcuate magnets may improve manufacturing because smaller arcuate segments are less brittle than a single, monolithic annular magnet and are less prone to yield loss due to physical stresses imposed on the magnetic material during manufacturing.

As noted above with reference to FIG. 14B, a magnetic alignment system with a single axial magnetic orientation may allow lateral leakage of magnetic fields, which may adversely affect performance of other components of an electronic device. Accordingly, some embodiments provide magnetic alignment systems with reduced magnetic field leakage. Examples will now be described.

Figure 15A:
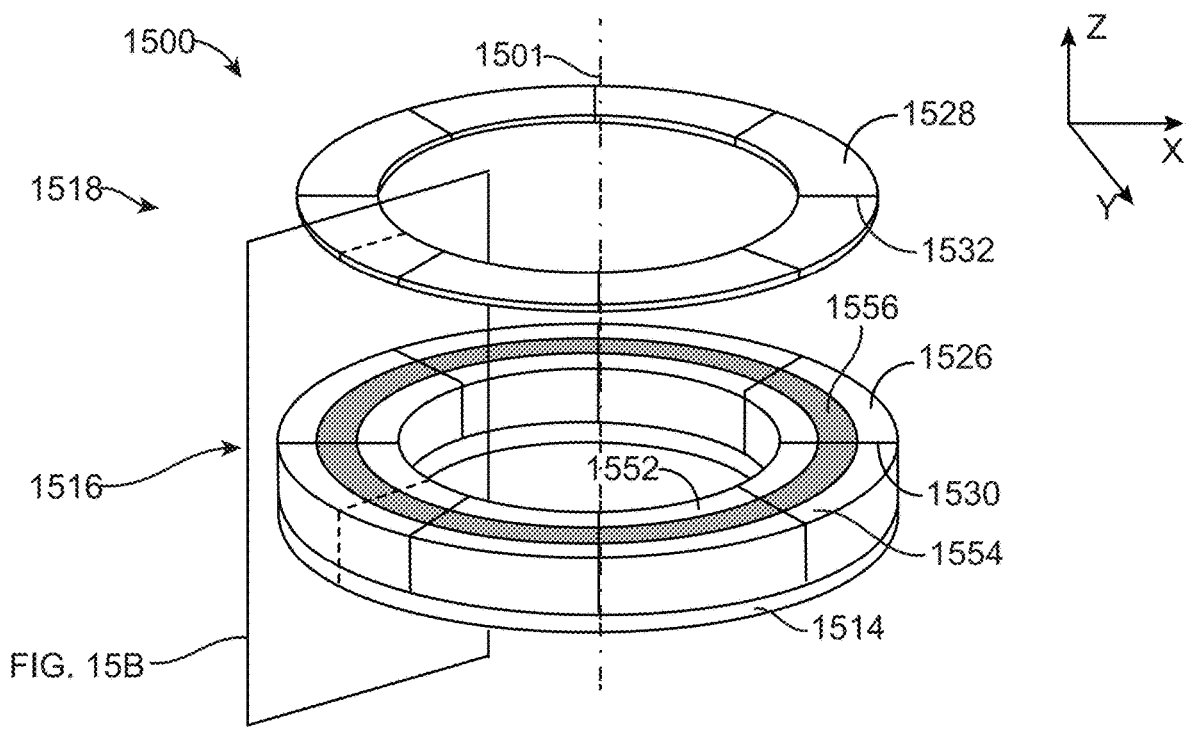
FIG. 15A shows a perspective view of a magnetic alignment system according to some embodiments.
Figure 15B:
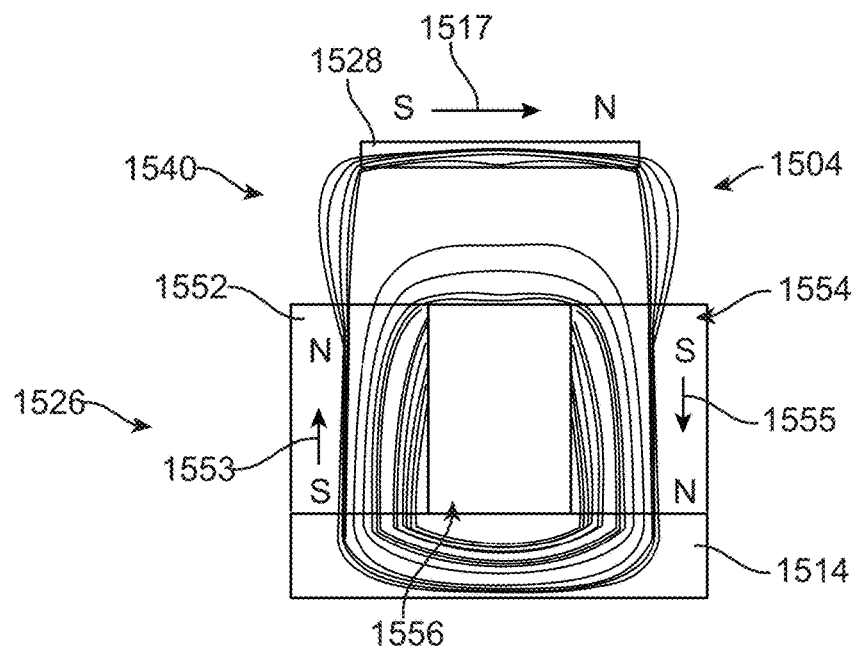
FIG. 15B shows a cross-section through the magnetic alignment system of FIG. 15A.

FIG. 15A shows a perspective view of a magnetic alignment system 1500 according to some embodiments, and FIG. 15B shows a cross-section through magnetic alignment system 1500 across the cut plane indicated in FIG. 15A. Magnetic alignment system 1500 can be an implementation of magnetic alignment system 1306 of FIG. 13. In magnetic alignment system 1500, the alignment components have magnetic components configured in a "closed loop" configuration as described below.

As shown in FIG. 15A, magnetic alignment system 1500 can include a primary alignment component 1516 (which can be an implementation of primary alignment component 1316 of FIG. 13) and a secondary alignment component 1518 (which can be an implementation of secondary alignment component 1318 of FIG. 13). Primary alignment component 1516 and secondary alignment component 1518 have annular shapes and may also be referred to as "annular" alignment components. The particular dimensions can be chosen as desired. In some embodiments, primary alignment component 1516 and secondary alignment component 1518 can each have an outer diameter of about 174 mm and a radial width of about 6 mm. The outer diameters and radial widths of primary alignment component 1516 and secondary alignment component 1518 need not be exactly equal. For instance, the radial width of secondary alignment component 1518 can be slightly less than the radial width of primary alignment component 1516 and/or the outer diameter of secondary alignment component 1518 can also be slightly less than the radial width of primary alignment component 1516 so that, when in alignment, the inner and outer sides of primary alignment component 1516 extend beyond the corresponding inner and outer sides of secondary alignment component 1518. Thicknesses (or axial dimensions) of primary alignment component 1516 and secondary alignment component 1518 can also be chosen as desired. In some embodiments, primary alignment component 1516 has a thickness of about 1.5 mm while secondary alignment component 1518 has a thickness of about 0.37 mm.

Primary alignment component 1516 can include a number of sectors, each of which can be formed of a number of primary magnets 1526, and secondary alignment component 1518 can include a number of sectors, each of which can be formed of a number of secondary magnets 1528. In the example shown, the number of primary magnets 1526 is equal to the number of secondary magnets 1528, and each sector includes exactly one magnet, but this is not required; for example, as described below a sector may include multiple magnets. Primary magnets 1526 and secondary magnets 1528 can have arcuate (or curved) shapes in the transverse plane such that when primary magnets 1526 (or secondary magnets 1528) are positioned adjacent to one another end-to-end, primary magnets 1526 (or secondary magnets 1528) form an annular structure as shown. In some embodiments, primary magnets 1526 can be in contact with each other at interfaces 1530, and secondary magnets 1528 can be in contact with each other at interfaces 1532. Alternatively, small gaps or spaces may separate adjacent primary magnets 1526 or secondary magnets 1528, providing a greater degree of tolerance during manufacturing.

In some embodiments, primary alignment component 1516 can also include an annular shield 1514 disposed on a distal surface of primary magnets 1526. In some embodiments, shield 1514 can be formed as a single annular piece of material and adhered to primary magnets 1526 to secure primary magnets 1526 into position. Shield 1514 can be formed of a material that has high magnetic permeability, such as stainless steel, and can redirect magnetic fields to prevent them from propagating beyond the distal side of primary alignment component 1516, thereby protecting sensitive electronic components located beyond the distal side of primary alignment component 1516 from magnetic interference.

Primary magnets 1526 and secondary magnets 1528 can be made of a magnetic material such as an NdFeB material, other rare earth magnetic materials, or other materials that can be magnetized to create a persistent magnetic field. Each secondary magnet 1528 can have a single magnetic region with a magnetic polarity having a component in the radial direction in the transverse plane (as shown by magnetic polarity indicator 1517 in FIG. 15B). As described below, the magnetic orientation can be in a radial direction with respect to axis 1501 or another direction having a radial component in the transverse plane. Each primary magnet 1526 can include two magnetic regions having opposite magnetic orientations. For example, each primary magnet 1526 can include an inner arcuate magnetic region 1552 having a magnetic orientation in a first axial direction (as shown by polarity indicator 1553 in FIG. 15B), an outer arcuate magnetic region 1554 having a magnetic orientation in a second axial direction opposite the first direction (as shown by polarity indicator 1555 in FIG. 15B), and a central non-magnetized region 1556 that does not have a magnetic orientation. Central non-magnetized region 1556 can magnetically separate inner arcuate region 1552 from outer arcuate region 1554 by inhibiting magnetic fields from directly crossing through central region 1556. Magnets having regions of opposite magnetic orientation separated by a non-magnetized region are sometimes referred to herein as having a "quad-pole" configuration.

In some embodiments, each secondary magnet 1526 can be made of a magnetic material that has been ground and shaped into an arcuate structure, and a magnetic orientation having a radial component in the transverse plane can be created, e.g., using a magnetizer. Similarly, each primary magnet 1526 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 1526 can be a compound structure with two arcuate pieces of magnetic material providing inner arcuate magnetic region 1552 and outer arcuate magnetic region 1554; in such embodiments, central non-magnetized region 1556 can be formed of an arcuate piece of nonmagnetic material or formed as an air gap defined by sidewalls of inner arcuate magnetic region 1552 and outer arcuate magnetic region 1554.

As shown in FIG. 15B, the magnetic polarity of secondary magnet 1528 (shown by indicator 1517) can be oriented such that when primary alignment component 1516 and secondary alignment component 1518 are aligned, the south pole of secondary magnet 1528 is oriented toward the north pole of inner arcuate magnetic region 1552 (shown by indicator 1553) while the north pole of secondary magnet 1528 is oriented toward the south pole of outer arcuate magnetic region 1554 (shown by indicator 1555). Accordingly, the respective magnetic orientations of inner arcuate magnetic region 1552, secondary magnet 1528 and outer arcuate magnetic region 1556 can generate magnetic fields 1540 that produce an attractive force between primary magnet 1526 and secondary magnet 1528, thereby facilitating alignment between respective electronic devices in which primary alignment component 1516 and secondary alignment component 1518 are disposed (e.g., as shown in FIG. 13). Shield 1514 can redirect some of magnetic fields 1540 away from regions below primary magnet 1526. Further, the "closed-loop" magnetic field 1540 formed around central nonmagnetic region 1556 can have tight and compact field lines that do not stray from primary and secondary magnets 1526 and 1528 as far as magnetic field 1540 strays from primary and secondary magnets 226 and 228 in FIG. 15B. Thus, magnetically sensitive components can be placed relatively close to primary alignment component 1516 with reduced concern for stray magnetic fields. Accordingly, as compared to magnetic alignment system 200, magnetic alignment system 1500 can help to reduce the overall size of a device in which primary alignment component 1516 is positioned and can also help reduce noise created by magnetic field 1540 in adjacent components or devices, such as a power-receiving device in which secondary alignment component 1518 is positioned.

It will be appreciated that magnetic alignment system 1500 is illustrative and that variations and modifications are possible. For instance, while primary alignment component 1516 and secondary alignment component 1518 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, secondary alignment component 1518 can be formed of a single, monolithic annular magnet. Similarly, primary alignment component 1516 can be formed of a single, monolithic annular piece of magnetic material with an appropriate magnetization pattern as described above, or primary alignment component 1516 can be formed of a monolithic inner annular magnet and a monolithic outer annular magnet, with an annular air gap or region of non-magnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 16:
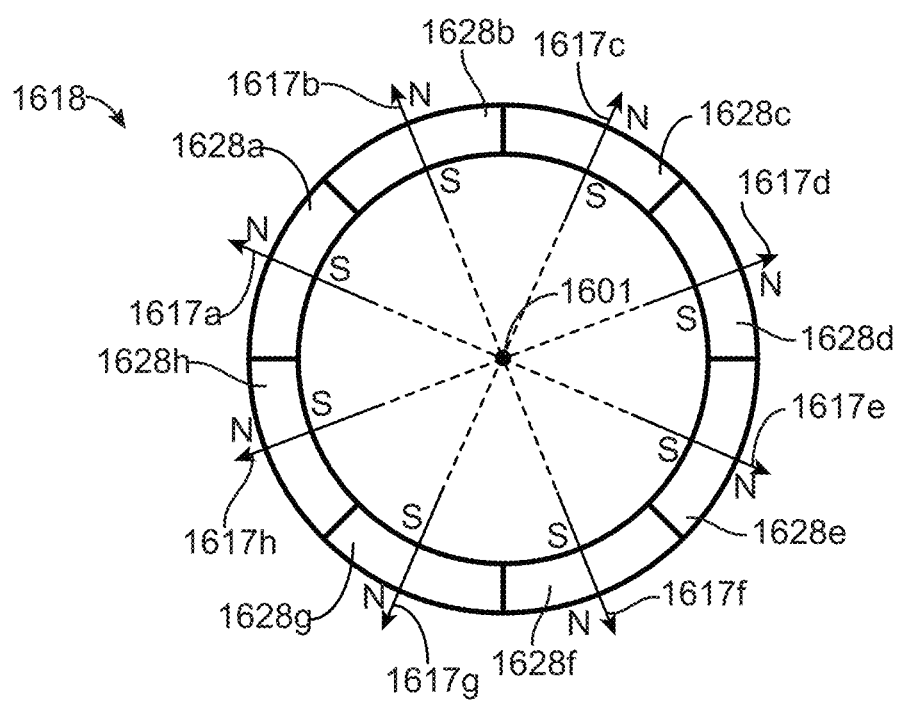
FIG. 16 shows a simplified top-down view of a secondary alignment component according to some embodiments.

As noted above, in embodiments of magnetic alignment systems having closed-loop magnetic orientations, such as magnetic alignment system 1500, secondary alignment component 1518 can have a magnetic orientation in the transverse plane. For example, in some embodiments, secondary alignment component 1518 can have a magnetic polarity in a radial orientation. FIG. 16 shows a simplified top-down view of a secondary alignment component 1618 according to some embodiments having secondary magnets 1628*a-h* with radial magnetic orientations as shown by magnetic polarity indicators 1617*a-h*. In this example, each secondary magnet 1628*a-h* has a north magnetic pole oriented toward the radially outward side and a south magnetic pole toward the radially inward side; however, this orientation can be reversed, and the north magnetic pole of each secondary magnet 1628*a-h* can be oriented toward the radially inward side while the south magnetic pole is oriented toward the radially outward side.

Figure 17A:
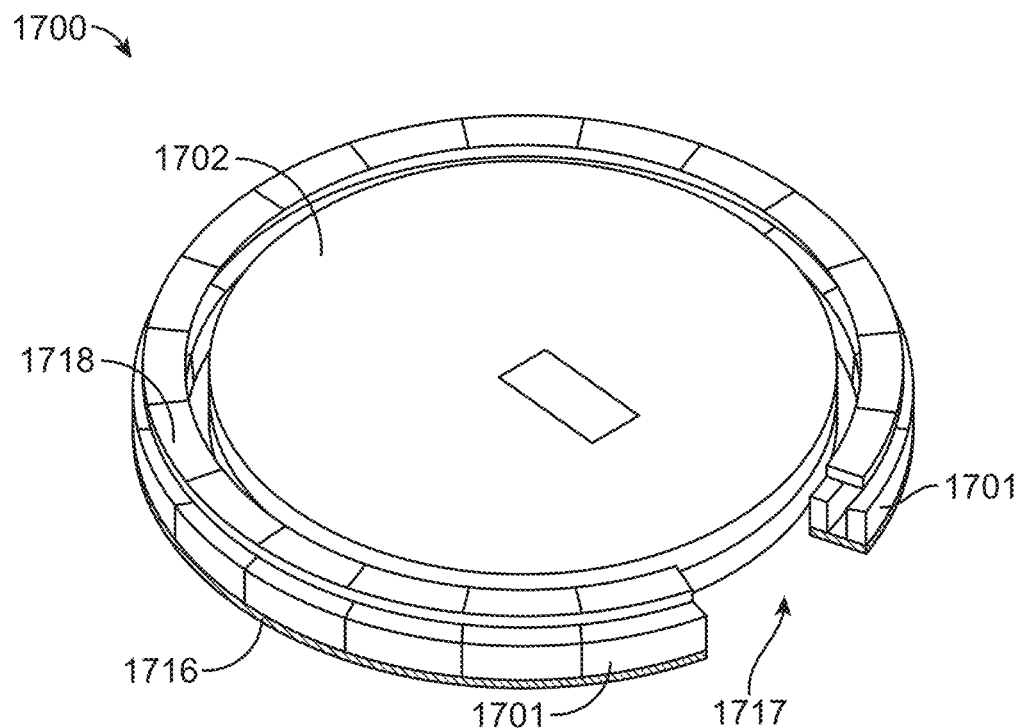
FIG. 17A shows a perspective view of a magnetic alignment system according to some embodiments.

FIG. 17A shows a perspective view of a magnetic alignment system 1700 according to some embodiments. Magnetic alignment system 1700, which can be an implementation of magnetic alignment system 1500, includes a secondary alignment component 1718 having a radially outward magnetic orientation (e.g., as shown in FIG. 16) and a complementary primary alignment component 1716. In this example, magnetic alignment system 1700 includes a gap 1717 between two of the sectors; however, gap 1717 is optional and magnetic alignment system 1700 can be a complete annular structure. Also shown are components 1702, which can include, for example an inductive coil assembly or other components located within the central region of primary magnetic alignment component 1716 or secondary magnetic alignment component 1718. Magnetic alignment system 1700 can have a closed-loop configuration similar to magnetic alignment system 1500 (as shown in FIG. 15B) and can include arcuate sectors 1701, each of which can be made of one or more arcuate magnets. In some embodiments, the closed-loop configuration of magnetic alignment system 1700 can reduce or prevent magnetic field leakage that may affect components 1702.

Figure 17B:
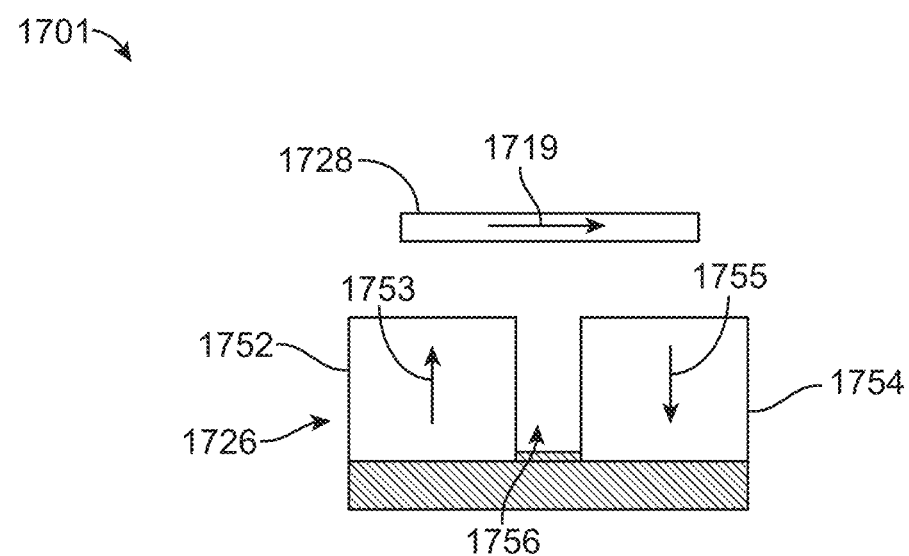

FIG. 17B shows an axial cross-section view through one of arcuate sectors 1701. Arcuate sector 1701 includes a primary magnet 1726 and a secondary magnet 1728. As shown by orientation indicator 1719, secondary magnet 1728 has a magnetic polarity oriented in a radially outward direction, i.e., the north magnetic pole is toward the radially outward side of magnetic alignment system 1700. Like primary magnets 1526 described above, primary magnet 1726 includes an inner arcuate magnetic region 1752, an outer arcuate magnetic region 1754, and a central non-magnetized region 1756 (which can include, e.g., an air gap or a region of nonmagnetic or non-magnetized material). Inner arcuate magnetic region 1752 has a magnetic polarity oriented axially such that the north magnetic pole is toward secondary magnet 1728, as shown by indicator 1753, while outer arcuate magnetic region 1754 has an opposite magnetic orientation, with the south magnetic pole oriented toward secondary magnet 1728, as shown by indicator 1755. As described above with reference to FIG. 15B, the arrangement of magnetic orientations shown in FIG. 17B results in magnetic attraction between primary magnet 1726 and secondary magnet 1728. In some embodiments, the magnetic polarities can be reversed such that the north magnetic pole of secondary magnet 1728 is oriented toward the radially inward side of magnetic alignment system 1700, the north magnetic pole of outer arcuate region 1754 of primary magnet 1726 is oriented toward secondary magnet 1728, and the north magnetic pole of inner arcuate region 1752 is oriented away from secondary magnet 1728.

When primary alignment component 1716 and secondary alignment component 1718 are aligned, the radially symmetrical arrangement and directional equivalence of magnetic polarities of primary alignment component 1716 and secondary alignment component 1718 allow secondary alignment component 1718 to rotate freely (relative to primary alignment component 1716) in the clockwise or counterclockwise direction in the lateral plane while maintaining alignment along the axis.

Figure 17C:
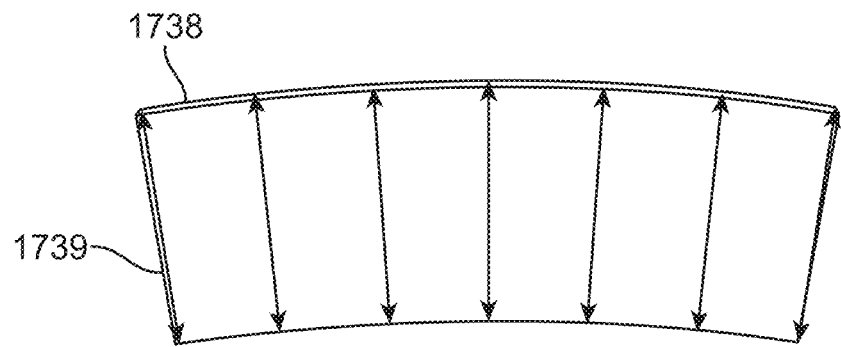
FIGS. 17C through 17E show examples of arcuate magnets with radial magnetic orientation according to some embodiments.
Figure 17D:
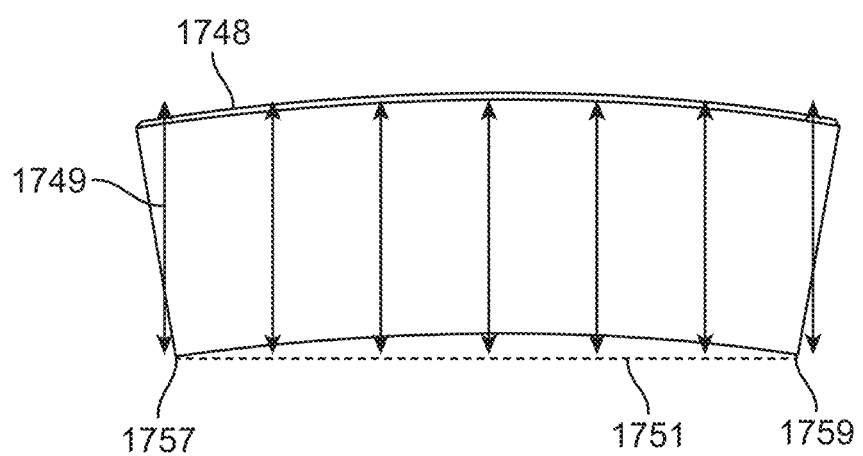
Figure 17E:
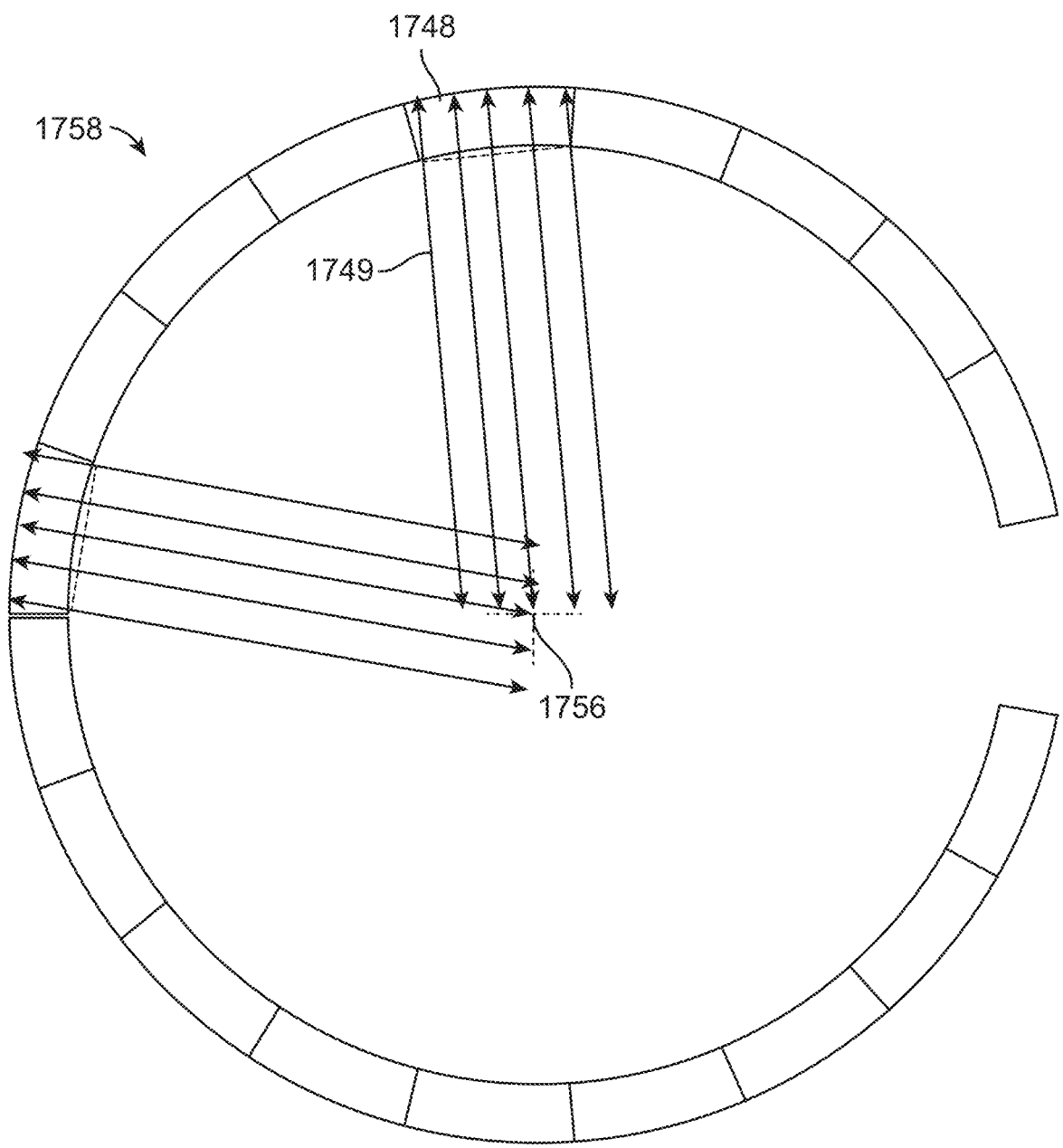

As used herein, a "radial" orientation need not be exactly or purely radial. For example, FIG. 17C shows a secondary arcuate magnet 1738 according to some embodiments. Secondary arcuate magnet 1738 has a purely radial magnetic orientation, as indicated by arrows 1739. Each arrow 1739 is directed at the center of curvature of magnet 1738; if extended inward, arrows 1739 would converge at the center of curvature. However, achieving this purely radial magnetization requires that magnetic domains within magnet 1738 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 17C. FIG. 17D shows a secondary arcuate magnet 1748 with pseudo-radial magnetic orientation according to some embodiments. Magnet 1748 has a magnetic orientation, shown by arrows 1749, that is perpendicular to a baseline 1751 connecting the inner corners 1757, 1759 of arcuate magnet 1748. If extended inward, arrows 1749 would not converge. Thus, neighboring magnetic domains in magnet 1748 are parallel to each other, which is readily achievable in magnetic materials such as NdFeB. The overall effect in a magnetic alignment system, however, can be similar to the purely radial magnetic orientation shown FIG. 17C. FIG. 17E shows a secondary annular alignment component 1758 made up of magnets 1748 according to some embodiments. Magnetic orientation arrows 1749 have been extended to the center point 1761 of annular alignment component 1758. As shown the magnetic field direction can be approximately radial, with the closeness of the approximation depending on the number of magnets 1748 and the inner radius of annular alignment component 1758. In some embodiments, 138 magnets 1748 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 1718 (e.g., as shown in FIG. 17B) provides a magnetic force profile between secondary alignment component 1718 and primary alignment component 1716 that is the same around the entire circumference of the magnetic alignment system. The radial magnetic orientation can also result in greater magnetic permeance, which allows secondary alignment component 1718 to resist demagnetization as well as enhancing the attractive force in the axial direction and improving shear force in the lateral directions when the two components are aligned.

Figure 18A:
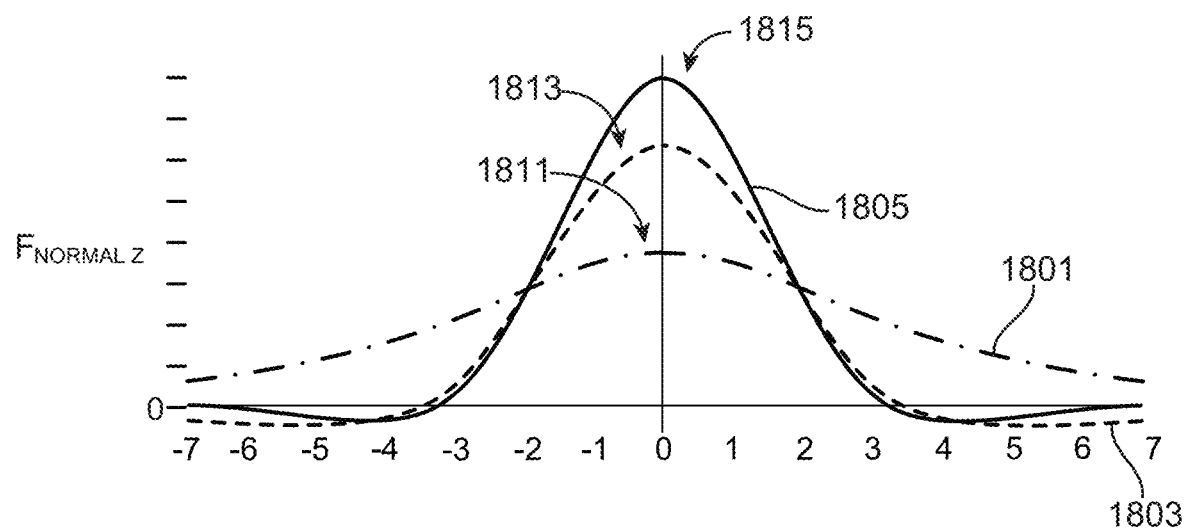
FIGS. 18A and 18B show graphs of force profiles for different magnetic alignment systems, according to some embodiments.
Figure 18B:
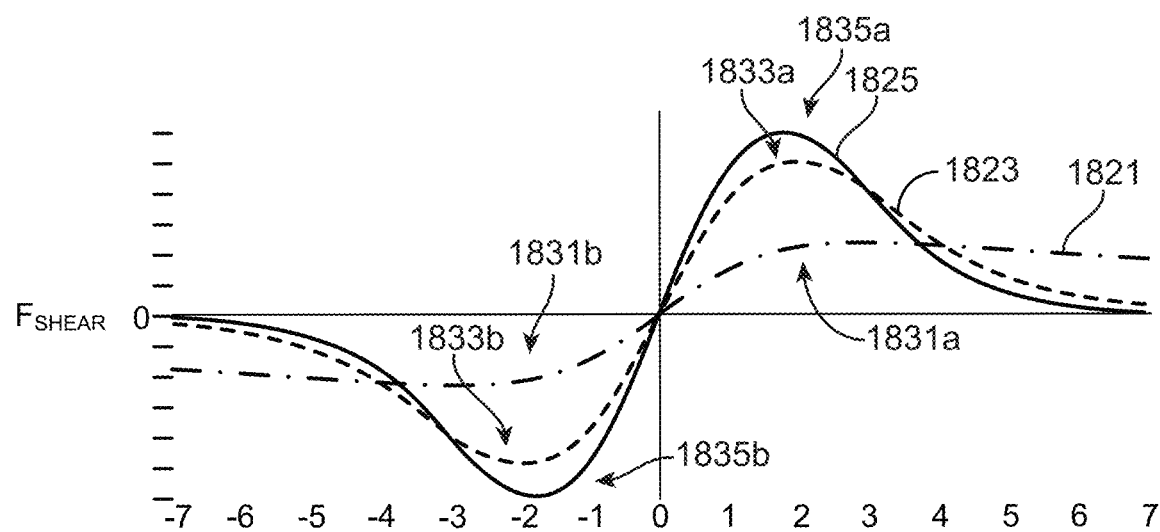

FIGS. 18A and 18B show graphs of force profiles for different magnetic alignment systems, according to some embodiments. Specifically, FIG. 18A shows a graph 1800 of vertical attractive (normal) force in the axial (z) direction for different magnetic alignment systems of comparable size and using similar types of magnets. Graph 1800 has a horizontal axis representing displacement from a center of alignment, where 0 represents the aligned position and negative and positive values represent left and right displacements from the aligned position in arbitrary units, and a vertical axis showing the normal force ($F_{NORMAL}$) as a function of displacement in arbitrary units. For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 1800 shows normal force profiles for three different types of magnetic alignment systems. A first type of magnetic alignment system uses central alignment components, such as a pair of complementary disc-shaped magnets placed along an axis; a representative normal force profile for a "central" magnetic alignment system is shown as line 1801 (dot-dash line). A second type of magnetic alignment system uses annular alignment components with axial magnetic orientations, e.g., magnetic alignment system 1400 of FIGS. 14A and 14B; a representative normal force profile for such an annular-axial magnetic alignment system is shown as line 1803 (dashed line). A third type of magnetic alignment system uses annular alignment components with closed-loop magnetic orientations and radial symmetry (e.g., magnetic alignment system 1700 of FIG. 17); a representative normal force profile for a radially symmetric closed-loop magnetic alignment system is shown as line 1805 (solid line).

Similarly, FIG. 18B shows a graph 1820 of lateral (shear) force in a transverse direction for different magnetic alignment systems. Graph 1820 has a horizontal axis representing displacement from a center of alignment using the same convention and units as graph 1800, and a vertical axis showing the shear force ($F_{SHEAR}$) as a function of direction in arbitrary units. For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 1820 shows shear force profiles for the same three types of magnetic alignment systems as graph 1800: a representative shear force profile for a central magnetic alignment system is shown as line 1821 (dot-dash line); a representative shear force profile for an annular-axial magnetic alignment system is shown as line 1823 (dashed line); and a representative normal force profile for a radially symmetric closed-loop magnetic alignment system is shown as line 1825 (solid line).

As shown in FIG. 18A, each type of magnetic alignment system achieves the strongest magnetic attraction in the axial direction when the primary and secondary alignment components are in the aligned position (0 on the horizontal axis), as shown by respective peaks 1811, 1813, and 1815. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 1700 of FIG. 17) provides stronger magnetic attraction when in the aligned position than the other types of magnetic alignment systems. This strong attractive normal force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

As shown in FIG. 18B, the strongest shear forces (attractive or repulsive) are obtained when the primary and secondary alignment components are laterally just outside of the aligned position, e.g., at −2 and +2 units of separation from the aligned position, as shown by respective peaks 1831*a-b*, 1833*a-b*, and 1835*a-b*. Similarly to the normal force, the magnitude of the peak strength of shear force depends on the type of magnetic alignment system. In particular, a radially-symmetric closed-loop magnetic alignment system (e.g., magnetic alignment system 1700 of FIG. 17) provides higher magnitude of shear force when just outside of the aligned position than the other types of magnetic alignment systems. This strong shear force can provide tactile feedback to help the user identify when the two components are aligned. In addition, like the strong normal force, the strong shear force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

A radially-symmetric closed-loop magnetic alignment system (e.g., magnetic alignment system 1700 of FIG. 17) can provide accurate and robust alignment in the axial and lateral directions. Further, because of the radial symmetry, the alignment system does not have a preferred rotational orientation in the lateral plane about the axis; the shear force profile is the same regardless of relative rotational orientation of the electronic devices being aligned.

Figure 19:
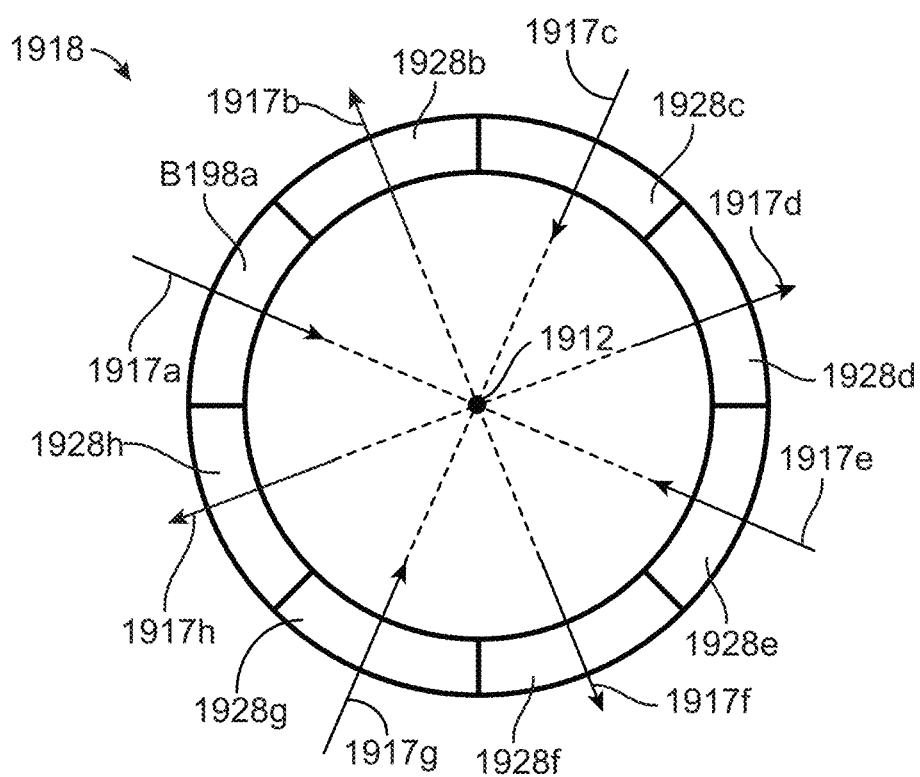
FIG. 19 shows a simplified top-down view of a secondary alignment component according to some embodiments.

In some embodiments, a closed-loop magnetic alignment system can be designed to provide one or more preferred rotational orientations. FIG. 19 shows a simplified top-down view of a secondary alignment component 1918 according to some embodiments. Secondary alignment component 1918 includes sectors 1928*a-h* with radial magnetic orientations as shown by magnetic polarity indicators 1917*a-h*. Each of sectors 1928*a-h* can include one or more secondary arcuate magnets (not shown). In this example, secondary magnets in sectors 1928*b*, 1928*d*, 1928*f*, and 1928*h* each have a north magnetic pole oriented toward the radially outward side and a south magnetic pole toward the radially inward side, while secondary magnets in sectors 1928*a*, 1928*c*, 1928*e*, and 1928*g* each have a north magnetic pole oriented toward the radially inward side and a south magnetic pole toward the radially outward side. In other words, magnets in sectors 1928*a-h* of secondary alignment component 1918 have alternating magnetic orientations. A complementary primary alignment component can have sectors with correspondingly alternating magnetic orientations.

For example, FIG. 20A shows a perspective view of a magnetic alignment system 2000 according to some embodiments. Magnetic alignment system 2000 includes a secondary alignment component 2018 having alternating radial magnetic orientations (e.g., as shown in FIG. 19) and a complementary primary alignment component 2016. Some of the arcuate sections of magnetic alignment system 2000 are not shown in order to reveal internal structure; however, it should be understood that magnetic alignment system 2000 can be a complete annular structure. Also shown are components 2002, which can include, for example, inductive coil assemblies or other components located within the central region of primary annular alignment component 2016 and/or secondary annular alignment component 2018. Magnetic alignment system 2000 can be a closed-loop magnetic alignment system similar to magnetic alignment system 1500 described above and can include arcuate sectors 2001*b*, 2001*c* of alternating magnetic orientations, with each arcuate sector 2001*b*, 2001*c* including one or more arcuate magnets in each of primary annular alignment component 2016 and secondary annular alignment component 2018. In some embodiments, the closed-loop configuration of magnetic alignment system 2000 can reduce or prevent magnetic field leakage that may affect component 2002.

FIG. 20B shows an axial cross-section view through one of arcuate sectors 2001*b*, and FIG. 20C shows an axial cross-section view through one of arcuate sectors 2001*c*. Arcuate sector 2001*b* includes a primary magnet 2026*b* and a secondary magnet 2028*b*. As shown by orientation indicator 2017*b*, secondary magnet 2028*b* has a magnetic polarity oriented in a radially outward direction, i.e., the north magnetic pole is toward the radially outward side of magnetic alignment system 2000. Like primary magnets 1526 described above, primary magnet 2026*b* includes an inner arcuate magnetic region 2052*b*, an outer arcuate magnetic region 2054*b*, and a central nonmagnetic region 2056*b* (which can include, e.g., an air gap or a region of nonmagnetic material). Inner arcuate magnetic region 2052*b* has a magnetic polarity oriented axially such that the north magnetic pole is toward secondary magnet 2028*b*, as shown by indicator 2053*b*, while outer arcuate magnetic region 2054*b* has an opposite magnetic orientation, with the south magnetic pole oriented toward secondary magnet 2028*b*, as shown by indicator 2055*b*. As described above with reference to FIG. 15B, the arrangement of magnetic orientations shown in FIG. 20B results in magnetic attraction between primary magnet 2026*b* and secondary magnet 2028*b*.

As shown in FIG. 20C, arcuate sector 2001*c* has a "reversed" magnetic orientation relative to arcuate sector 2001*b*. Arcuate sector 2001*c* includes a primary magnet 2026*c* and a secondary magnet 2028*c*. As shown by orientation indicator 2017*c*, secondary magnet 2028*c* has a magnetic polarity oriented in a radially inward direction, i.e., the north magnetic pole is toward the radially inward side of magnetic alignment system 2000. Like primary magnets 1526 described above, primary magnet 2026*c* includes an inner arcuate magnetic region 2052*c*, an outer arcuate magnetic region 2054*c*, and a central nonmagnetic region 2056*c* (which can include, e.g., an air gap or a region of nonmagnetic material). Inner arcuate magnetic region 2052*c* has a magnetic polarity oriented axially such that the south magnetic pole is toward secondary magnet 2028*c*, as shown by indicator 2053*c*, while outer arcuate magnetic region 2054*c* has an opposite magnetic orientation, with the north magnetic pole oriented toward secondary magnet 2028*c*, as shown by indicator 2055*c*. As described above with reference to FIG. 15B, the arrangement of magnetic orientations shown in FIG. 20C results in magnetic attraction between primary magnet 2026*c* and secondary magnet 2028*c*.

An alternating arrangement of magnetic polarities as shown in FIGS. 19 and 20A-20C can create a "ratcheting" feel when secondary alignment component 2018 is aligned with primary alignment component 2016 and one of alignment components 2016, 2018 is rotated relative to the other about the common axis. For instance, as secondary alignment component 2018 is rotated relative to primary alignment component 2016, radially-outward magnet 2028*b* alternately come into proximity with a complementary magnet 2026*b* of primary alignment component 2016, resulting in an attractive magnetic force, and with an anti-complementary magnet 2026*c* of primary alignment component 2016, resulting in a repulsive magnetic force. If primary magnets 2026*b*, 2026*c* and secondary magnets 2028*b*, 2028*c* have the same angular size and spacing, in any given orientation, each pair of magnets will experience similar net attractive or repulsive magnetic forces such that alignment is stable and robust in rotational orientations in which complementary magnet pairs 2026*b*, 2028*b* and 2026*c*, 2028*c* are in proximity. In other rotational orientations, a torque toward a stable rotational orientation can be experienced.

Figure 21A:
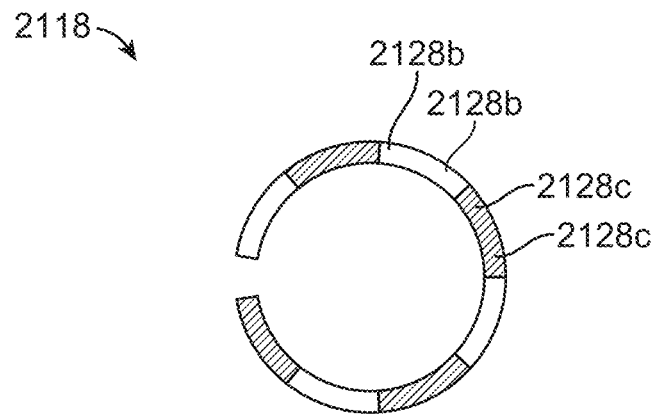
FIGS. 21A and 21B show simplified top-down views of secondary alignment components according to various embodiments.
Figure 21B:
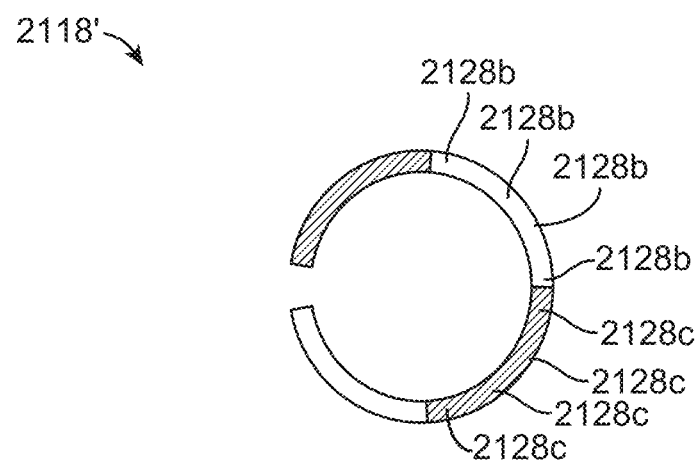

In the examples shown in FIGS. 19 and 20A through 20C, each sector includes one magnet, and the direction of magnetic orientation alternates with each magnet. In some embodiments, a sector can include two or more magnets having the same direction of magnetic orientation. For example, FIG. 21A shows a simplified top-down view of a secondary alignment component 2118 according to some embodiments. Secondary alignment component 2118 includes secondary magnets 2128*b* with radially outward magnetic orientations and secondary magnets 2128*c* with radially inward orientations, similarly to secondary alignment component 2018 described above. In this example, the magnets are arranged such that a pair of outwardly-oriented magnets 2128*b* (forming a first sector) are adjacent to a pair of inwardly-oriented magnets 2128*c* (forming a second sector adjacent to the first sector). The pattern of alternating sectors (with two magnets per sector) repeats around the circumference of secondary alignment component 2118. Similarly, FIG. 21B shows a simplified top-down view of another secondary alignment component 2118' according to some embodiments. Secondary alignment component 2118' includes secondary magnets 2128*b* with radially outward magnetic orientations and secondary magnets 2128*c* with radially inward orientations. In this example, the magnets are arranged such that a group of four radially-outward magnets 2128*b* (forming a first sector) is adjacent to a group of four radially-inward magnets 2128*c* (forming a second sector adjacent to the first sector). The pattern of alternating sectors (with four magnets per sector) repeats around the circumference of secondary alignment component 2118'. Although not shown in FIGS. 21A and 21B, the structure of a complementary primary alignment component for secondary alignment component 2118 or 2118' should be apparent in view of FIGS. 20A-20C. A shear force profile for the alignment components of FIGS. 21A and 21B can be similar to the ratcheting profile described above, although the number of rotational orientations that provide stable alignment will be different.

Figure 22:
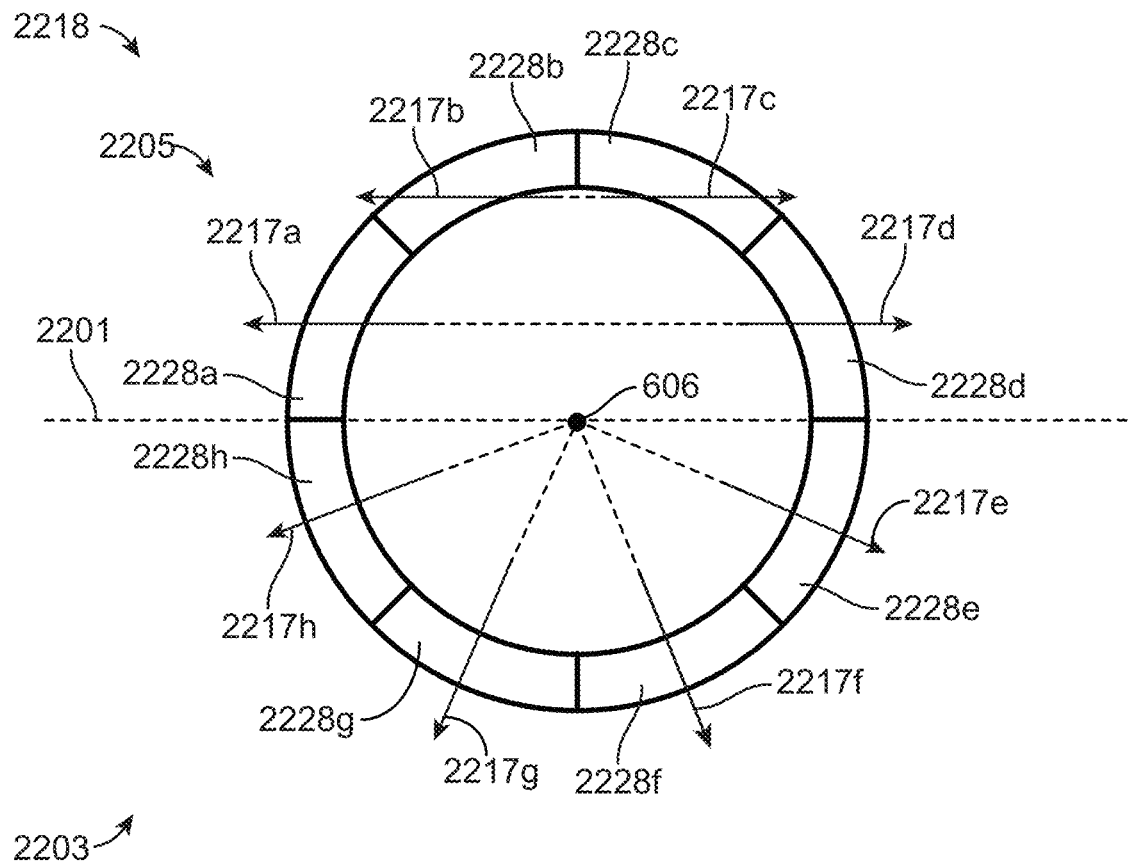
FIG. 22 shows a simplified top-down view of a secondary alignment component according to some embodiments.

In other embodiments, a variety of force profiles can be created by changing the alignment of different component magnets of the primary and/or secondary alignment components. As just one example, FIG. 22 shows a simplified top-down view of a secondary alignment component 2218 according to some embodiments having sectors 2228*a-h* with location-dependent magnetic orientations as shown by magnetic polarity indicators 2217*a-h*. In this example, secondary alignment component 2218 can be regarded as bisected by bisector line 2201, which defines two halves of secondary alignment component 2218. In a first half 2203, sectors 2228*e-h* have magnetic polarities oriented radially outward, similarly to examples described above.

In the second half 2205, sectors 2228*a-d* have magnetic polarities oriented substantially parallel to bisector line 2201 rather than radially. In particular, sectors 2228*a* and 2228*b* have magnetic polarities oriented in a first direction parallel to bisector line 2201, while sectors 2228*c* and 2228*d* have magnetic polarities oriented in the direction opposite to the direction of the magnetic polarities of sectors 2228*a* and 2228*b*. A complementary primary alignment component can have an inner annular region with magnetic north pole oriented toward secondary alignment component 2218, an outer annular region with magnetic north pole oriented away from secondary alignment component 2218, and a central non-magnetized region, providing a closed-loop magnetic orientation as described above. The asymmetric arrangement of magnetic orientations in secondary alignment component 2218 can modify the shear force profile such that secondary alignment component 2218 generates less shear force in the direction toward second half 2205 than in the direction toward first half 2203. In some embodiments, an asymmetrical arrangement of this kind can be used where the primary alignment component is mounted in a docking station and the secondary alignment component is mounted in a portable electronic device that docks with the docking station. Assuming secondary annular alignment component 2218 is oriented in the portable electronic device such that half-annulus 2205 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations to provide forces toward the desired position of alignment. Different combinations of magnetic orientations may create different shear force profiles, and the selection of magnetic orientations may be made based on a desired shear force profile.

In various embodiments described above, a magnetic alignment system can provide robust alignment in a lateral plane and may or may not provide rotational alignment. For example, radially symmetric magnetic alignment system 1700 of FIGS. 17A-17B may not define a preferred rotational orientation. Radially alternating magnetic alignment system 2000 of FIGS. 20A-20C can define multiple equally preferred rotational orientations. For some applications, such as alignment of a portable electronic device with a wireless charging puck, rotational orientation may not be a concern. In other applications, such as alignment of a portable electronic device in an attachment device, such as attachment device 100, attachment device 300, attachment device 500 (shown above) a docking station or upright holder, a particular rotational alignment may be desirable. Accordingly, in some embodiments an annular magnetic alignment system can be augmented with one or more rotational alignment components that can be positioned externally to and spaced apart from the annular magnetic alignment components to help guide devices into a target rotational orientation relative to each other.

Figure 23:
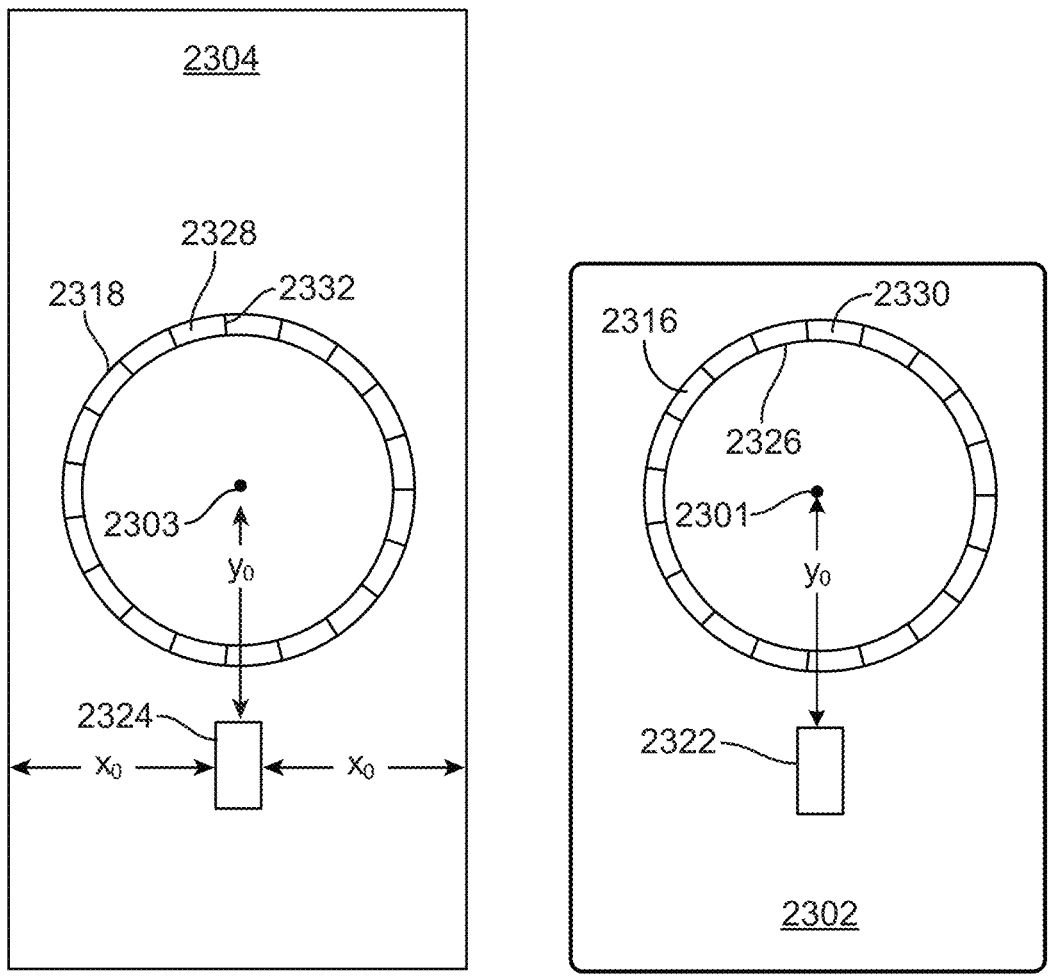
FIG. 23 shows an example of a magnetic alignment system with an annular alignment component and a rotational alignment component according to some embodiments.

FIG. 23 shows an example of a magnetic alignment system with an annular alignment component and a rotational alignment component according to some embodiments. In this example, primary alignment components of the magnetic alignment system are included in an accessory device 2302, and secondary alignment components of the magnetic alignment system are included in a portable electronic device 2304. Portable electronic device 2304 can be, for example, a smart phone whose front surface provides a touchscreen display and whose back surface is designed to support wireless charging. Accessory device 2302 can be, for example, a charging dock that supports portable electronic device 2304 such that its display is visible and accessible to a user. FIG. 23 shows proximal surfaces of portable electronic device 2304 and accessory 2302. For instance, accessory device 2302 can support portable electronic device 2304 such that the display is vertical or at a conveniently tilted angle for viewing and/or touching. In the example shown, accessory device 2302 supports portable electronic device 2304 in a "portrait" orientation (shorter sides of the display at the top and bottom); however, in some embodiments accessory device 2302 can support portable electronic device 2304 in a "landscape" orientation (longer sides of the display at the top and bottom). Accessory device 2302 can also be mounted on a swivel, gimbal, or the like, allowing the user to adjust the orientation of portable electronic device 2304 by adjusting the orientation of accessory device 2302.

Accessory device 2302 can be used as all or part of attachment device 100, attachment device 300, or attachment device 500, all shown above, or as all or part of another attachment device according to an embodiment of the present invention.

As described above, components of a magnetic alignment system can include a primary annular alignment component 2316 disposed in accessory 2302 and a secondary annular alignment component 2318 disposed in portable electronic device. Primary annular alignment component 2316 can be similar or identical to any of the primary alignment components described above. For example, primary annular alignment component 2316 can be formed of arcuate magnets 2326 arranged in an annular configuration. Although not shown in FIG. 23, one or more gaps can be provided in primary annular alignment component 2316, e.g., by omitting one or more of arcuate magnets 2326 or by providing a gap at one or more interfaces 2330 between adjacent arcuate magnets 2326. In some embodiments, each arcuate magnet 2326 can include an inner region having a first magnetic orientation (e.g., axially oriented in a first direction) and an outer region having a second magnetic orientation opposite the first magnetic orientation (e.g., axially oriented opposite the first direction), with a non-magnetized gap region between the inner and outer regions (which can include an air gap or a nonmagnetic material). In some embodiments, primary annular alignment component can also include a shield (not shown) on the distal side of arcuate magnets 2326.

Likewise, secondary annular alignment component 2318 can be similar or identical to any of the secondary alignment components described above. For example, secondary annular alignment component 2318 can be formed of arcuate magnets 2328 arranged in an annular configuration. Although not shown in FIG. 23, one or more gaps can be provided in secondary annular alignment component 2318, e.g., by omitting one or more arcuate magnets 2328 or by providing a gap at one or more interfaces 2332 between adjacent magnets 2328. As described above, arcuate magnets 2328 can provide radially-oriented magnetic polarities. For instance, all sectors of secondary annular alignment component 2318 can have a radially-outward magnetic orientation or a radially-inward magnetic orientation, or some sectors of secondary annular alignment component 2318 may have a radially-outward magnetic orientation while other sectors of secondary annular alignment component 2318 have a radially-inward magnetic orientation.

As described above, primary annular alignment component 2316 and secondary annular alignment component 2318 can provide shear forces that promote alignment in the lateral plane so that center point 2301 of primary annular alignment component 2316 aligns with center point 2303 of secondary annular alignment component 2318. However, primary annular alignment component 2316 and secondary annular alignment component 2318 might not provide shear forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 23, a primary rotational alignment component 2322 can be disposed outside of and spaced apart from primary annular alignment component 2316 while a secondary rotational alignment component 2324 is disposed outside of and spaced apart from secondary annular alignment component 2318. Secondary rotational alignment component 2324 can be positioned at a fixed distance ($y_0$) from center point 2303 of secondary annular alignment component 2318 and centered between the side edges of portable electronic device 2304 (as indicated by distance xo from either side edge). Similarly, primary rotational alignment component 2322 can be positioned at the same distance $y_0$ from center point 2301 of primary annular alignment component 2316 and located at a rotational angle that results in a torque profile that favors the desired orientation of portable electronic device 2304 relative to accessory 2302 when secondary rotational alignment component 2324 is aligned with primary rotational alignment component 2322. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 2322 and secondary rotational alignment component 2324 can be implemented using one or more rectangular or square blocks of magnetic material each of which has each been magnetized such that its magnetic polarity is oriented in a desired direction. The magnetic orientations of rotational alignment components 2322 and 2324 can be complementary so that an attractive magnetic force is generated when the proximal surfaces of rotational alignment components 2322 and 2324 are near each other. This attractive magnetic force can help to rotate portable electronic device 2304 and accessory 2302 into a preferred rotational orientation in which the proximal surfaces of rotational alignment components 2322 and 2324 are in closest proximity to each other. Examples of magnetic orientations for rotational alignment components 2322 and 2324 that can be used to provide a desired attractive force are described below. In some embodiments, primary rotational alignment component 2322 and secondary rotational alignment component 2324 can have the same lateral dimensions and the same thickness. The dimensions can be chosen based on a desired magnetic field strength, the dimensions of devices in which the rotational alignment components are to be deployed, and other design considerations. In some embodiments, the lateral dimensions can be about 6 mm by about 23 mm, and the thickness can be anywhere from about 0.3 mm to about 1.5 mm. In some embodiments, each of primary rotational alignment component 2322 and secondary rotational alignment component 2324 can be implemented using multiple rectangular blocks of magnetic material positioned adjacent to each other. As in other embodiments, a small gap may be present between adjacent magnets, e.g., due to manufacturing tolerances.

Figure 24A:
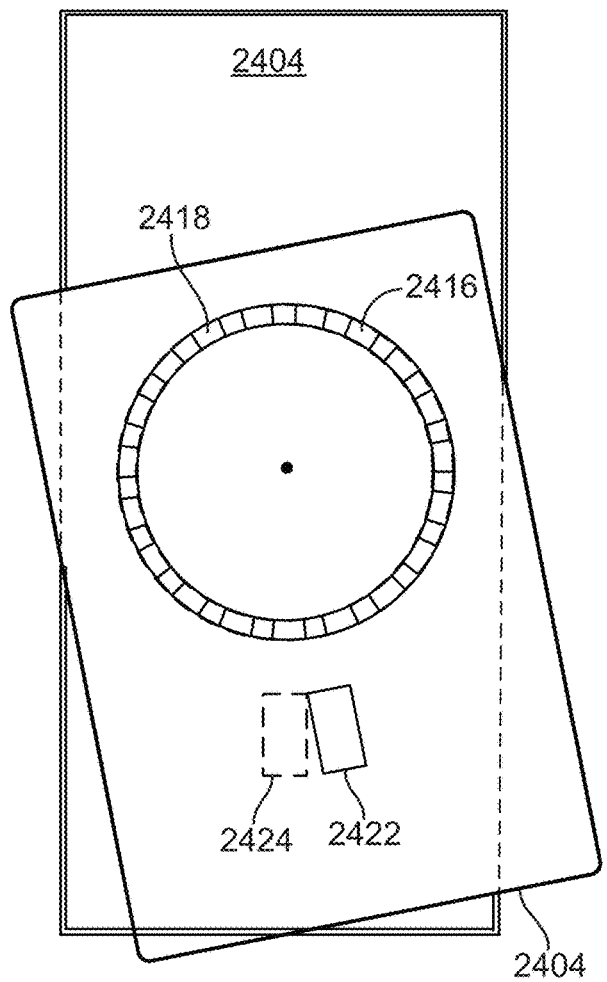
FIGS. 24A and 24B show an example of rotational alignment according to some embodiments.
Figure 24B:
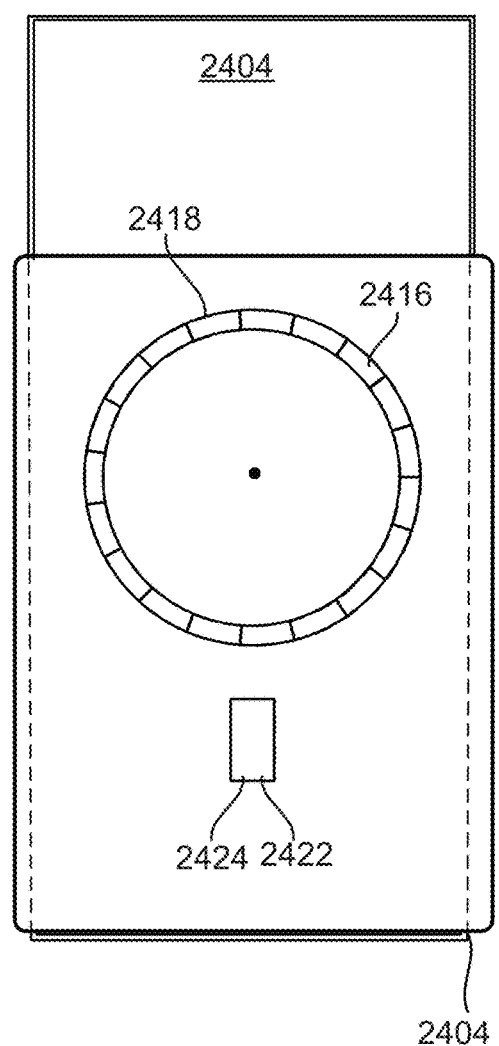

FIGS. 24A and 24B show an example of rotational alignment according to some embodiments. In FIG. 24A, accessory 2302 is placed on the back surface of portable electronic device 2304 such that primary annular alignment component 2316 and secondary alignment component 2318 are aligned with each other in the lateral plane (which is the plane of the page in FIG. 24A); in the view shown, center point 2301 of primary annular alignment component 2316 overlies center point 2303 of secondary annular alignment component 2318 A relative rotation is present such that rotational alignment components 2322 and 2324 are not aligned. In this configuration, an attractive force between rotational alignment components 2322 and 2324 can help guide portable electronic device 2304 and accessory 2302 into a target rotational orientation as shown in FIG. 17B. In FIG. 24B, the attractive magnetic force between rotational alignment components 2322 and 2324 has brought portable electronic device 2304 and accessory 2302 into the target rotational alignment with the sides of portable electronic device 2304 parallel to the sides of accessory 2302. In some embodiments, the same attractive magnetic force between rotational alignment components 2322 and 2324 can help to hold portable electronic device 2304 and accessory 2302 in a fixed rotational alignment.

Rotational alignment components 2322 and 2324 can have various patterns of magnetic orientations. As long as the magnetic orientations of rotational alignment components 2322 and 2324 are complementary to each other, a torque toward the target rotational orientation can be present when the devices are brought into lateral alignment and close to the target rotational orientation. FIGS. 25A-28B show examples of magnetic orientations for a rotational alignment component according to various embodiments. While the magnetic orientation is shown for only one rotational alignment component, it should be understood that the magnetic orientation of a complementary rotational alignment component can be complementary to (e.g., the reverse of) the magnetic orientation of shown.

Figure 25A:
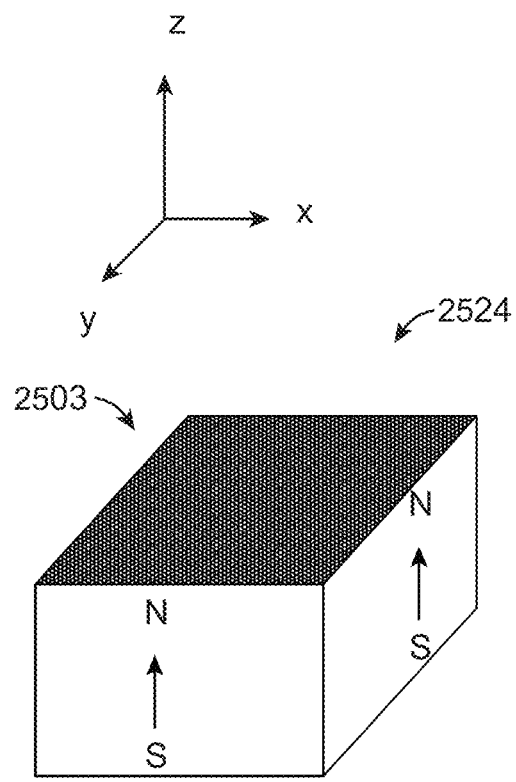
FIGS. 25A and 25B show a perspective view and a top view of a rotational alignment component having a "z-pole" configuration according to some embodiments.
Figure 25B:
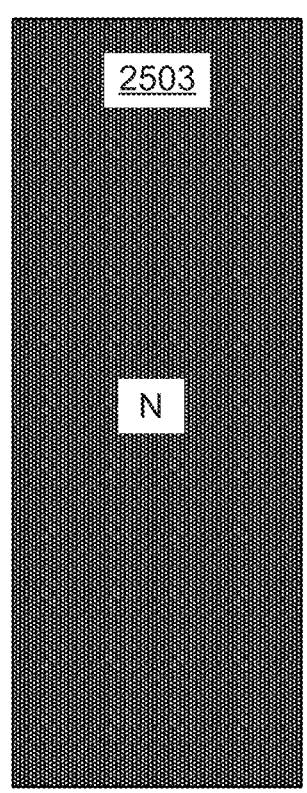

FIGS. 25A and 25B show a perspective view and a top view of a rotational alignment component 2524 having a "z-pole" configuration according to some embodiments. It should be understood that the perspective view is not to any particular scale and that the lateral (xy) dimensions and axial (z) thickness can be varied as desired. As shown in FIG. 25A, rotational alignment component 2524 can have a uniform magnetic orientation along the axial direction, as indicated by arrows 2505. Accordingly, as shown in FIG. 25B, a north magnetic pole (N) may be nearest the proximal surface 2503 of rotational alignment component 2524. A complementary z-pole alignment component can have a uniform magnetic orientation with a south magnetic pole nearest the proximal surface. The z-pole configuration can provide reliable alignment.

Other configurations can provide reliable alignment as well as a stronger, or more salient, "clocking" sensation for the user. A "clocking sensation," as used herein, refers to a user-perceptible torque about the common axis of the annular alignment components that pulls toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration of FIGS. 25A and 25B.

Figure 26A:
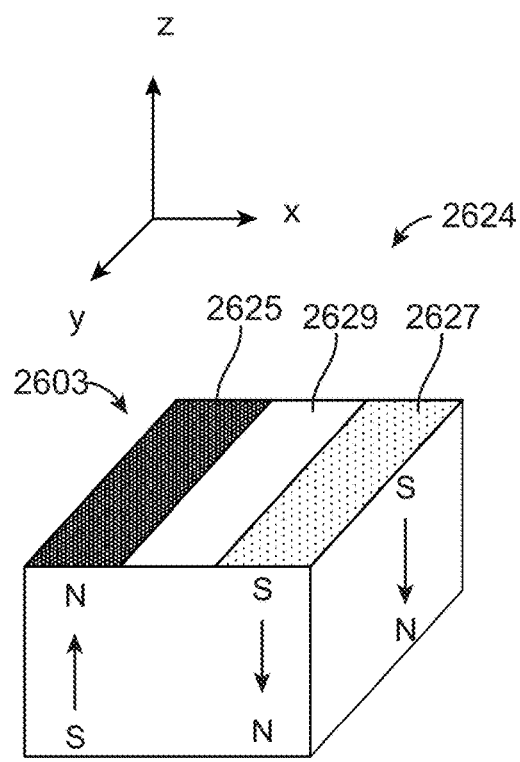
FIGS. 26A and 26B show a perspective view and a top view of a rotational alignment component having a "quad pole" configuration according to some embodiments.
Figure 26B:
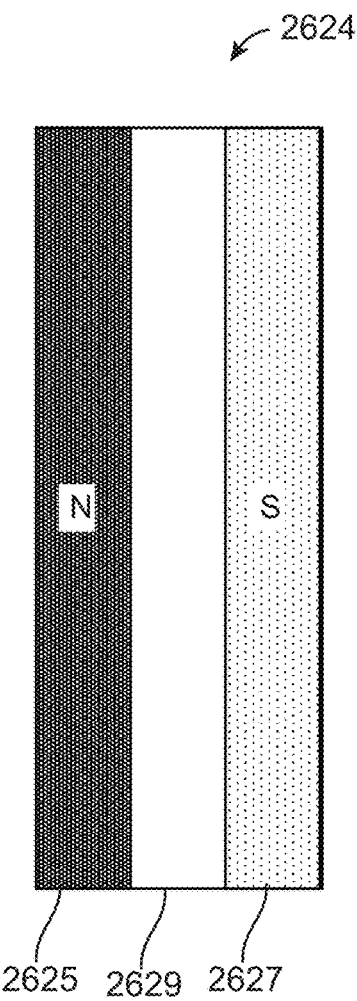

FIGS. 26A and 26B show a perspective view and a top view of a rotational alignment component 2624 having a "quad pole" configuration according to some embodiments. It should be understood that the perspective view is not to any particular scale and that the lateral (xy) dimensions and axial (z) thickness can be varied as desired. As shown in FIG. 26A, rotational alignment component 2624 has a first magnetized region 2625 with a magnetic orientation along the axial direction such that the north magnetic pole (N) is nearest the proximal (+z) surface 2603 of rotational alignment component 2624 (as indicated by arrow 2605) and a second magnetized region 2627 with a magnetic orientation opposite to the magnetic orientation of the first region such that the south magnetic pole (S) is nearest to proximal surface 2603 (as indicated by arrows 2607). Between magnetized regions 2625 and 2627 is a neutral region 2629 that is not magnetized. In some embodiments, rotational alignment component 2624 can be formed from a single piece of magnetic material that is exposed to a magnetizer to create regions 2625, 2627, 2629. Alternatively, rotational alignment component 2624 can be formed using two pieces of magnetic material with a nonmagnetic material or an air gap between them. As shown in FIG. 26B, the proximal surface of rotational alignment component 2624 can have one region having a "north" polarity and another region having a "south" polarity. A complementary quad-pole rotational alignment component can have corresponding regions of south and north polarity at the proximal surface.

Figure 27A:
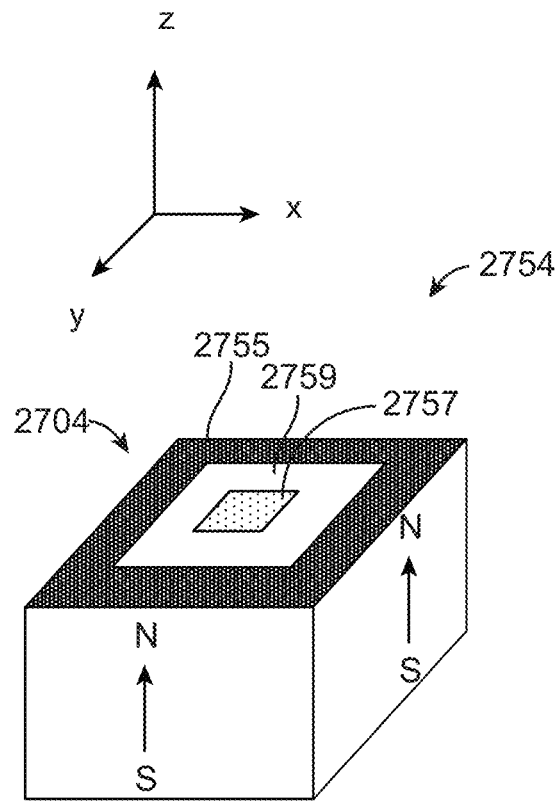
FIGS. 27A and 27B show a perspective view and a top view of a rotational alignment component having an "annulus design" configuration according to some embodiments.
Figure 27B:
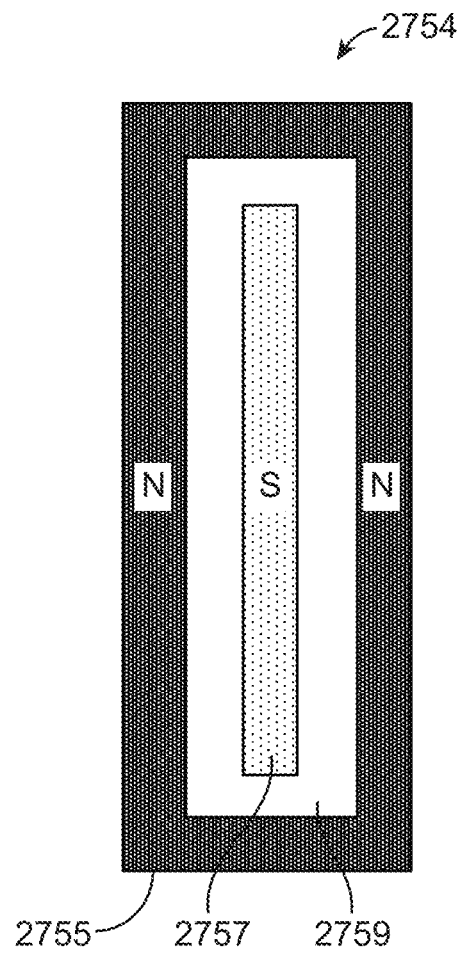

FIGS. 27A and 27B show a perspective view and a top view of a rotational alignment component 2724 having an "annulus design" configuration according to some embodiments. It should be understood that the perspective view is not to any particular scale and that the lateral (xy) dimensions and axial (z) thickness can be varied as desired. As shown in FIG. 27A, rotational alignment component 2724 has an outer magnetized region 2725 with a magnetic orientation along the axial direction such that the north magnetic pole (N) is nearest the proximal (+z) surface 2703 of rotational alignment component 2724 (as shown by arrows 2705) and an inner magnetized region 2727 with a magnetic orientation opposite to the magnetic orientation of the first region such that the south magnetic pole (S) is nearest to proximal surface 2703. Between magnetized regions 2725 and 2727 is a neutral annular region 2729 that is not magnetized. In some embodiments, rotational alignment component 2724 can be formed from a single piece of magnetic material that is exposed to a magnetizer to create regions 2725, 2727, 2729. Alternatively, rotational alignment component 2724 can be formed using two or more pieces of magnetic material with a nonmagnetic material or an air gap between them. As shown in FIG. 27B, the proximal surface of rotational alignment component 2724 can have an annular outer region having a "north" polarity and an inner region having a "south" polarity. The proximal surface of a complementary annulus-design rotational alignment component can have an annular outer region of south polarity and an inner region of north polarity.

Figure 28A:
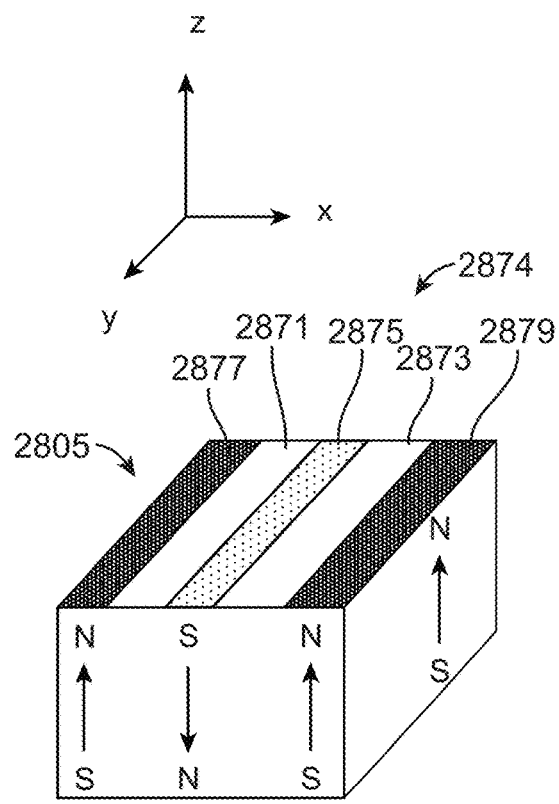
FIGS. 28A and 28B show a perspective view and a top view of a rotational alignment component having a "triple pole" configuration according to some embodiments.
Figure 28B:
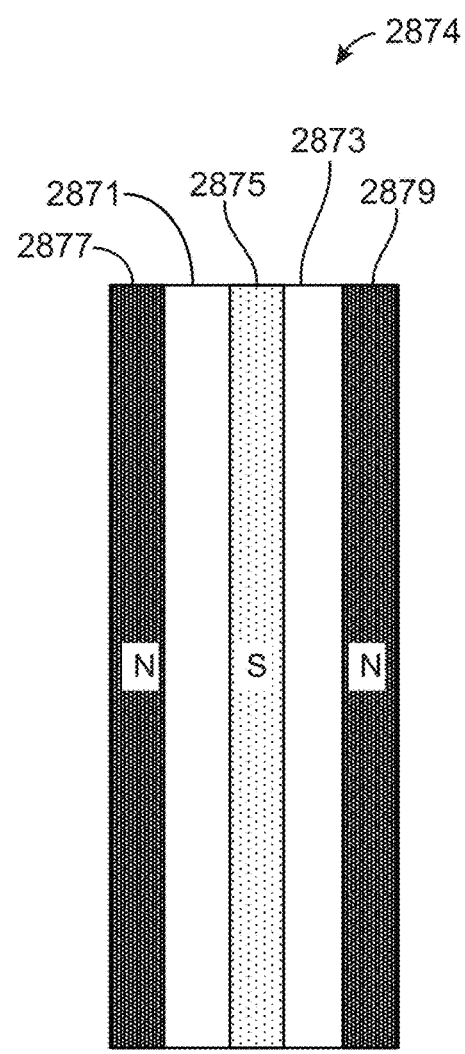

FIGS. 28A and 28B show a perspective view and a top view of a rotational alignment component 2824 having a "triple pole" configuration according to some embodiments. It should be understood that the perspective view is not to any particular scale and that the lateral (xy) dimensions and axial (z) thickness can be varied as desired. As shown in FIG. 28A, rotational alignment component 2824 has a central magnetized region 2825 with a magnetic orientation along the axial direction such that the south magnetic pole (S) is nearest the proximal (+z) surface 2803 of rotational alignment component 2824 (as shown by arrow 2805) and outer magnetized regions 2827, 2829 with a magnetic orientation opposite to the magnetic orientation of central region 2825 such that the north magnetic pole (N) is nearest to proximal surface 2803 (as shown by arrows 2807, 2809). Between central magnetized region 2825 and each of outer magnetized regions 2827, 2829 is a neutral region 2831, 2833 that is not strongly magnetized. In some embodiments, rotational alignment component 2824 can be formed from a single piece of magnetic material that is exposed to a magnetizer to create regions 2825, 2827, 2829. Alternatively, rotational alignment component 2824 can be formed using three (or more) pieces of magnetic material with nonmagnetic materials or air gaps between them. As shown in FIG. 28B, the proximal surface may have a central region having a "south" polarity with an outer region having "north" polarity to either side. The proximal surface of a complementary triple-pole rotational alignment component can have a central region of north polarity with an outer region of south polarity to either side.

It should be understood that the examples in FIGS. 25A-28B are illustrative and that other configurations may be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque profile. For example, as noted above, it may be desirable to provide a strong tactile "clocking" sensation to a user when close to the desired rotational alignment. The clocking sensation can be a result of torque about a rotational axis defined by the annular alignment components. The amount of torque depends on various factors, including the distance between the axis and the rotational alignment component (distance $y_0$ in FIG. 23), as well as the strength of the magnetic fields of the rotational alignment components (which may depend on the size of the rotational alignment components) and whether the annular alignment components exert any torque toward a preferred rotational orientation.

Figure 29:
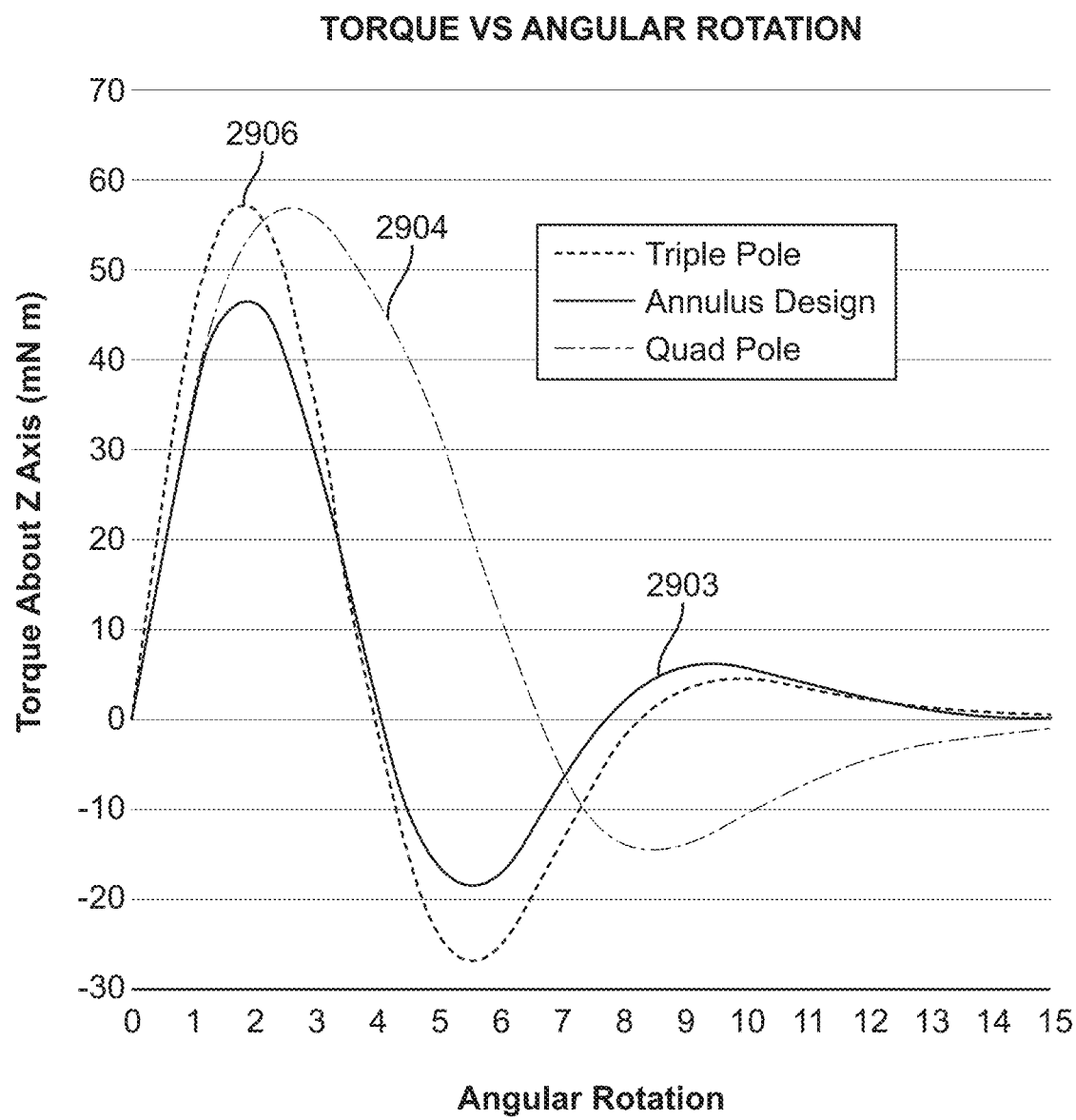
FIG. 29 shows graphs of torque as a function of angular rotation for magnetic alignment systems having rotational alignment components according to various embodiments.

FIG. 29 shows graphs of torque as a function of angular rotation (in degrees) for an alignment system of the kind shown in FIG. 23, for different magnetization configurations of the rotational alignment component according to various embodiments. Angular rotation is defined such that zero degrees corresponds to the target rotational alignment (where the proximal surfaces of rotational angular components 2322 and 2324 are in closest proximity, e.g., as shown in FIG. 24B). Torque is defined such that positive (negative) values indicate force in the direction of decreasing (increasing) rotational angle. For purpose of generating the torque profiles, it is assumed that annular alignment components 2316 and 2318 are rotationally symmetric and do not exert torque about the z axis defined by center points 2301 and 2303. Three different magnetization configurations are considered. Line 2904 corresponds to the quad-pole configuration of FIGS. 26A and 26B. Line 2905 corresponds to the annulus design configuration of FIGS. 27A and 27B. Line 2906 corresponds to the triple-pole configuration of FIGS. 28A and 28B. As shown, the annulus design (line 2905) and triple-pole (line 2906) configurations provide a sharper peak in the torque and therefore a more salient clocking sensation for the user, as compared to the quad-pole configuration (line 2904). In addition, the triple-pole configuration provides a stronger peak torque and therefore a more salient clocking sensation than the annulus-design configuration. It should be understood that the numerical values in FIG. 29 are illustrative, and that torque in a particular embodiment may depend on a variety of other factors in addition to the magnetization configuration, such as the magnet volume, aspect ratio, and distance y0 from the center of the annular alignment component.

Figure 30:
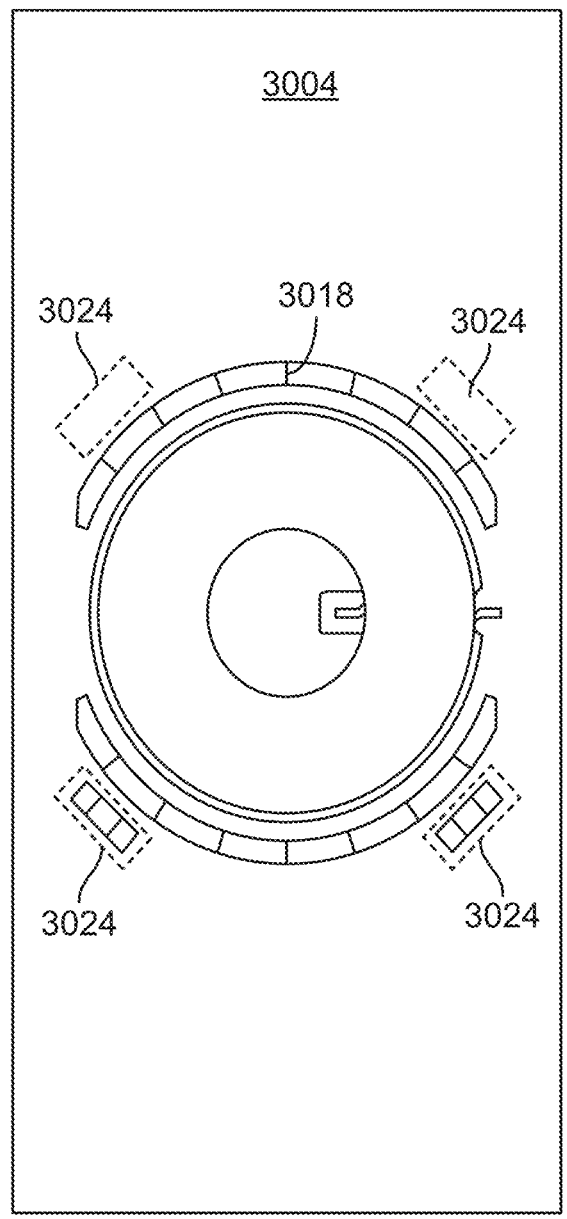
FIG. 30 shows a portable electronic device having an alignment system with multiple rotational alignment components according to some embodiments.

In the examples shown above, a single rotational alignment component is placed outside the annular alignment component at a distance $y_0$ from the center of the annular alignment component. This arrangement allows a single magnetic element to generate enough torque to produce a salient clocking sensation for a user aligning devices. In some embodiments, other arrangements are also possible. For example, FIG. 30 shows a portable electronic device 3004 having an alignment system 3000 with multiple rotational alignment components according to some embodiments. In this example, alignment system 3000 includes an annular alignment component 3018 and a set of rotational alignment components 3024 positioned at various locations around the perimeter of annular alignment component 3018. In this example, there are four rotational alignment components 3024 positioned at angular intervals of approximately 90 degrees. In other embodiments, different numbers and spacing of rotational alignment components can be used. Each rotational alignment component 3024 can have any of the magnetization configurations described above, including z-pole, quad-pole, triple-pole, or annulus-design configurations, or a different configuration. Further, different rotational alignment components 3024 can have different magnetization configurations from each other. It should be noted that rotational alignment components 3024 can be placed close to the perimeter of annular alignment component 3018, and the larger number of magnetic components can provide increased torque at a smaller radius. Complementary rotation alignment components can be disposed around the outer perimeter of any type of annular alignment component (e.g., primary alignment components, secondary alignment components, or annular alignment components as described herein).

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 2304 of FIG. 23 can align rotationally to accessory 2302 (which has both annular alignment component 2316 and rotational alignment component 2322) as well as aligning laterally to another accessory (such as attachment device 100, attachment device 300, or attachment device 500) that has annular alignment component 2316 but not rotational alignment component 2322. In the latter case, lateral alignment can be achieved, e.g., to support efficient wireless charging, but there may be no preferred rotational alignment, or rotational alignment may be achieved using a non-magnetic feature (e.g., a mechanical retention feature such as a ledge, a clip, a notch, or the like). A rotational alignment component can be used together with any type of annular alignment component (e.g., primary alignment components, secondary alignment components, or annular alignment components as described herein).

In embodiments described above, it is assumed (though not required) that the magnetic alignment components are fixed in position relative to the device enclosure and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 31A through 31C illustrate examples of moving magnets according to an embodiment of the present invention. In these examples, first electronic device 3100 can be an attachment device (such as attachment device 100, attachment device 300, attachment device 500, or other attachment device according to an embodiment of the present invention), a wireless charging device, or other device having a magnet 3110 (which can be, e.g., any of the annular or other magnetic alignment components such as the magnet arrays and alignment magnets described above). In FIG. 31A, moving magnet 3110 can be housed in a first electronic device 3100. First electronic device 3100 can include device enclosure 3130, magnet 3110, and shield 3120. Magnet 3110 can be in a first position (not shown) adjacent to nonmoving shield 3120. In this position, magnet 3110 can be separated from device enclosure 3130. As a result, the magnetic flux 3112 at a surface of device enclosure 3130 can be relatively low, thereby protecting magnetic devices and magnetically stored information, such as information stored on payment cards. As magnet 3110 in first electronic device 3100 is attracted to a second magnet (not shown) in a second electronic device (not shown), magnet 3110 can move, for example it can move away from shield 3120 to be adjacent to device enclosure 3130, as shown. With magnet 3110 at this location, magnetic flux 3112 at surface of device enclosure 3130 can be relatively high. This increase in magnetic flux 3112 can help to attract the second electronic device to first electronic device 3100.

With this configuration, it can take a large amount of magnetic attraction for magnet 3110 to separate from shield 3120. Accordingly, these and other embodiments of the present invention can include a shield that is split into a shield portion and a return plate portion. For example, in FIG. 31B, line 3160 can be used to indicate a split of shield 3120 into a shield 3140 and return plate 3150.

In FIG. 31C, moving magnet 3110 can be housed in first electronic device 3100. First electronic device 3100 can include device enclosure 3130, magnet 3110, shield 3140, and return plate 3150. In the absence of a magnetic attraction, magnet 3110 can be in a first position (not shown) such that shield 3140 can be adjacent to return plate 3150. Again, in this configuration, magnetic flux 3112 at a surface of device enclosure 3130 can be relatively low. As magnet 3110 and first electronic device is attracted to a second magnet (not shown) in a second electronic device (not shown), magnet 3110 can move, for example it can move away from return plate 3150 to be adjacent to device enclosure 3130, as shown. In this configuration, shield 3140 can separate from return plate 3150 and the magnetic flux 3112 at a surface of device enclosure 3130 can be increased. As before, this increase in magnetic flux 3112 can help to attract the second electronic device to the first electronic device 3100.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 32B:
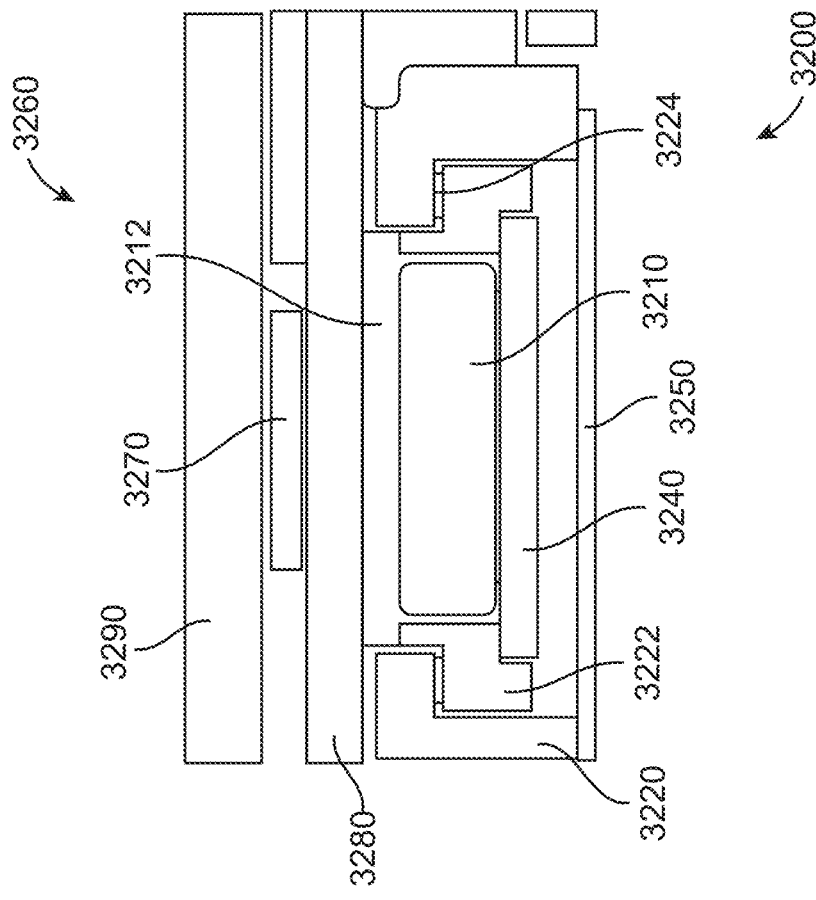
FIGS. 32A and 32B illustrate a moving magnetic structure according to an embodiment of the present invention.
Figure 32A:
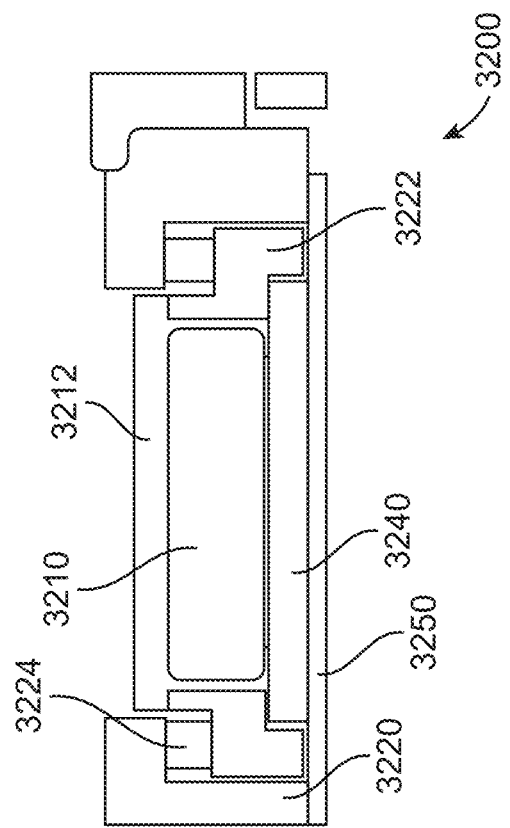

FIGS. 32A and 32B illustrate a moving magnetic structure according to an embodiment of the present invention. In this example, first electronic device 3200 can be an attachment device (such as attachment device 100, attachment device 300, attachment device 500, or other attachment device according to an embodiment of the present invention), a wireless charging device, or other device having a magnet 3210 (which can be, e.g., any of the annular or other magnetic alignment components such as the magnet arrays and alignment magnets described above). FIG. 32A illustrates a moving first magnet 3210 in a first electronic device 3200. First electronic device 3200 can include first magnet 3210, protective surface 3212, housings 3220 and 3222, compliant structure 3224, shield 3240, and return plate 3250. In this figure, first magnet 3210 is not attracted to a second magnet (not shown), and therefore shield 3240 is magnetically attracted to or attached to return plate 3250. In this position, compliant structure 3224 can be expanded or relaxed. Compliant structure 3224 can be formed of an elastomer, silicon rubber open cell foam, silicon rubber, polyurethane foam, or other foam or other compressible material.

In FIG. 32B, second electronic device 3260 has been brought into proximity of first electronic device 3200. Second magnet 3270 can attract first magnet 3210, thereby causing shield 3240 and return plate 3250 to separate from each other. Housings 3220 and 3222 can compress compliant structure 3224, thereby allowing protective surface 3212 of first electronic device 3200 to move towards or adjacent to housing 3280 of second electronic device 3260. Second magnet 3270 can be held in place in second electronic device 3260 by housing 3290 or other structure. As second electronic device 3260 is removed from first electronic device 3200, first magnet 3210 and shield 3240 can be magnetically attracted to return plate 3250, as shown in FIG. 32A.

Figure 33B:
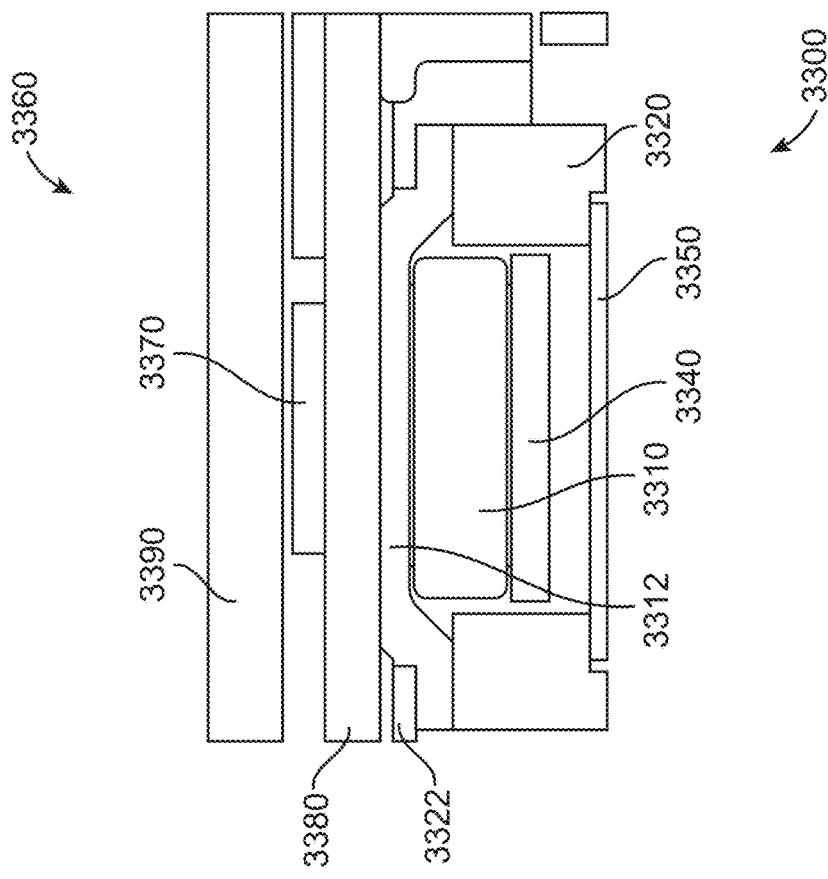
FIGS. 33A and 33B illustrate a moving magnetic structure according to an embodiment of the present invention.
Figure 33A:
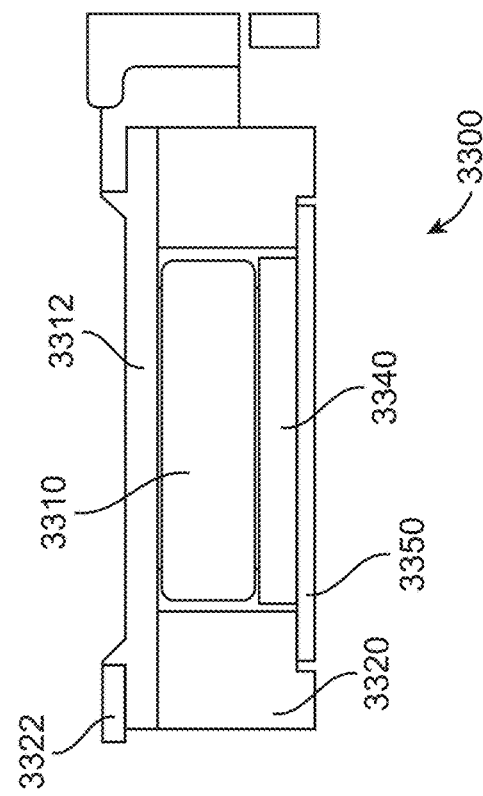

FIGS. 33A and 33B illustrate moving magnetic structures according to an embodiment of the present invention. In this example, first electronic device 3300 can be an attachment device (such as attachment device 100, attachment device 300, attachment device 500, or other attachment device according to an embodiment of the present invention), a wireless charging device, or other device having a magnet 3310 (which can be, e.g., any of the annular or other magnetic alignment components such as the magnet arrays and alignment magnets described above). FIG. 33A illustrates a moving first magnet 3310 in a first electronic device 3300. First electronic device 3300 can include first magnet 3310, pliable surface 3312, housing portions 3320 and 3322, shield 3340, and return plate 3350. In this figure, first magnet 3310 is not attracted to a second magnet, and therefore shield 3340 is magnetically attached or attracted to return plate 3350. In this position, pliable surface 3312 can be relaxed. Pliable surface 3312 can be formed of an elastomer, silicon rubber open cell foam, silicon rubber, polyurethane foam, or other foam or other compressible material.

In FIG. 33B, second electronic device 3360 has been brought into the proximity of first electronic device 3300. Second magnet 3370 can attract first magnet 3310, thereby causing shield 3340 and return plate 3350 to separate from each other. First magnet 3310 can stretch pliable surface 3312 towards second electronic device 3360, thereby allowing first magnet 3310 of first electronic device 3300 to move towards housing 3380 of second electronic device 3360. Second magnet 3370 can be held in place in second electronic device 3360 by housing 3390 or other structure. As second electronic device 3360 is removed from first electronic device 3300, first magnet 3310 and shield 3340 can be magnetically attracted to return plate 3350 as shown in FIG. 33A.

Figure 34:
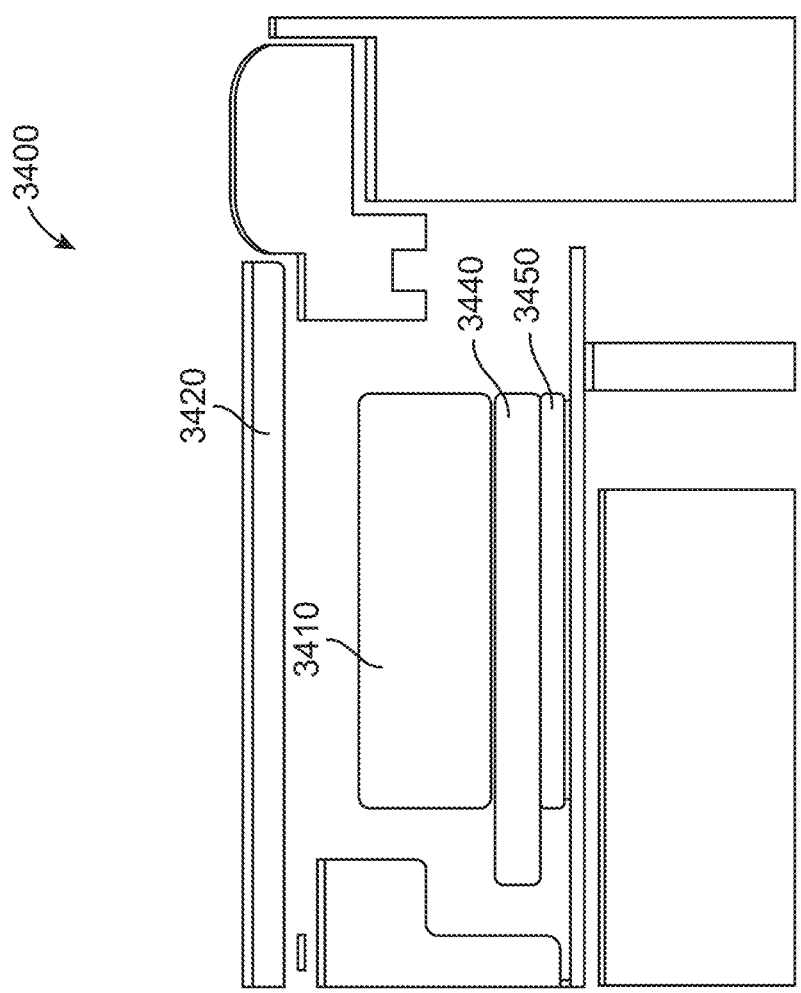
FIG. 34 through FIG. 36 illustrate a moving magnetic structure according to an embodiment of the present invention.
Figure 35:
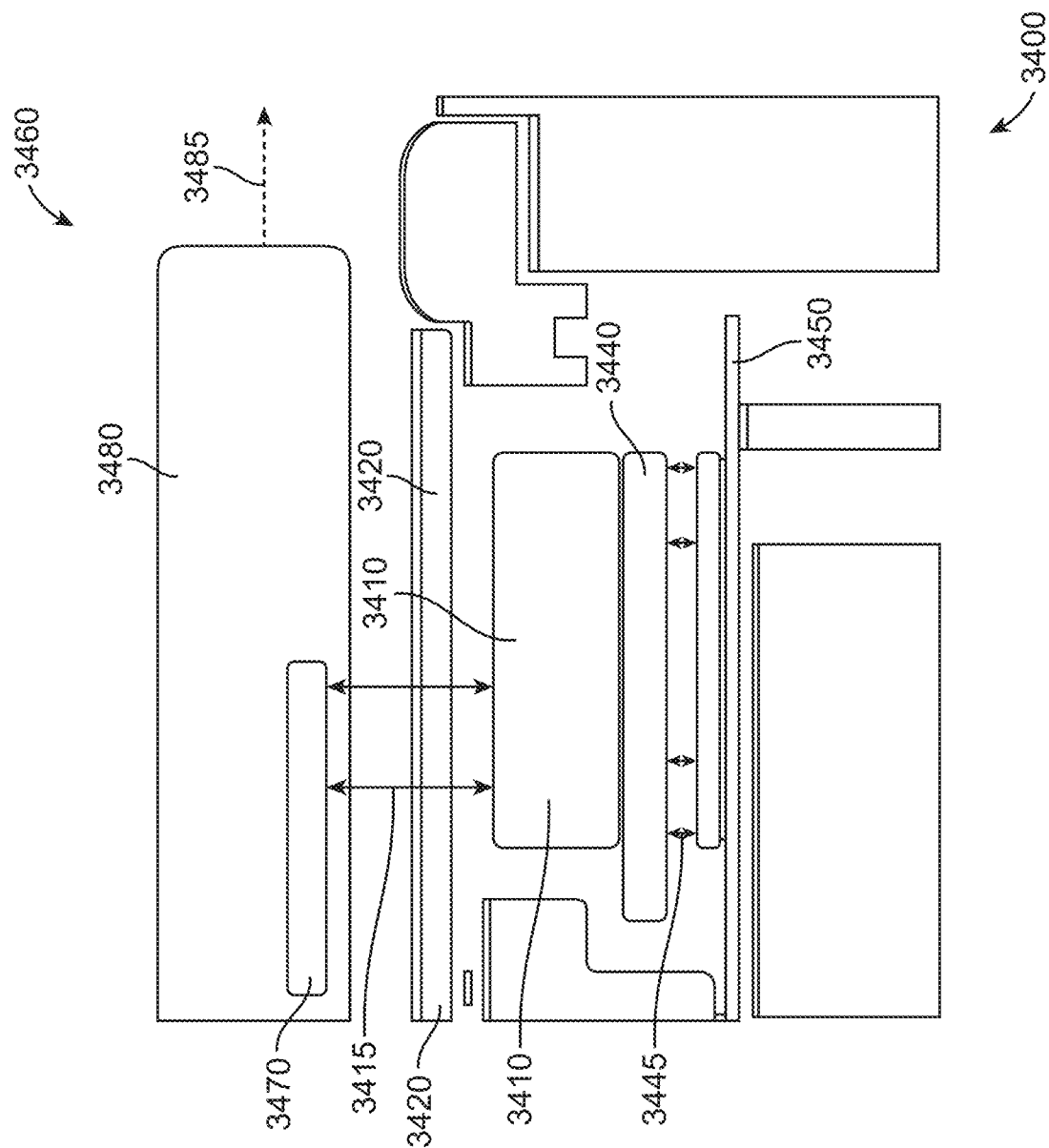
Figure 36:
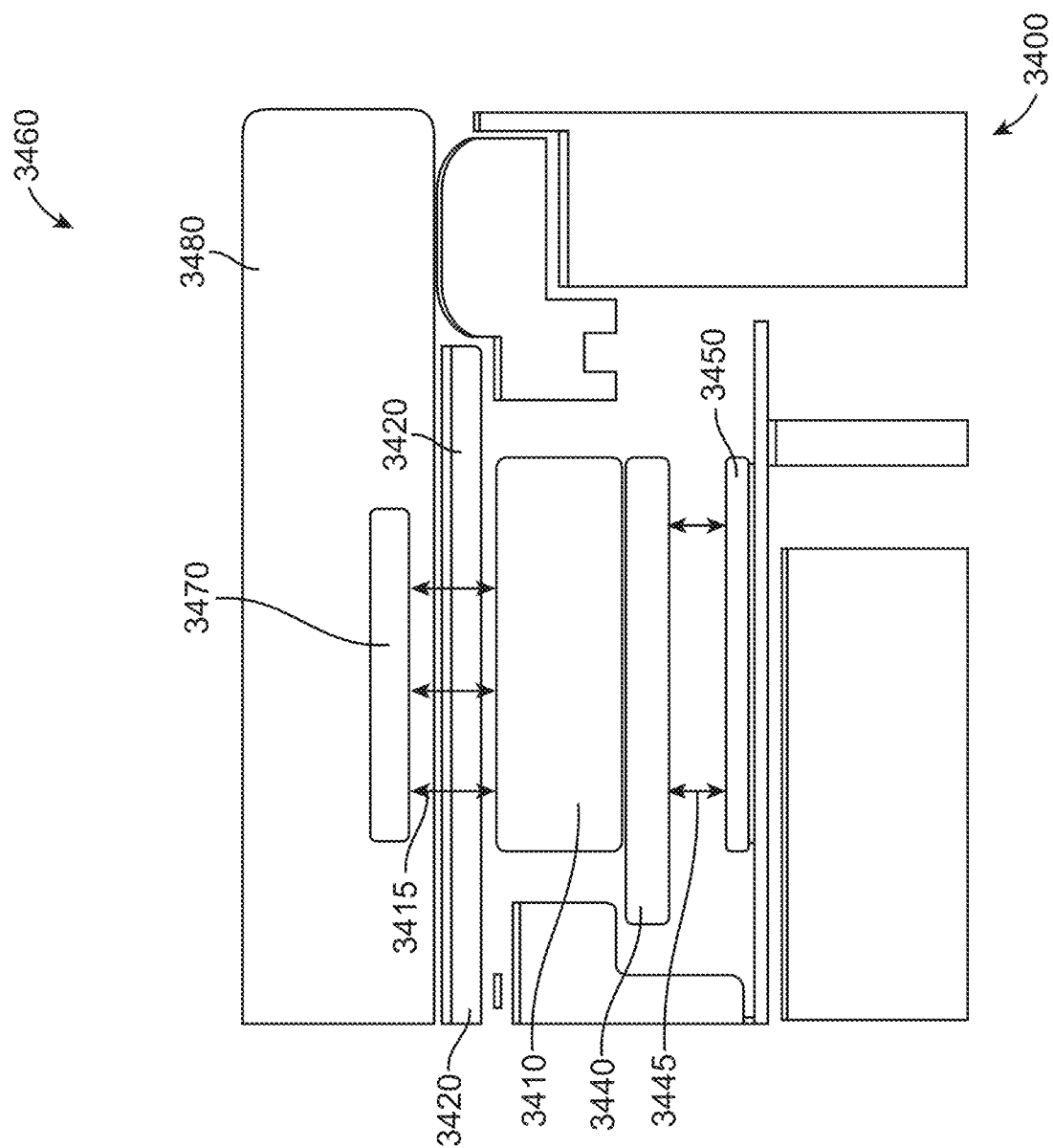

FIGS. 34-36 illustrate a moving magnetic structure according to an embodiment of the present invention. In this example, first electronic device 3400 can be an attachment device (such as attachment device 100, attachment device 300, attachment device 500, or other attachment device according to an embodiment of the present invention), a wireless charging device, or other device having a magnet 3410 (which can be, e.g., any of the annular or other magnetic alignment components such as the magnet arrays and alignment magnets described above). In FIG. 34, first magnet 3410 and shield 3440 can be magnetically attracted or attached to return plate 3450 in first electronic device 3400. First electronic device 3400 can be at least partially housed in device enclosure 3420. In FIG. 35, housing 3480 of second electronic device 3460 can move laterally across a surface of device enclosure 3420 of first electronic device 3400 in a direction 3485. Second magnet 3470 in second electronic device 3460 can begin to attract first magnet 3410 in first electronic device 3400. This magnetic attraction 3415 can cause first magnet 3410 and shield 3440 to pull away from return plate 3450 by overcoming the magnetic attraction 3445 between shield 3440 and return plate 3450. In FIG. 36, second magnet 3470 in second electronic device 3460 has become aligned with first magnet 3410 in first electronic device 3400. First magnet 3410 and shield 3440 have pulled away from return plate 3450 thereby reducing the magnetic attraction 3445. First magnet 3410 has moved nearby or adjacent to device enclosure 3420, thereby increasing the magnetic attraction 3415 to second magnet 3470 in second electronic device 3460.

As shown in FIGS. 34-36, the magnetic attraction between first magnet 3410 in first electronic device 3400 and the second magnet 3470 in the second electronic device 3460 can increase when first magnet 3410 and shield 3440 pull away from return plate 3450. This is shown graphically in the following figures.

Figure 37:
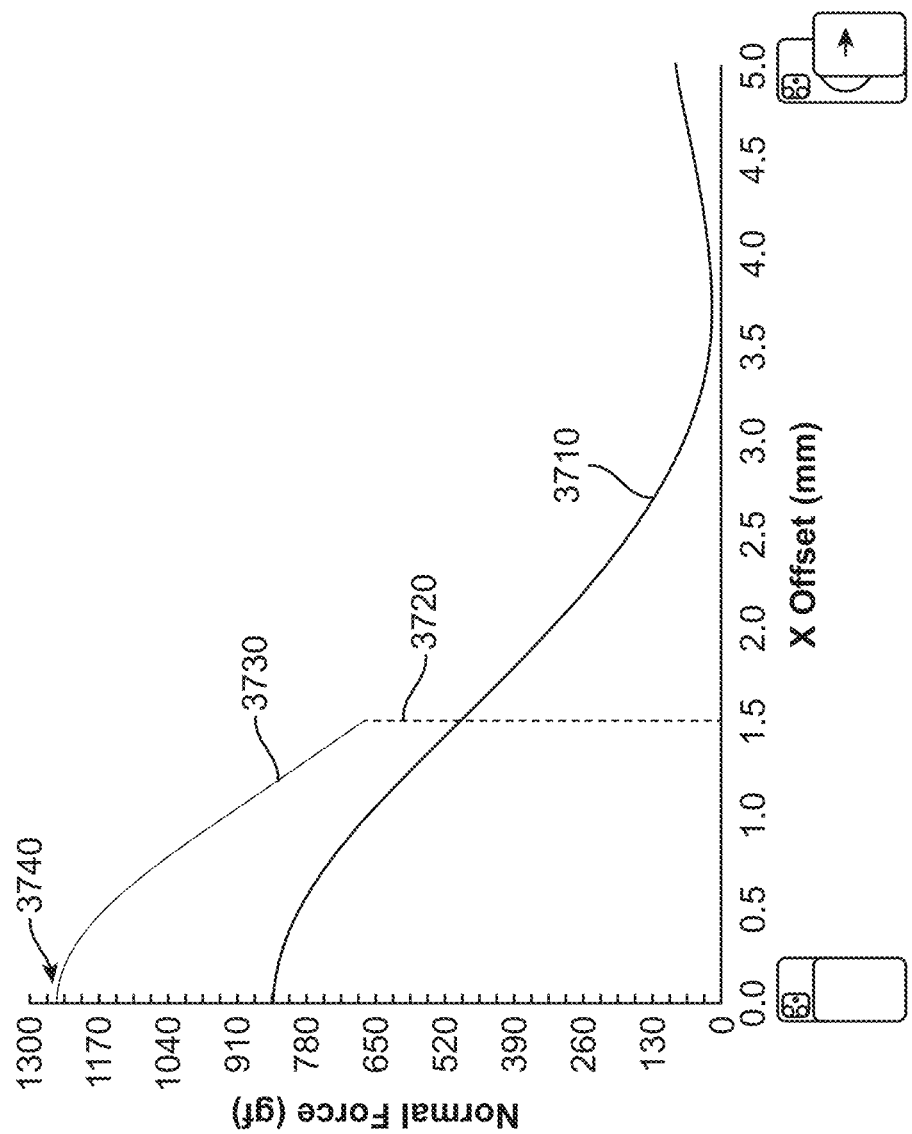
FIG. 37 illustrates a normal force between a first magnet in a first electronic device and a second magnet in a second electronic device.

FIG. 37 illustrates a normal force between a first magnet in first electronic device and a second magnet in a second electronic device as a function of a lateral offset between them. As shown in FIGS. 34-36, with a large offset between first magnet 3410 and second magnet 3670, first magnet 3410 and shield 3440 can remain attached to return plate 3450 in first electronic device 3400 and the magnetic attraction 3415 can be minimal. The shear force necessary to overcome this magnetic attraction is illustrated here as curve 3710. As shown in FIG. 35, as the offset or lateral distance between first magnet 3410 and second magnet 3470 decreases, first magnet 3410 and shield 3440 can pull away or separate from return plate 3450, thereby increasing the magnetic attraction 3415 between first magnet 3410 and second magnet 3470. This is illustrated here as discontinuity 3720. As shown in FIG. 36, as first magnet 3410 and second magnet 3470 come into alignment, the magnetic attraction 3415 increases along curve 3730 to a maximum 3740. The difference between curve 3710 and curve 3730 can show the increase in magnetic attraction between a phone or other electronic device, such as second electronic device 3460 and an attachment device (such as attachment device 100, attachment device 300, attachment device 500, or other attachment device according to an embodiment of the present invention) or wireless charging device, such as first electronic device 3400, that results from first magnet 3410 being able to move axially. It should also be noted that in this example first magnet 3410 does not move in a lateral direction, though in other examples it is capable of such movement. Where first magnet 3410 is capable of moving in a lateral direction, curve 3730 can have a flattened peak from an offset of zero to an offset that can be overcome by a range of possible lateral movement of first magnet 3410.

Figure 38:
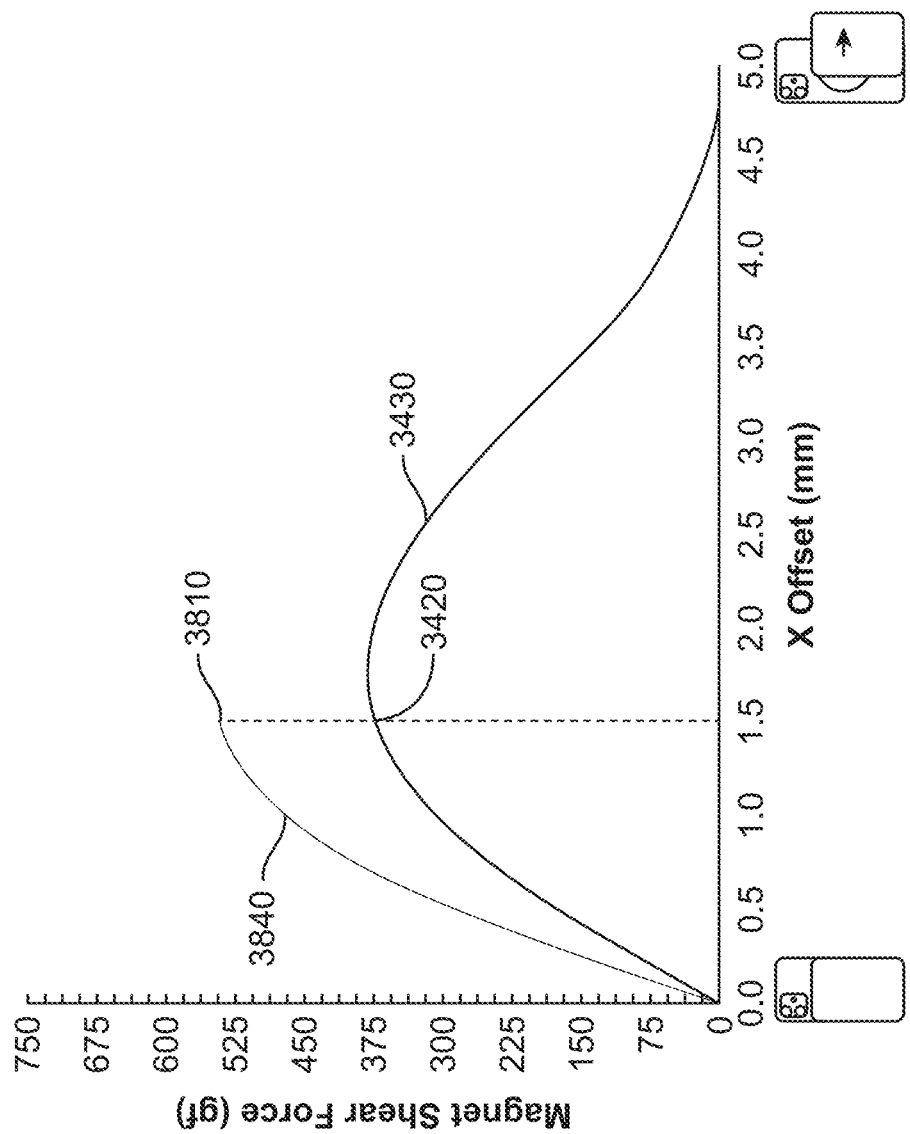
FIG. 38 illustrates a shear force between a first magnet in a first electronic device and a second magnet in a second electronic device.

FIG. 38 illustrates a shear force between a first magnet in a first electronic device and a second magnet in a second electronic device as a function of a lateral offset between them. With no offset between first magnet 3410 and second magnet 3460, there it is no shear force to move second magnet 3470 relative to first magnet 3410, as shown in FIG. 34. As the offset is increased, the shear force, that is the force attempting to realign the magnets, can increase along curve 3840. At discontinuity 3810, first magnet 3410 and shield 3440 can return to return plate 3450 (as shown in FIGS. 34-36), thereby decreasing the magnetic shear force to point 3820. The magnetic shear force can continue to drop off along curve 3830 as the offset increases. The difference between curve 3830 and curve 3840 can show the increase in magnetic attraction between a phone or other electronic device, such as second electronic device 3460 and an attachment device (such as attachment device 100, attachment device 300, attachment device 500, or other attachment device according to an embodiment of the present invention) or wireless charging device, such as first electronic device 3400, that results from first magnet 3410 being able to move axially. It should also be noted that in this example first magnet 3410 does not move in a lateral direction, though in other examples it is capable of such movement. Where first magnet 3410 is capable of moving in a lateral direction, curve 3830 can remain at zero until the lateral movement of the second magnet 3470 overcomes the range of possible lateral movement of first magnet 3410.

In these and other embodiments of the present invention, it can be desirable to further increase this shear force. Accordingly, embodiments of the present invention can provide various high friction or high stiction surfaces, suction cups, pins, or other structures to increase this shear force. Examples are shown in the following figures.

Figure 39B:
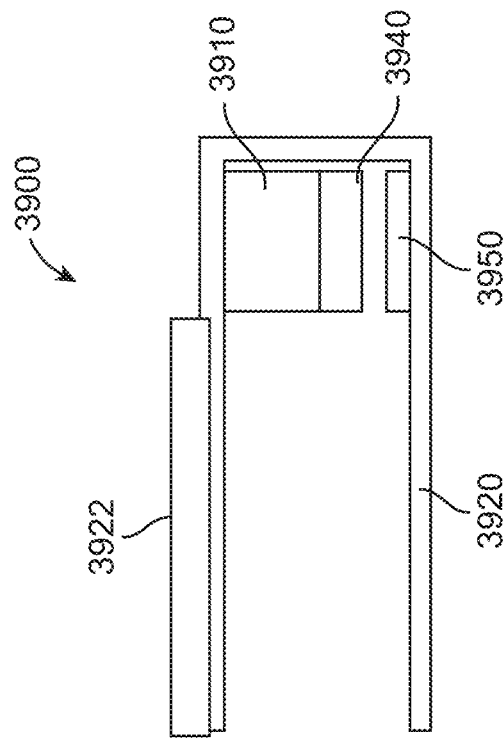
FIGS. 39A and 39B illustrate a moving magnet in conjunction with a high friction surface according to an embodiment of the present invention.
Figure 39A:
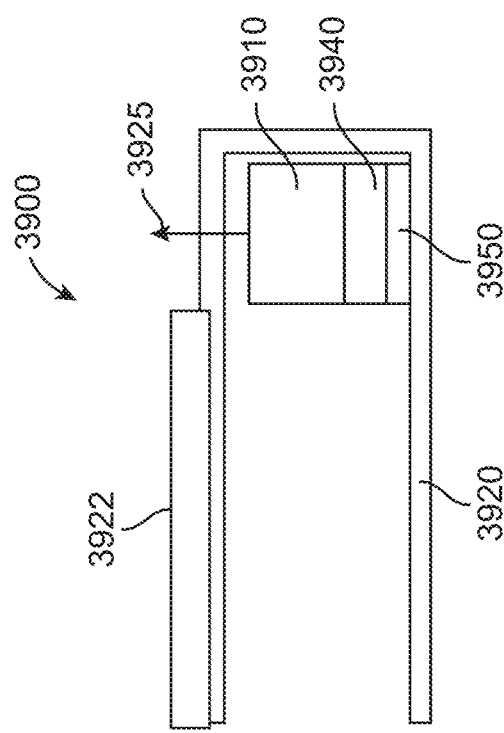

FIGS. 39A and 39B illustrate a moving magnet in conjunction with a high friction or high stiction surface according to an embodiment of the present invention. In this example, first electronic device 3900 can be an attachment device (such as attachment device 100, attachment device 300, attachment device 500, or other attachment device according to an embodiment of the present invention), a wireless charging device, or other device having a magnet 3910 (which can be, e.g., any of the annular or other magnetic alignment components such as the magnet arrays and alignment magnets described above). In FIG. 39A, first magnet 3910 and shield 3940 can be magnetically attracted or attached to return plate 3950 in first electronic device 3900. First electronic device 3900 can be housed in device enclosure 3920. Some or all of a surface of device enclosure 3920 can have a coating, layer, or other structure 3922. Structure 3922 can provide a high friction or high stiction surface. In FIG. 39B, first magnet 3910 and shield 3940 can be attracted to a second magnet (not shown) in a second electronic device (not shown.) As before, the separation of first magnet 3910 and shield 3940 from return plate 3950 can provide an increased amount of magnetic flux to hold the second electronic device in place relative to first electronic device 3900. Structure 3922 can increase the friction or stiction between first electronic device 3900 and the second electronic device in a lateral or shear direction. Structure 3922 can also increase the stiction between first electronic device 3900 and the second electronic device in a normal direction.

FIGS. 40A and 40B illustrate a moving magnet in conjunction with a high friction or high stiction surface according to an embodiment of the present invention. In this example, first electronic device 4000 can be an attachment device (such as attachment device 100, attachment device 300, attachment device 500, or other attachment device according to an embodiment of the present invention), a wireless charging device, or other device having a magnet 4010 (which can be, e.g., any of the annular or other magnetic alignment components such as the magnet arrays and alignment magnets described above). In FIG. 40A, first magnet 4010 and shield 4040 can be magnetically attracted or attached to return plate 4050 in first electronic device 4000. First electronic device 4000 can be housed in device enclosure 4020. Some or all of a surface of device enclosure 4020 can have a coating, layer, or other structure 4022, in this example over first magnet 4010. Structure 4022 can provide a high friction or high stiction surface. In FIG. 40B, first magnet 4010 and shield 4040 can be attracted to a second magnet (not shown) in a second electronic device (not shown.) This can cause first magnet 4010 and shield 4040 to separate from return plate 3950, thereby deforming structure 4022, which can be pliable or compliant. As before, first magnet 4010 can provide an increased amount of magnetic flux to hold the second electronic device in place relative to first electronic device 4000. Structure 4022 can increase the friction or stiction between first electronic device 4000 and the second electronic device in a lateral or shear direction. Structure 4022 can also increase the stiction between first electronic device 4000 and the second electronic device in a normal direction.

Figure 41B:
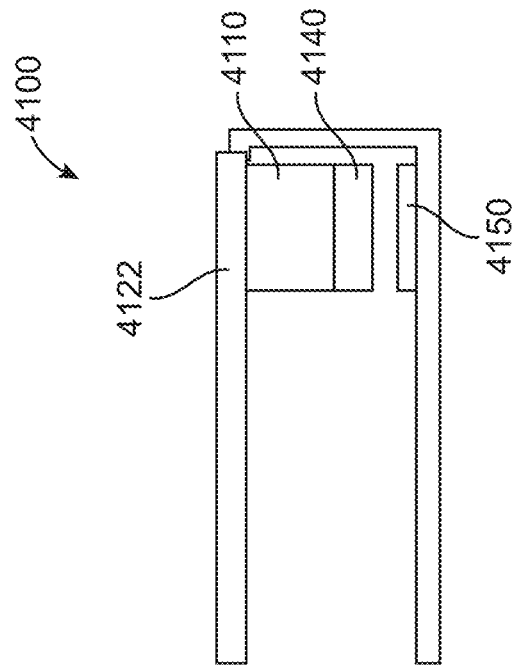
FIGS. 41A and 41B illustrate a moving magnet in conjunction with a high friction surface according to an embodiment of the present invention.
Figure 41A:
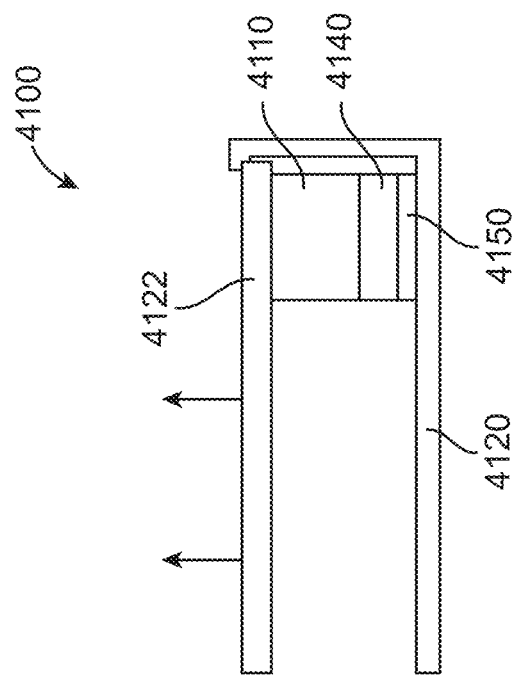

FIGS. 41A and 41B illustrate a moving magnet in conjunction with a high friction surface according to an embodiment of the present invention. In this example, first electronic device 4100 can be an attachment device (such as attachment device 100, attachment device 300, attachment device 500, or other attachment device according to an embodiment of the present invention), a wireless charging device, or other device having a magnet 4110 (which can be, e.g., any of the annular or other magnetic alignment components such as the magnet arrays and alignment magnets described above). In FIG. 41A, first magnet 4110 and shield 4140 can be magnetically attracted or attached to return plate 4150 in first electronic device 4100. First electronic device 4100 can be housed in device enclosure 4120. Some or all of a surface of device enclosure 4120 can have a coating, layer, or other structure 4122, in this example over a top surface of first electronic device 4100. Structure 4122 can provide a high friction or high stiction surface. In FIG. 41B, first magnet 4110 and shield 4140 can be attracted to a second magnet (not shown) in a second electronic device (not shown.) The separation of first magnet 4110 and shield 4140 from return plate 4150 can push the top surface formed by structure 4122 upward where it can engage the second electronic device with a high-friction surface. As before, first magnet 4110 can provide an increased amount of magnetic flux to hold the second electronic device in place relative to first electronic device 4100. Structure 4122 can increase the friction or stiction between first electronic device 4100 and the second electronic device in a lateral or shear direction. Structure 4122 can also increase the stiction between first electronic device 4100 and the second electronic device in a normal direction.

Figure 42B:
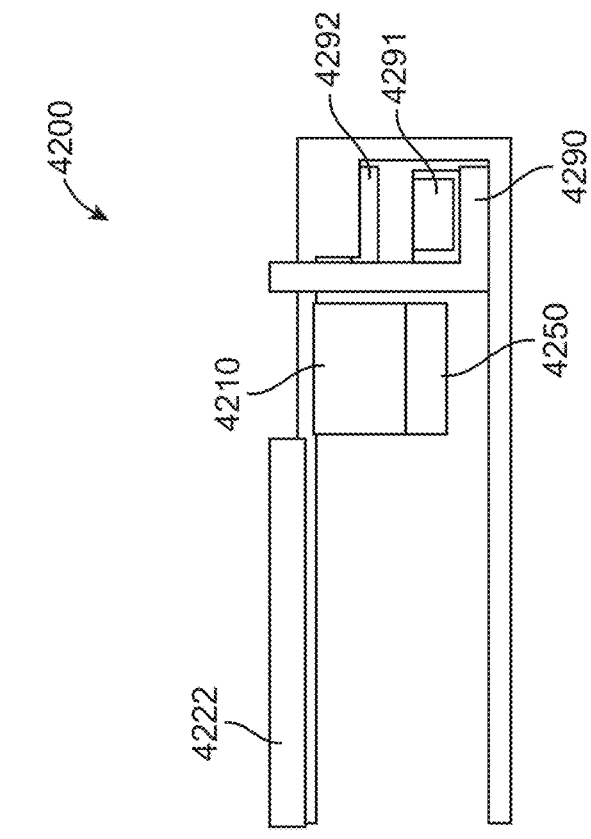
FIGS. 42A and 42B illustrate another moving magnet in conjunction with a high friction surface according to an embodiment of the present invention.
Figure 42A:
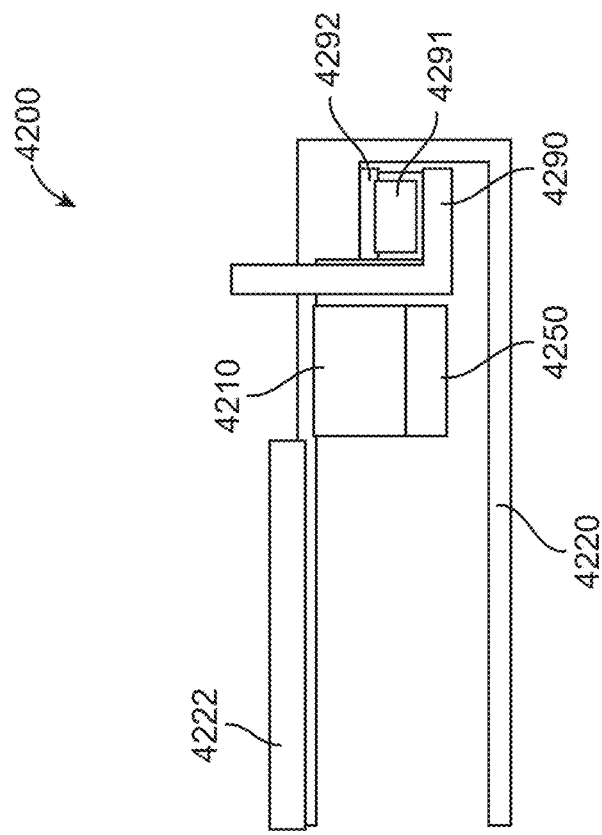

FIGS. 42A and 42B illustrate another moving magnet in conjunction with a high friction or high stiction surface according to an embodiment of the present invention. In this example, first electronic device 4200 can be an attachment device (such as attachment device 100, attachment device 300, attachment device 500, or other attachment device according to an embodiment of the present invention), a wireless charging device, or other device having a magnet 4210 (which can be, e.g., any of the annular or other magnetic alignment components such as the magnet arrays and alignment magnets described above). In FIG. 42A, first magnet 4210 and first return plate 4250 can be fixed in place in device enclosure 4220 of first electronic device 4200. Some or all of a surface of device enclosure 4220 can have a coating, layer, or other structure 4222. Structure 4222 can provide a high friction or high stiction surface. First electronic device 4200 can further include a moving second magnet 4291 and second shield 4292, which can be attached to sliding mechanism 4290. In FIG. 42B, as a second electronic device (not shown) comes into contact with first electronic device 4200, sliding mechanism 4290 can be depressed, thereby moving second magnet 4291 away from second shield 4292 and the top surface of device enclosure 4220. The polarity of second magnet 4291 can be in opposition to, or the opposite of, the polarity of first magnet 4210, such that the net magnetic flux at a top surface of device enclosure 4220 is increased as sliding mechanism 4290 is depressed. Structure 4222 can increase the friction or stiction between first electronic device 4200 and the second electronic device in a lateral or shear direction. Structure 4222 can also increase the stiction between first electronic device 4200 and the second electronic device in a normal direction.

Figure 43:
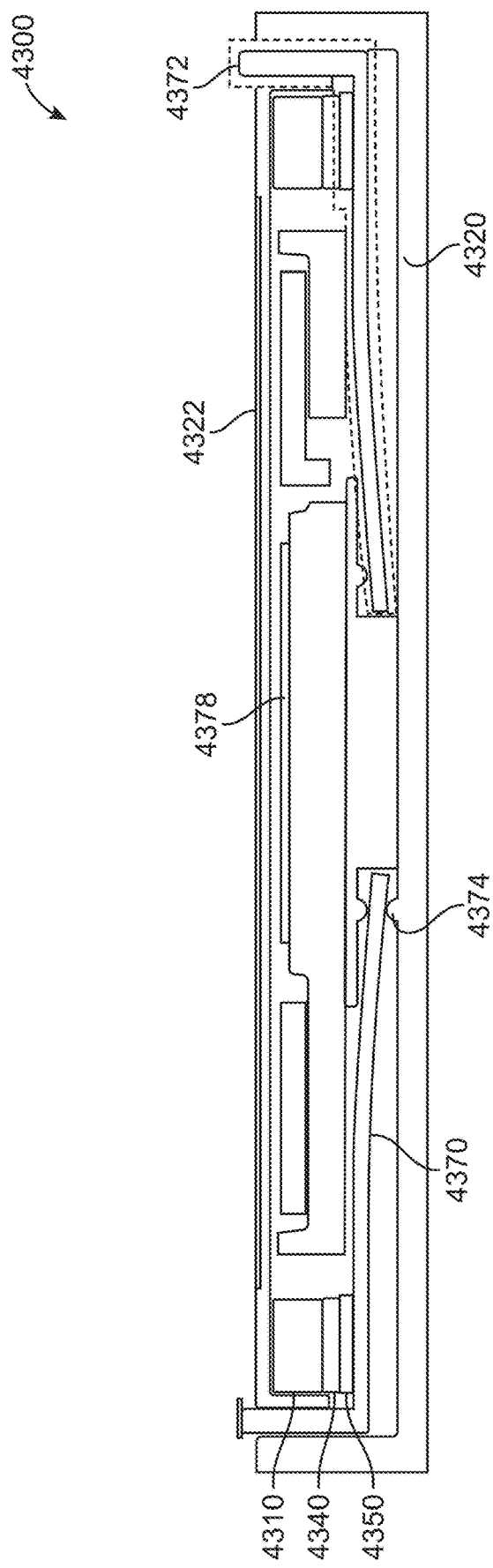
FIG. 43 illustrates a cutaway side view of another moving magnet structure according to an embodiment of the present invention.

FIG. 43 illustrates a cutaway side view of another moving magnet structure according to an embodiment of the present invention. In this example, moving magnets can be incorporated with inductive charging, near field communication complements, or other electronic circuits or components in an electronic device. First electronic device 4300 can be, or can be a part of, attachment device 100, attachment device 300, attachment device 500, a charging puck, card reader, or other electronic device. Moving first magnets 4210 (which can be any of the annular magnets shown above), shields 4240, and return plates 4250 can be housed in device enclosure 4220 of first electronic device 4200. Return plates 4250 can be attached to beams 4270. Beams 4270 can be anchored to device enclosure 4220 at points 4274. Beams 4270 can have tips 4272 extending above a top surface of device enclosure 4220. A high friction or high stiction structure 4222 can be included over all or a portion of a top surface of first electronic device 4200.

Figure 44:
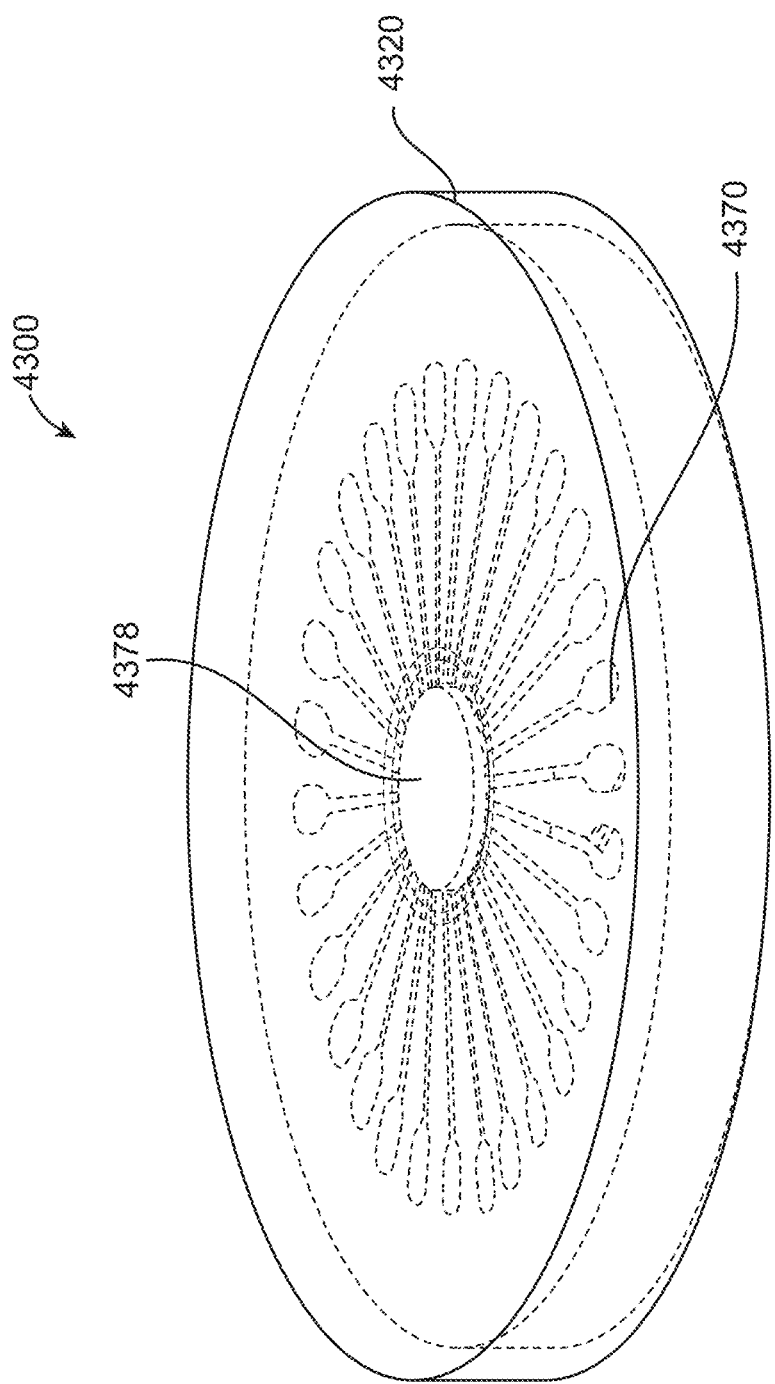
FIG. 44 is a partially transparent view of the moving magnet structure of FIG. 43.

FIG. 44 is a partially transparent view of the moving magnet structure of FIG. 43. First electronic device 4300 can be housed in device enclosure 4320. As before, first electronic device 4300 can include inductive charging, near field communication complements, or other electronic circuits for components 4378. Return plates 4350 (shown in FIG. 43) can be attached to beams 4370.

Figure 45:
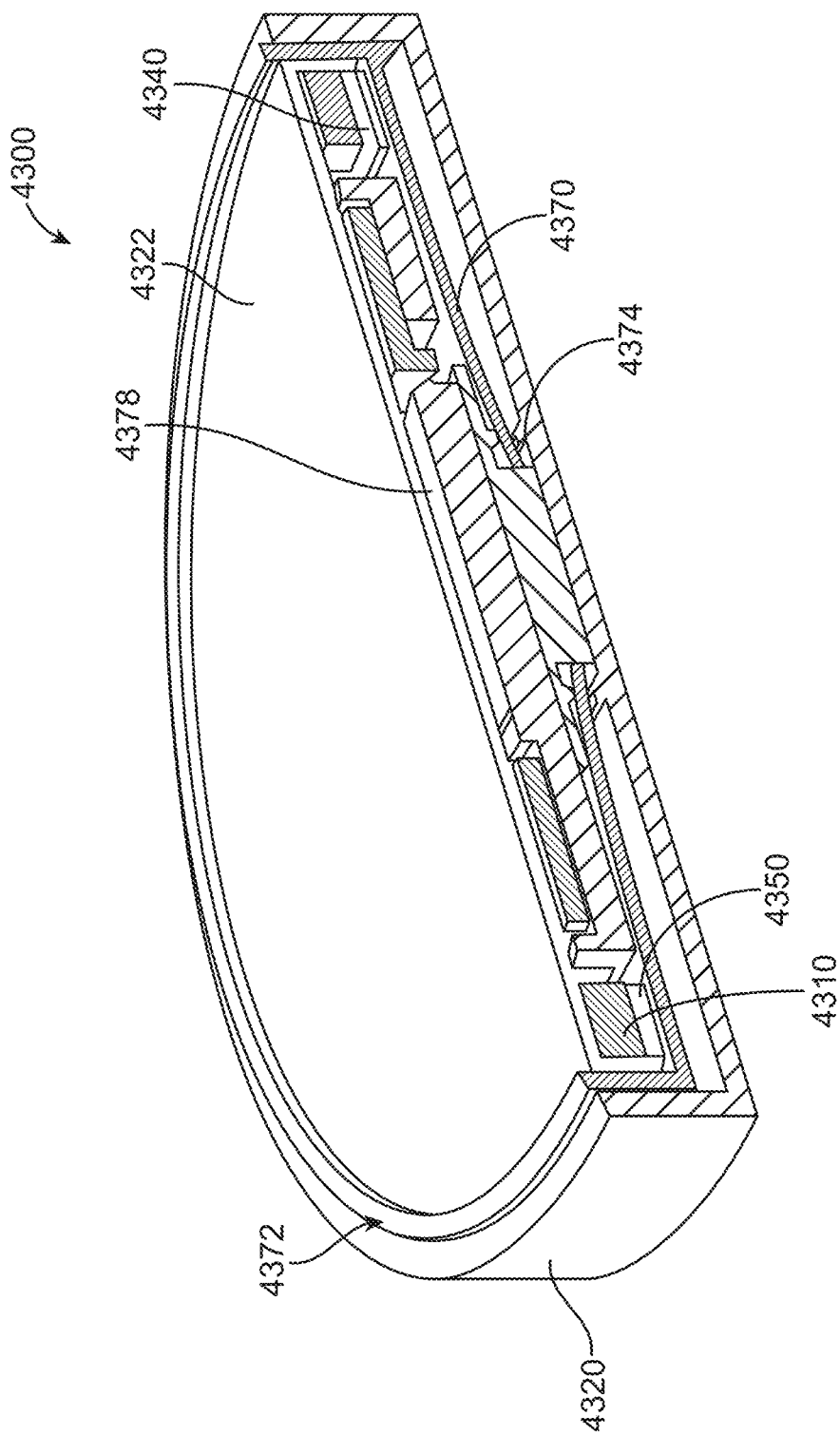
FIG. 45 is another cutaway side view of the electronic device of FIG. 43.

FIG. 45 is another cutaway side view of the electronic device of FIG. 43. First electronic device 4300 can be housed in device enclosure 4320. As before, first electronic device 4300 can include inductive charging, near field communication components, or other electronic circuits for components 4378. Return plates 4350 can be attached to beams 4370. First magnets 4310 and shield 4340 can be attracted or attached to return plate 4350. A high friction or high stiction structure 4322 can cover some or all of a top surface of first electronic device 4300. Beams 4370 can be attached to return plates 4350, can be anchored at points 4374, and can have a tip 4372 extending above top surface of device enclosure 4320.

Figure 46:
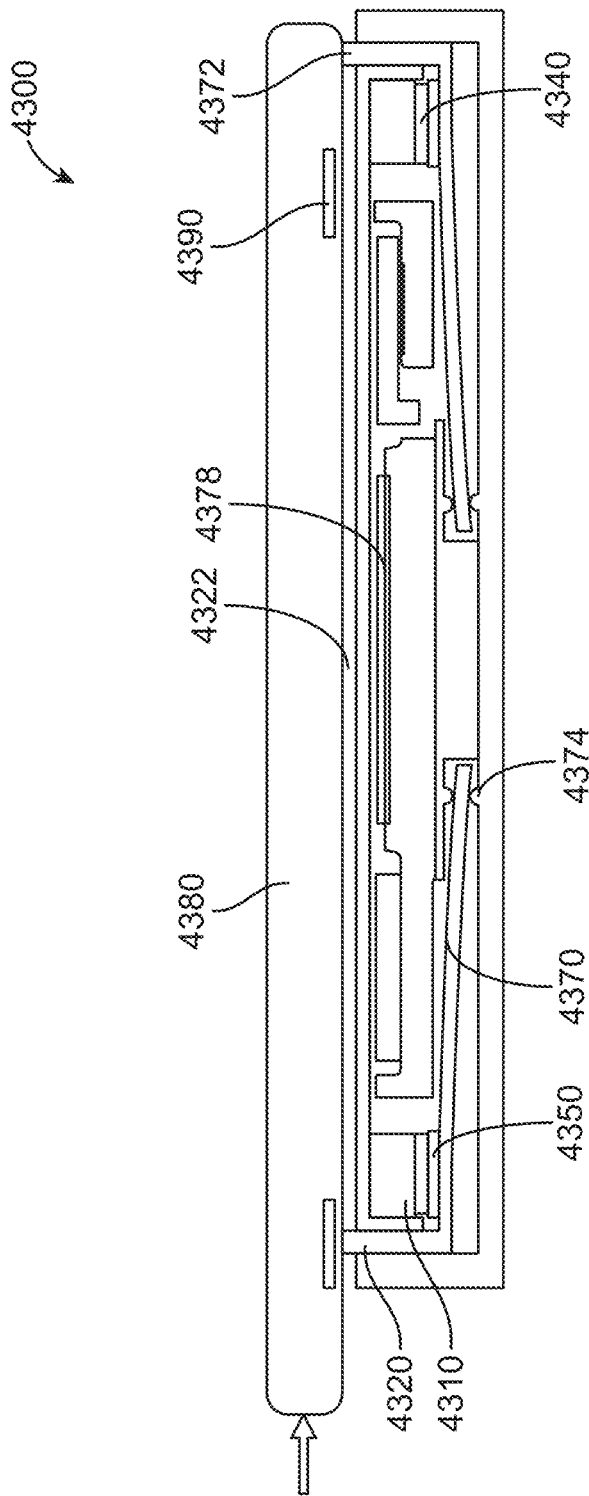
FIGS. 46 and 47 illustrate the electronic device of FIG. 43 as it engages with a second electronic device.
Figure 47:
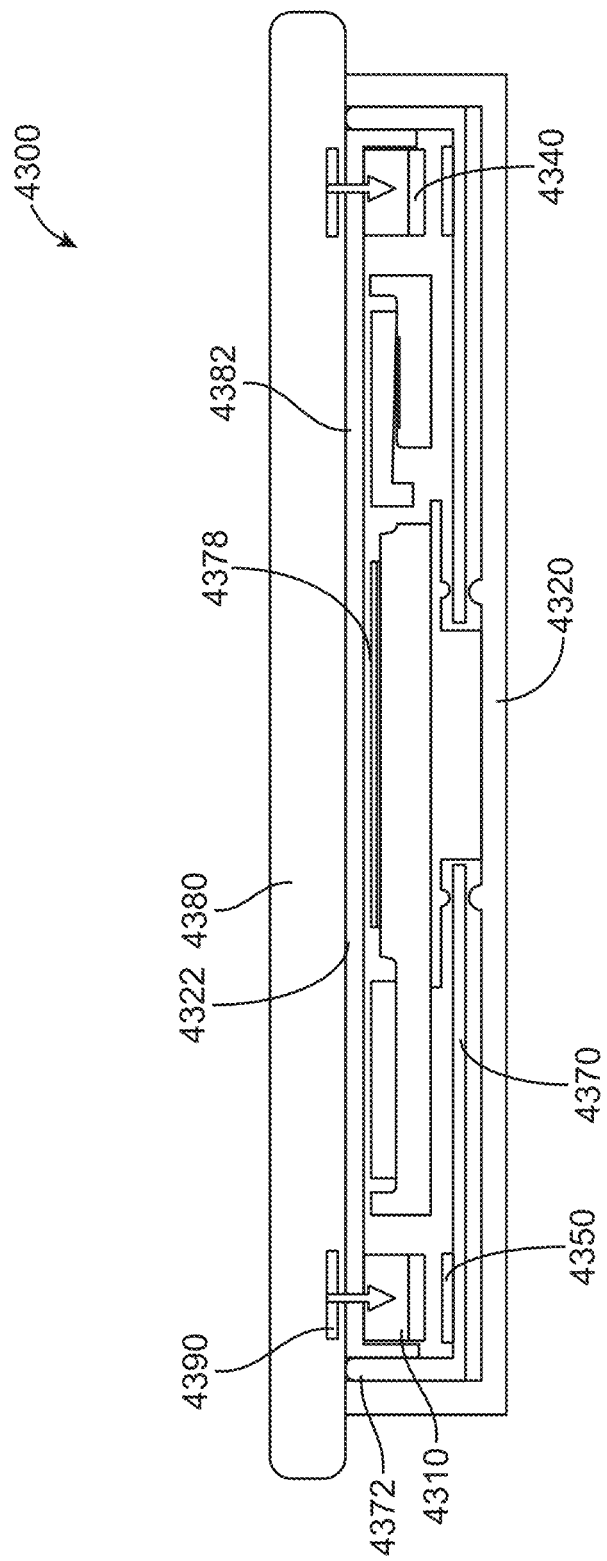

FIGS. 46 and 47 illustrate the electronic device of FIG. 43 as it engages with a second electronic device. In FIG. 46, second electronic device 4380 can include second magnets 4390. Second electronic device 4380 can engage with first electronic device 4300. First electronic device 4300 can include first magnets 4310, shields 4340, and return plates 4350. Return plates 4350 can be attached to beams 4370. Beams 4370 can include tips 4372 which can extend above a top surface of device enclosure 4320. Tips 4372 can prevent second electronic device 4380 from engaging with the high friction or high stiction structure 4322 of first electronic device 4300 until the second electronic device 4380 is aligned, or nearly aligned, with first electronic device 4300. Beams 4370 can be attached at points 4374 to device enclosure 4320. First electronic device 4300 can include components 4378.

In FIG. 47, second electronic device 4380 can be aligned with the first electronic device 4300. When this occurs, first magnets 4310 and shields 4340 can detach from return plates 4350. This can increase magnetic flux between second magnets 4390 in second electronic device 4380 and first magnets 4310 and first electronic device 4300. Tips 4372 can become depressed into device enclosure 4320 due to this increase magnetic attraction, thereby further pushing return plates 4350 away from shields 4340. High friction or high stiction structure 4322 can engage with second electronic device 4380 to increase the shear force necessary for a detachment of second electronic device 4380 from first electronic device 4300. Structure 4322 can also increase the stiction between first electronic device 4300 and the second electronic device in a normal direction.

In these and other embodiments of the present invention, various structures can be used to constrain movement of magnets in an electronic device. Examples are shown in the following figures.

Figure 48A:
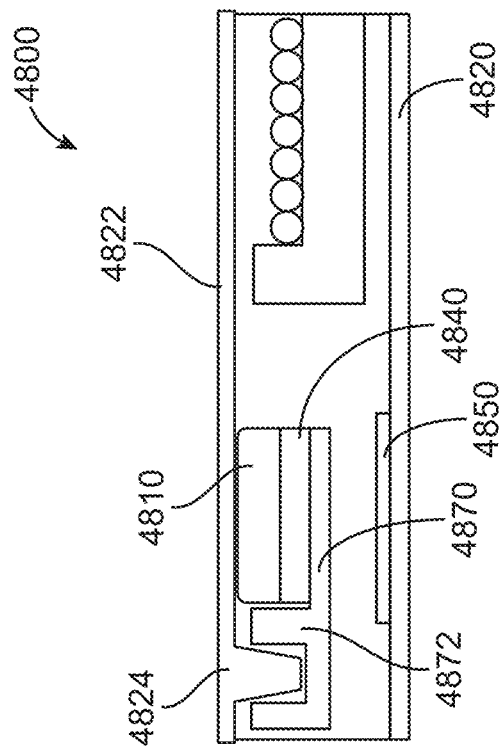
FIGS. 48A and 48B illustrate structures for constraining motions of magnets in an electronic device according to an embodiment of the present invention.
Figure 48B:
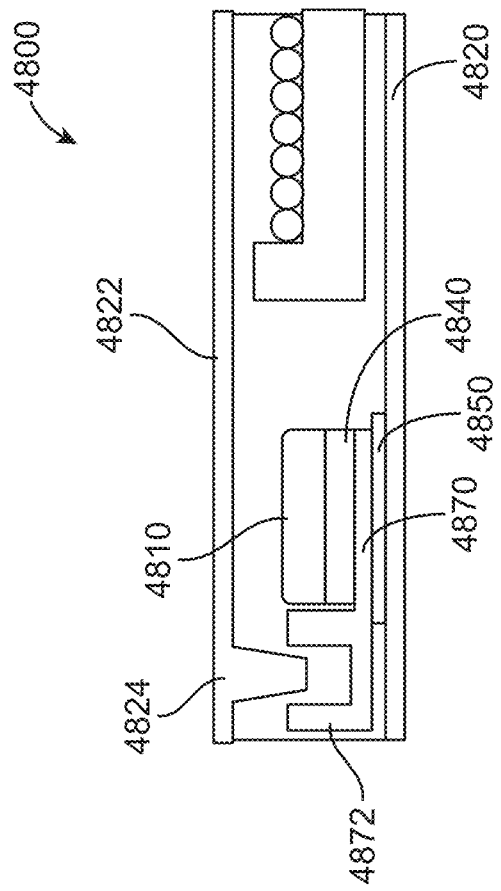

FIGS. 48A and 48B illustrate structures for constraining motions of magnets in an electronic device according to an embodiment of the present invention. In this example, first electronic device 4800 can be an attachment device (such as attachment device 100, attachment device 300, attachment device 500, or other attachment device according to an embodiment of the present invention), a wireless charging device, or other device having a magnet 4810 (which can be, e.g., any of the annular or other magnetic alignment components such as the magnet arrays and alignment magnets described above). In FIG. 48A, magnet 4810, shield 4840, and structure 4870 can be housed by device enclosure 4820 in electronic device 4800. Structure 4870 can include notch 4872, which can accept tab 4824. In FIG. 48B, magnet 4810 has moved, taking along with it shield 4840 and structure 4870. Notch 4872 accepts tab 4824 as shield 4840 detaches from return plate 4850. This can constrain the motion of magnets 4810 in electronic device 4800. Electronic device 4800 can include a top device enclosure portion 4822. Tab 4824 can be formed as part of or separate from top device enclosure portion 4822.

Figure 49B:
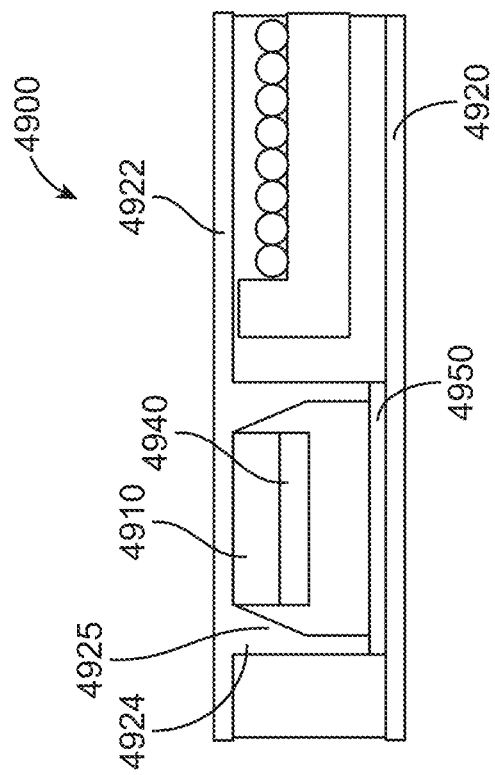
FIGS. 49A and 49B illustrate structures for constraining motions of magnets in an electronic device according to an embodiment of the present invention.
Figure 49A:
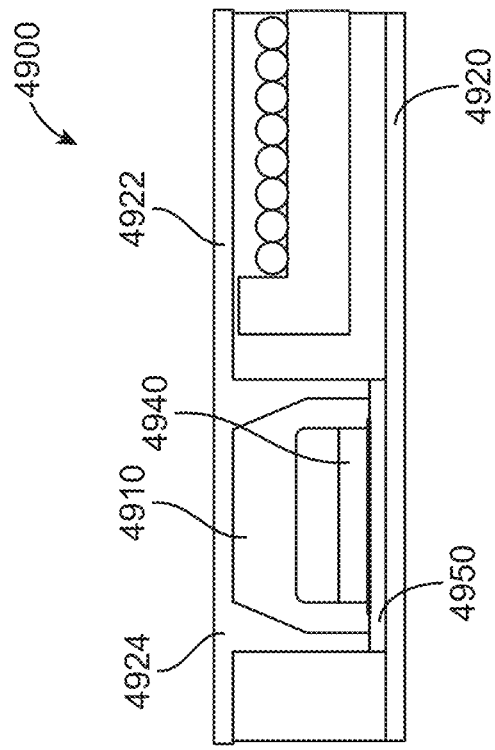

FIGS. 49A and 49B illustrate structures for constraining motions of magnets in an electronic device according to an embodiment of the present invention. In this example, first electronic device 4800 can be an attachment device (such as attachment device 100, attachment device 300, attachment device 500, or other attachment device according to an embodiment of the present invention), a wireless charging device, or other device having a magnet 4810 (which can be, e.g., any of the annular or other magnetic alignment components such as the magnet arrays and alignment magnets described above). In FIG. 49A, magnet 4910, shield 4940, and return plate 4950 can be housed in device enclosure 4920 of electronic device 4900. Top device enclosure portion 4922 can include guide 4924. Guide 4924 can constrain motion of magnet 4910 in electronic device 4900. In FIG. 49B, magnet 4910 and shield 4940 have detached from return plate 4950 and have been guided into position by guide 4924. Guide 4924 can include one or more chamfered edges 4925. Again, guide 4924 can be formed along with or separate from top device enclosure portion 4922 of electronic device 4900.

FIGS. 50A and 50B illustrate structures for constraining motions of magnets in an electronic device according to an embodiment of the present invention. In this example, first electronic device 5000 can be an attachment device (such as attachment device 100, attachment device 300, attachment device 500, or other attachment device according to an embodiment of the present invention), a wireless charging device, or other device having a magnet 5010 (which can be, e.g., any of the annular or other magnetic alignment components such as the magnet arrays and alignment magnets described above). In FIG. 50A, magnet 5010, shield 5040, and return plate 5050 can be housed in device enclosure 5020 of electronic device 5000. Magnet 5010 and shield 5040 can be supported by structure 5070. Structure 5070 can be attached to anchor 5074 through actuators 5072. Actuators 5072 can have hinges 5073 and 5075 at each end to allow structure 5070 to move relative to anchor 5074. Anchor 5074 can be attached to, or formed as either part of, top device enclosure portion 5022 or device enclosure 5020. In FIG. 50B, magnet 5010 and shield 5040 have detached from return plate 5050. Actuators 5072 have changed positions but continued to connect structure 5070 to anchor 5074. Anchor 5074 can be attached to, or formed as either part of, top device enclosure portion 5022 or device enclosure 5020.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication between devices. For example, each device that has an annular magnetic alignment component can also have an NFC coil that can be disposed inside and concentric with the annular magnetic alignment component. Where the device also has an inductive charging coil (which can be a transmitter coil or a receiver coil), the NFC coil can be disposed in a gap between the inductive charging coil and an annular magnetic alignment component. In some embodiments, the NFC coils can be used to allow a portable electronic device to identify other devices, such as a wireless charging device and/or an auxiliary device, when the respective magnetic alignment components of the devices are brought into alignment. For example, the NFC coil of a power-receiving device can be coupled to an NFC reader circuit while the NFC coil of a power-transmitting device or an accessory device is coupled to an NFC tag circuit. When devices are brought into proximity, the NFC reader circuit of the power-receiving device can be activated to read the NFC tag of the power-transmitting device and/or the accessory device. In this manner, the power-receiving device can obtain information (e.g., device identification) from the power-transmitting device and/or the accessory device.

In some embodiments, an NFC reader in a portable electronic device can be triggered by detecting a change in the DC (or static) magnetic field generated by the magnetic alignment component of the portable electronic device that corresponds to a change expected when another device with a complementary magnetic alignment component is brought into alignment. When the expected change is detected, the NFC reader can be activated to read an NFC tag in the other device, assuming the other device is present.

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 51:
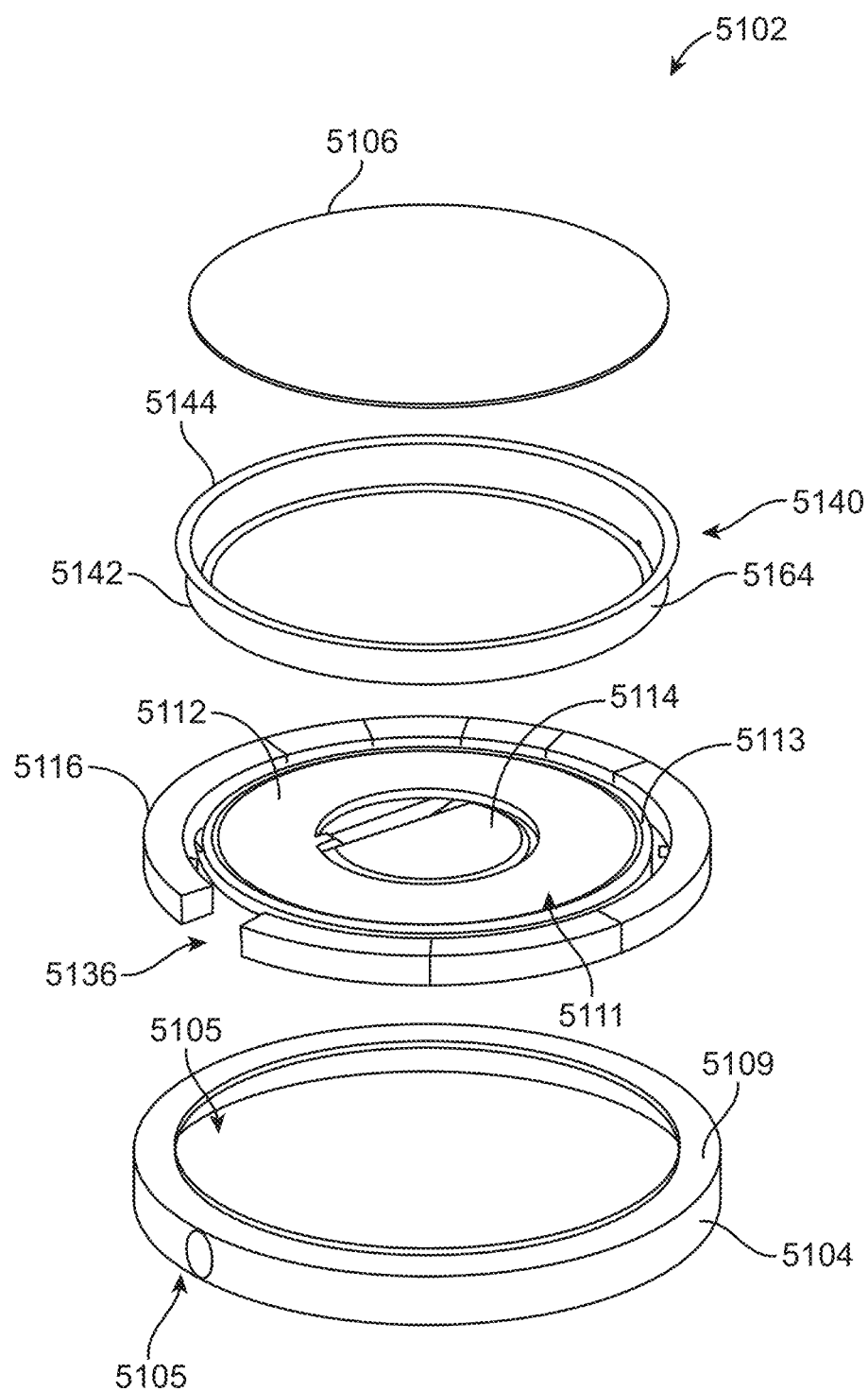
FIG. 51 shows an exploded view of a wireless charger device incorporating an NFC tag circuit according to some embodiments.
Figure 52:
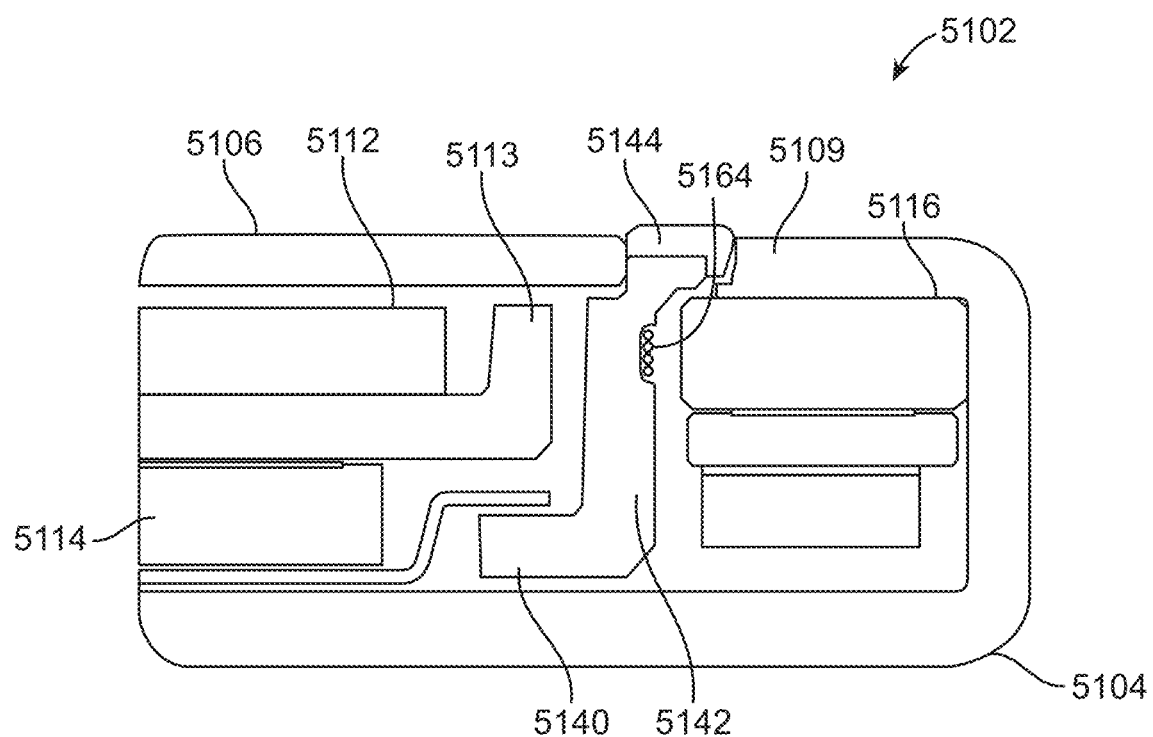
FIG. 52 shows a partial cross-section view of a wireless charger device according to some embodiments.

FIG. 51 shows an exploded view of a wireless charger device 5102 incorporating an NFC tag according to some embodiments, and FIG. 52 shows a partial cross-section view of wireless charger device 5102 according to some embodiments. As shown in FIG. 51, wireless charger device 5102 can include an enclosure 5104, which can be made of plastic or metal (e.g., aluminum), and a charging surface 5106, which can be made of silicone, plastic, glass, or other material that is permeable to AC and DC magnetic fields. Charging surface 5106 can be shaped to fit within a circular opening 5103 at the top of enclosure 5104.

A wireless transmitter coil assembly 5111 can be disposed within enclosure 5104. Wireless transmitter coil assembly 5111 can include a wireless transmitter coil 5112 for inductive power transfer to another device as well as AC magnetic and/or electric shield(s) 5113 disposed around some or all surfaces of wireless transmitter coil 5112. Control circuitry 5114 (which can include, e.g., a logic board and/or power circuitry) to control wireless transmitter coil 5112 can be disposed in the center of coil 5112 and/or underneath coil 5112. In some embodiments, control circuitry 5114 can operate wireless transmitter coil 5112 in accordance with a wireless charging protocol such as the Qi protocol or other protocols.

A primary annular magnetic alignment component 5116 can surround wireless transmitter coil assembly 5111. Primary annular magnetic alignment component 5116 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. In some embodiments, the diameter and thickness of primary annular magnetic alignment component 5116 is chosen such that arcuate magnet sections of primary annular magnetic alignment component 5116 fit under a lip 5109 at the top surface of enclosure 5104, as best seen in FIG. 52. For instance, each arcuate magnet section can be inserted into position under lip 5109, either before or after magnetizing the inner and outer regions. In some embodiments, primary annular magnetic alignment component 5116 can have a gap 5136 between two adjacent arcuate magnet sections. Gap 5136 can be aligned with an opening 5107 in a side surface of enclosure 5104 to allow external wires to be connected to wireless transmitter coil 5112 and/or control circuitry 5114.

A support ring subassembly 5140 can include an annular frame 5142 that extends in the axial direction and a friction pad 5144 at the top edge of frame 5142. Friction pad 5144 can be made of a material such as silicone or thermoplastic elastomers (TPE) such as thermoplastic urethane (TPU) and can provide support and protection for charging surface 5106. Frame 5142 can be made of a material such as polycarbonate (PC), glass-fiber reinforced polycarbonate (GFPC), or glass-fiber reinforced polyamide (GFPA). Frame 5142 can have an NFC coil 5164 disposed thereon. For example, NFC coil 5164 can be a four-turn or five-turn solenoidal coil made of copper wire or other conductive wire that is wound onto frame 5142. In some embodiments, NFC coil 5164 can be electrically connected to NFC tag circuitry (not shown) that can be disposed on frame 5142. The relevant design principles of NFC circuits are well understood in the art and a detailed description is omitted. Frame 5142 can be inserted into a gap region 5117 between primary annular magnetic alignment component 5116 and wireless transmitter coil assembly 5111. In some embodiments, gap region 5117 is shielded by AC shield 5113 from AC electromagnetic fields generated in wireless transmitter coil 5112 and is also shielded from DC magnetic fields of primary annular magnetic alignment component 5116 by the closed-loop configuration of the arcuate magnet sections.

Figure 53:
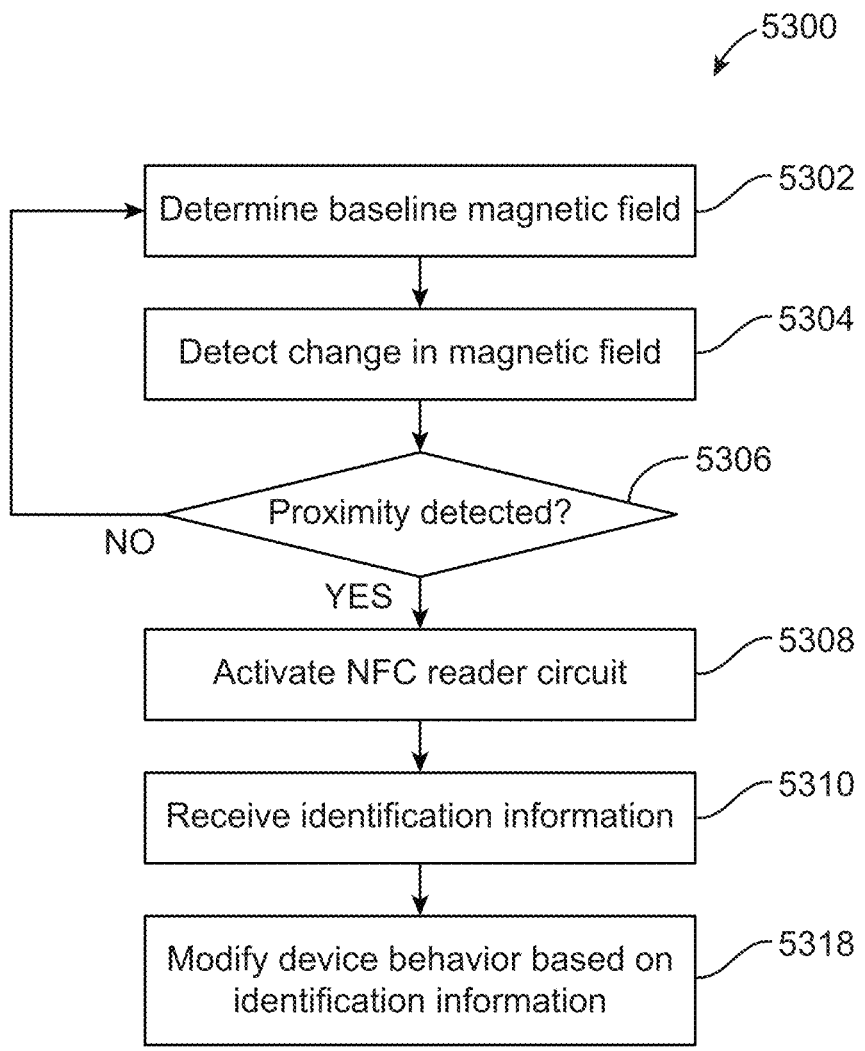
FIG. 53 shows a flow diagram of a process that can be implemented in a portable electronic device according to some embodiments.

FIG. 53 shows a flow diagram of a process 5300 that can be implemented in portable electronic device 5004 according to some embodiments. In some embodiments, process 5300 can be performed iteratively while portable electronic device 5004 is powered on. At block 5302, process 5300 can determine a baseline magnetic field, e.g., using magnetometer 5080. At block 5304, process 5300 can continue to monitor signals from magnetometer 5080 until a change in magnetic field is detected. At block 5306, process 5300 can determine whether the change in magnetic field matches a magnitude and direction of change associated with alignment of a complementary magnetic alignment component. If not, then the baseline magnetic field can be updated at block 5302. If, at block 5306, the change in magnetic field matches a magnitude and direction of change associated with alignment of a complementary alignment component, then at block 5308, process 5300 can activate the NFC reader circuitry associated with NFC coil 5060 to read an NFC tag of an aligned device. At block 5310, process 5300 can receive identification information read from the NFC tag. At block 5312, process 5300 can modify a behavior of portable electronic device 5004 based on the identification information, for example, generating a color wash effect as described above. After block 5312, process 5300 can optionally return to block 5302 to provide continuous monitoring of magnetometer 5080. It should be understood that process 5300 is illustrative and that other processes may be performed in addition to or instead of process 5300.

Figure 54:
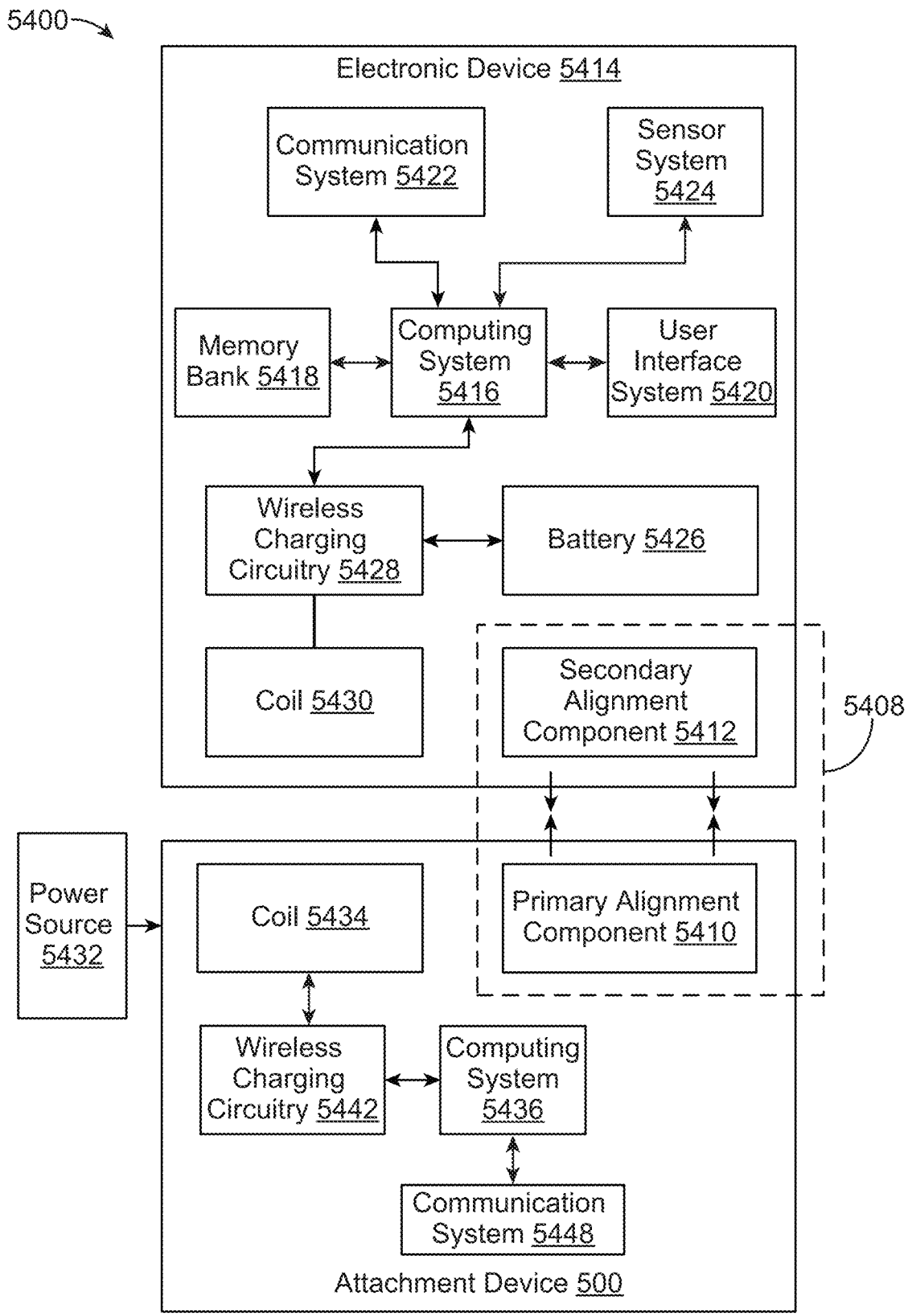
FIG. 54 is a block diagram illustrating an electronic system including an electronic device and an attachment device according to an embodiment of the present invention.

FIG. 54 is a block diagram illustrating an exemplary wireless charging system including electronic device 5414 and attachment device 500 (which can instead be attachment device 300, attachment device 500, or other attachment device according to an embodiment of the present invention) that can be aligned together via a magnetic alignment system 5408. Magnetic alignment system 5408 can include a primary alignment component 5410 within attachment device 500 and a secondary alignment component 5412 within portable electronic device 5414. The electronic device can include a computing system 5416 coupled to a memory bank 5418. Computing system 5416 can include control circuitry configured to execute instructions stored in memory bank 5418 for performing a plurality of functions for operating the electronic device. The control circuitry can include one or more suitable computing devices, such as microprocessors, computer processing units (CPUs), graphics processing units (GPUs), field programmable gate arrays (FPGAs), and the like.

Computing system 5416 can also be coupled to a user interface system 5420, a communication system 5422, and a sensor system 5424 for enabling the electronic device to perform one or more functions. For instance, user interface system 5420 can include a display, speaker, microphone, actuator for enabling haptic feedback, and one or more input devices such as a button, switch, capacitive screen for enabling the display to be touch sensitive, and the like. Communication system 5422 can include wireless telecommunication components, Bluetooth components, and/or wireless fidelity (Wi-Fi) components for enabling the electronic device to make phone calls, interact with wireless accessories, and access the Internet. In some embodiments, communication system 5422 can also include NFC components 560 that is formed as part of a proximity detector for identifying attachment device 500, as discussed above. Sensor system 5424 can include light sensors, accelerometers, gyroscopes, temperature sensors, and any other type of sensor that can measure a parameter of an external entity and/or environment.

These electrical components require a power source to operate. Accordingly, the electronic device also includes a battery 5426 for discharging stored energy to power the electrical components of the electronic device. To replenish the energy discharged to power the electrical components, the electronic device includes charging circuitry 5428 and an inductive coil 5430 for receiving power from attachment device 500 coupled to an external power source 5432.

Attachment device 500 can include a transmitter coil 5434 for generating time-varying magnetic flux capable of generating a corresponding current in coil 5430 of the electronic device. The generated current can be utilized by charging circuitry 5428 to charge battery 5426. Attachment device 500 can further include a computing system 5436 coupled to a communication system 5440 and wireless charging circuitry 5442. Computing system 5436 can include any suitable control circuitry discussed herein configured to control the functionality of attachment device 500, such as to control wireless charging circuitry 5442 to use power received from power source 5432 to generate time-varying magnetic flux to charge the electronic device.

While these and other embodiments of the present invention can be particularly well-suited to securing a phone in place relative to an interior of a vehicle (or other mobile locations, such a train, plane, bicycle, rover, motorcycle, jet ski, or other conveyance), other devices, such as tablet computers, laptop computers, desktop computers, all-in-one computers, cell phones, storage devices, wearable-computing devices, portable media players, navigation systems, monitors, adapters, and others can be secured in place in a vehicle or other conveyance, or other fixed or mobile location.

In these and other embodiments of the present invention, portions of the attachment devices can be conductive. These conductive portions, such as a shield, return plate, backplate, and other portions can be formed using stamping, forging, metal-injection molding, 3-D printing, CNC or other machining, or other manufacturing process. They can be formed of stainless steel, aluminum, or other material.

In these and other embodiments of the present invention, portions of the attachment devices can be nonconductive. These nonconductive portions, such as a housing for the attachment portion, stalk, a contacting surface, and other nonconductive portions, can be formed using injection or other molding, 3-D printing, machining, or other manufacturing process. They can be formed of silicon or silicone, rubber, hard rubber, plastic, nylon, liquid-crystal polymers (LCPs), or other nonconductive material or combination of materials.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An attachment device comprising:
   an enclosure formed by a contacting surface and a back plate;
   a magnet array in the enclosure;
   a mid-plate;
   a stalk attached to the mid-plate, where the mid-plate is attached to the back plate; and
   a front enclosure having an opening for the stalk, the front enclosure covering the mid-plate.

2. The attachment device of claim 1 wherein the stalk comprises a grip, where the grip can form a physical connection to a structure to hold the attachment device in place.

3. The attachment device of claim 2 wherein the contacting surface comprises a layer of silicone.

4. The attachment device of claim 3 wherein the grip comprises a layer of silicone.

5. The attachment device of claim 1 further comprising a coil in the enclosure, the coil arranged to transfer power to an electronic device that is attached to the attachment device.

6. The attachment device of claim 5 further comprising near-field communication circuitry and components.

7. The attachment device of claim 6 wherein the near-field communication circuitry and components comprises a tag and a capacitor.

8. An attachment device comprising:
   an enclosure;
   a magnet array in the enclosure;

an alignment structure separate from the magnet array, where the alignment structure aligns an electronic device to the attachment device in a single orientation; and a mounting structure to attach to a vehicular surface.

9. The attachment device of claim 8 wherein the alignment structure comprises a magnet.

10. The attachment device of claim 9 further comprising:
a coil in the enclosure, the coil arranged to transfer power to the electronic device.

11. The attachment device of claim 10 wherein the coil is laterally surrounded by the magnet array.

12. The attachment device of claim 11 wherein the magnet array is configured to hold the electronic device adjacent to the attachment device in any one of a number of orientations.

13. The attachment device of claim 12 wherein the magnet array is configured to hold the electronic device adjacent to the attachment device in any rotational orientation.

14. The attachment device of claim 13 wherein the magnet array is configured to move between a first position in the enclosure and a second position in the enclosure, wherein the first position is located between the second position and a contacting surface of the enclosure.

15. The attachment device of claim 14 wherein the contacting surface comprises silicone.

16. An attachment device comprising:
an enclosure having a contacting surface;
a mounting structure comprising a grip to attach to a vehicular surface, where the mounting structure is attached to the enclosure; and
a magnet array in the enclosure wherein the magnet array is configured to move between a first position in the enclosure and a second position in the enclosure, wherein the first position is located between the second position and the contacting surface of the enclosure.

17. The attachment device of claim 16 further comprising a connector receptacle located on the surface of the attachment device.

18. The attachment device of claim 17 further comprising:
an alignment magnet separate from the magnet array, where the alignment magnet aligns an electronic device to the attachment device in a single orientation.

19. The attachment device of claim 18 further comprising near-field communication circuitry and components.

20. The attachment device of claim 19 wherein the near-field communication circuitry and components comprises a tag and a capacitor.

* * * * *